(12) United States Patent
Kim et al.

(10) Patent No.: US 11,865,485 B2
(45) Date of Patent: *Jan. 9, 2024

(54) AIR CLEANER WITH ROLLABLE FILTER

(71) Applicant: LG ELECTRONICS INC., Seoul (KR)

(72) Inventors: Hyunju Kim, Seoul (KR); Hyun Byung Cha, Seoul (KR); Chinsoo Hyon, Seoul (KR); Younju Oh, Seoul (KR); Hee Jeong Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 530 days.

This patent is subject to a terminal disclaimer.

(21) Appl. No.: 17/021,015

(22) Filed: Sep. 15, 2020

(65) Prior Publication Data

US 2021/0121808 A1    Apr. 29, 2021

Related U.S. Application Data

(60) Provisional application No. 62/927,088, filed on Oct. 28, 2019.

(30) Foreign Application Priority Data

Jul. 27, 2020   (KR) .................. 10-2020-0093354
Jul. 27, 2020   (KR) .................. 10-2020-0093355

(Continued)

(51) Int. Cl.
*B01D 46/00*       (2022.01)
*B01D 46/16*       (2006.01)

(Continued)

(52) U.S. Cl.
CPC .............. *B01D 46/18* (2013.01); *A47J 36/38* (2013.01); *B01D 46/0005* (2013.01);

(Continued)

(58) Field of Classification Search
CPC .... B01D 46/00; B01D 46/0005; B01D 46/16; B01D 46/18; B01D 46/0086; B01D 46/88; B01D 46/442; B01D 46/4245

(Continued)

(56) References Cited

U.S. PATENT DOCUMENTS 2,857,017 A  *  10/1958  Nutting .................. B01D 46/18
                                                        55/509
3,025,964 A      3/1962  Bub
(Continued)

FOREIGN PATENT DOCUMENTS

CN     106907781     6/2017
CN     109621581     4/2019
(Continued)

OTHER PUBLICATIONS

U.S. Office Action dated Feb. 17, 2023 issued in U.S. Appl. No. 17/020,975.

(Continued)

*Primary Examiner* — Minh Chau T Pham
(74) *Attorney, Agent, or Firm* — KED & ASSOCIATES, LLP

(57) ABSTRACT

An air cleaner includes a case, an air inlet, an air outlet, a grill covering the air inlet to filter airborne oil droplets, a fan to suction air through the air inlet and discharge air out of the air outlet, a roll filter provided between the grill and the fan to filter oil mist, and a filter roller to cut the roll filter. The roll filter includes a roller and a filter sheet wound around the roller, and the filter sheet may be unwound to extend behind the grill. When the filter sheet becomes dirty, the roll filter is further unwound so that a clean section is provided behind the grill, and the filter cutter may cut off the dirty section.

(Continued)

During cutting, a clamp holds down the filter sheet. The case includes a slit through which the dirty section of the filter sheet passes for discarding.

14 Claims, 29 Drawing Sheets

(30) Foreign Application Priority Data

| Jul. 27, 2020 | (KR) | ......................... 10-2020-0093356 |
| Jul. 27, 2020 | (KR) | ......................... 10-2020-0093359 |
| Jul. 27, 2020 | (KR) | ......................... 10-2020-0093367 |

(51) Int. Cl.

| *B01D 46/18* | (2006.01) |
| *B01D 46/42* | (2006.01) |
| *B01D 46/46* | (2006.01) |
| *B01D 46/44* | (2006.01) |
| *A47J 36/38* | (2006.01) |
| *B01D 53/04* | (2006.01) |
| *B01D 46/62* | (2022.01) |
| *B01D 46/88* | (2022.01) |
| *B01D 46/24* | (2006.01) |

(52) U.S. Cl.
CPC ..... *B01D 46/0036* (2013.01); *B01D 46/0038* (2013.01); *B01D 46/0049* (2013.01); *B01D 46/0086* (2013.01); *B01D 46/16* (2013.01); *B01D 46/4227* (2013.01); *B01D 46/4245* (2013.01); *B01D 46/442* (2013.01); *B01D 46/46* (2013.01); *B01D 46/62* (2022.01); *B01D 46/88* (2022.01); *B01D 53/0446* (2013.01); *B01D 46/2411* (2013.01); *B01D 2253/102* (2013.01); *B01D 2257/90* (2013.01); *B01D 2259/4541* (2013.01); *B01D 2265/023* (2013.01); *B01D 2265/028* (2013.01); *B01D 2273/30* (2013.01); *B01D 2277/30* (2013.01); *B01D 2279/35* (2013.01)

(58) Field of Classification Search
USPC ......... 55/351, 352, 354, 422, 495, 501, 506, 55/481; 95/19, 26, 273; 96/421, 423, 96/429
See application file for complete search history.

(56) References Cited

U.S. PATENT DOCUMENTS

| 3,233,391 | A | | 2/1966 | Olsen | |
| 3,310,931 | A | | 3/1967 | Revell | |
| 3,675,393 | A | | 7/1972 | Meade | |
| 3,710,588 | A | | 1/1973 | Martinez | |
| 3,717,978 | A | | 2/1973 | Osborne | |
| 3,745,748 | A | | 7/1973 | Goldfield | |
| 4,174,205 | A | * | 11/1979 | Koushiafes | B01D 46/18 55/501 |
| 4,221,576 | A | | 9/1980 | Phillips, Jr. | |
| 4,627,863 | A | | 12/1986 | Klein | |
| 4,881,957 | A | | 11/1989 | Shofner | |
| 4,894,071 | A | * | 1/1990 | Klein | F24F 8/10 55/354 |
| 5,217,513 | A | * | 6/1993 | Armbruster | B01D 46/42 96/414 |
| 5,599,363 | A | * | 2/1997 | Percy | B01D 46/20 55/354 |
| 5,863,310 | A | * | 1/1999 | Brown | B01D 46/88 55/DIG. 35 |
| 5,893,939 | A | | 4/1999 | Rakocy | |
| 6,152,998 | A | * | 11/2000 | Taylor | B01D 46/444 96/429 |
| 6,162,286 | A | | 12/2000 | Hasama | |
| 6,168,646 | B1 | * | 1/2001 | Craig | B01D 46/444 96/429 |
| 6,402,822 | B1 | * | 6/2002 | Najm | B01D 46/446 96/429 |
| 6,491,735 | B2 | * | 12/2002 | Najm | B01D 46/20 55/354 |
| 6,632,269 | B1 | * | 10/2003 | Najm | B01D 46/20 55/501 |
| 6,811,685 | B2 | | 11/2004 | Wanni | |
| 7,012,685 | B1 | | 3/2006 | Wilson | |
| 8,404,030 | B2 | * | 3/2013 | Schumacher | B01D 46/185 96/429 |
| 11,192,056 | B1 | | 12/2021 | Castaneda | |
| 11,654,389 | B2 | * | 5/2023 | Kim | B01D 46/16 55/480 |
| 2004/0129139 | A1 | | 7/2004 | Schumacher | |
| 2006/0018640 | A1 | | 1/2006 | Hinesley | |
| 2006/0070527 | A1 | | 4/2006 | Chapman | |
| 2007/0012188 | A1 | | 1/2007 | Tandon | |
| 2007/0204854 | A1 | | 9/2007 | Morton | |
| 2008/0006158 | A1 | | 1/2008 | Kiern | |
| 2008/0041025 | A1 | | 2/2008 | Boyer | |
| 2008/0286163 | A1 | | 11/2008 | Garfield | |
| 2009/0038480 | A1 | | 2/2009 | Garman | |
| 2009/0113857 | A1 | | 5/2009 | Sithes | |
| 2009/0113860 | A1 | | 5/2009 | Sithes | |
| 2009/0242469 | A1 | | 10/2009 | Calabrese | |
| 2010/0026967 | A1 | | 2/2010 | Yamagishi | |
| 2010/0077923 | A1 | | 4/2010 | Lewis | |
| 2010/0077926 | A1 | | 4/2010 | Yamagishi | |
| 2010/0095884 | A1 | | 4/2010 | Tuyls | |
| 2011/0030323 | A1 | | 2/2011 | Vinson | |
| 2011/0061537 | A1 | | 3/2011 | Sullivan | |
| 2011/0067388 | A1 | | 3/2011 | Zhang | |
| 2012/0055339 | A1 | | 3/2012 | Schumacher | |
| 2013/0186050 | A1 | | 7/2013 | Skopis | |
| 2013/0306264 | A1 | | 11/2013 | Zeolla | |
| 2014/0216251 | A1 | | 8/2014 | Jun | |
| 2014/0373719 | A1 | | 12/2014 | Spiegel | |
| 2018/0093217 | A1 | | 4/2018 | Mislak | |
| 2018/0111078 | A1 | | 4/2018 | Taylor | |
| 2018/0192841 | A1 | | 7/2018 | Nicolaou | |
| 2019/0143154 | A1 | | 5/2019 | Gangadhar | |
| 2019/0224599 | A1 | | 7/2019 | Shin | |
| 2019/0321757 | A1 | | 10/2019 | Jakpor | |
| 2020/0011567 | A1 | | 1/2020 | Herweck | |
| 2020/0338491 | A1 | | 10/2020 | Yamamoto | |
| 2020/0398207 | A1 | | 12/2020 | Park | |

FOREIGN PATENT DOCUMENTS

| CN | 110513777 | 11/2019 |
| CN | 110805974 | 2/2020 |
| CN | 210861242 | 6/2020 |
| DE | 3900543 | 7/1990 |
| KR | 10-0582006 | 5/2006 |
| KR | 10-0626193 | 9/2006 |
| KR | 10-2015-0078 | 7/2015 |
| KR | 10-1752664 | 6/2017 |
| KR | 10-2017-0105 | 9/2017 |
| KR | 20-0484435 | 9/2017 |
| KR | 10-2019-0087 | 7/2019 |
| KR | 10-2111867 | 5/2020 |
| KR | 10-2020-0067 | 6/2020 |
| WO | WO 2016/004399 | 1/2016 |
| WO | WO 2019098776 | 5/2019 |

OTHER PUBLICATIONS

U.S. Office Action dated Feb. 15, 2023 issued in U.S. Appl. No. 17/020,995.
Belkin. 2019. Wireless Chargers Explained. https://web.archive.org/web/20190401043223/https://belkin.com/us/ resource-center/wireless-charging/how-it-works/ (Year: 2019).

(56) References Cited

OTHER PUBLICATIONS

U.S. Office Action dated Aug. 17, 2022 issued in U.S. Appl. No. 17/020,995.
U.S. Appl. No. 17/020,975, filed Sep. 15, 2020.
U.S. Appl. No. 17/020,995, filed Sep. 15, 2020.
U.S. Appl. No. 17/021,015, filed Sep. 15, 2020.
U.S. Appl. No. 17/021,040, filed Sep. 15, 2020.
U.S. Appl. No. 17/021,057, filed Sep. 15, 2020.
U.S. Office Action dated Jan. 3, 2023 issued in U.S. Appl. No. 17/021,057.
U.S. Notice of Allowance dated Jan. 11, 2023 issued in U.S. Appl. No. 17/021,040.
U.S. Office Action dated Jul. 24, 2023 issued in U.S. Appl. No. 17/020,975.

\* cited by examiner

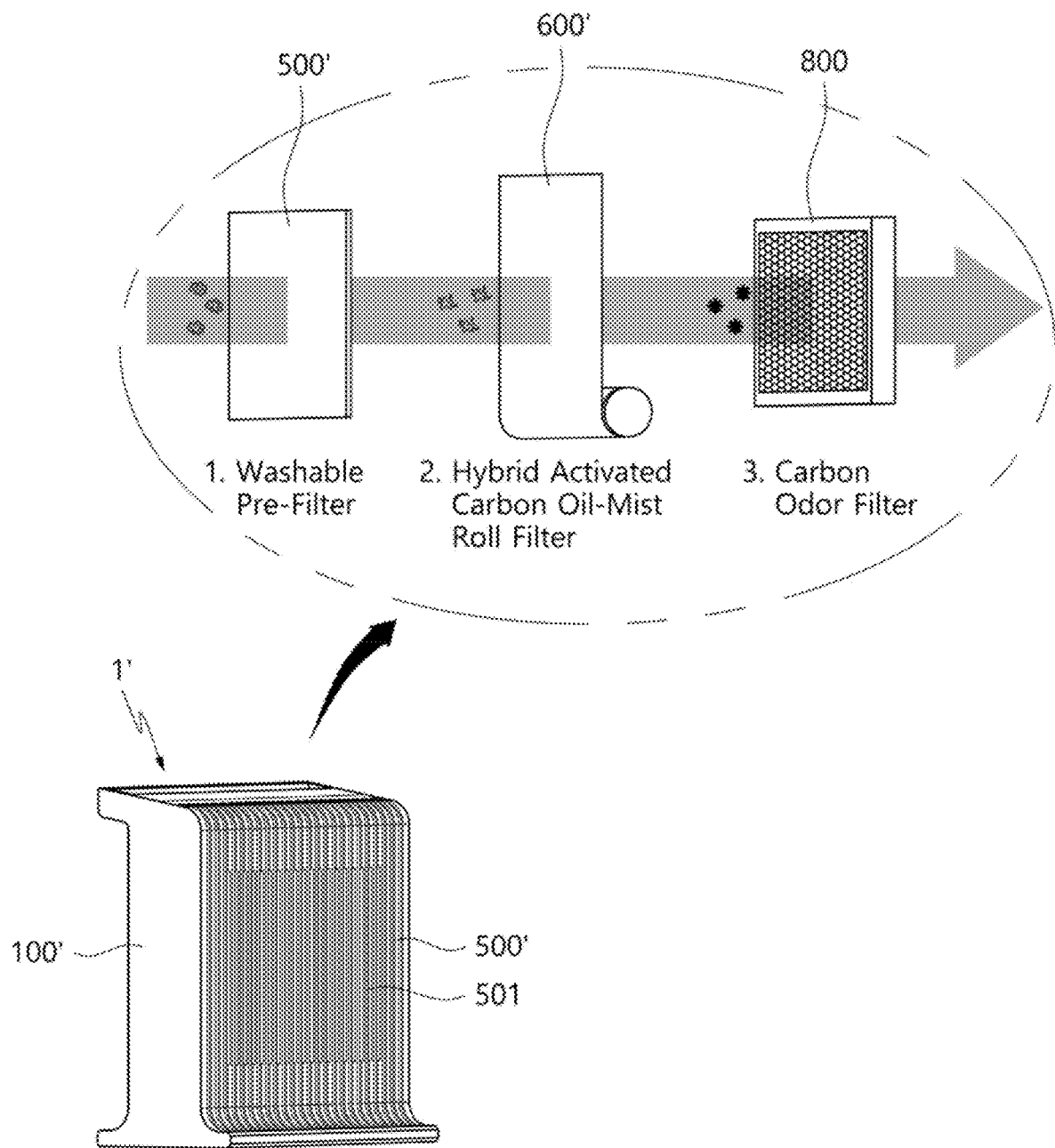

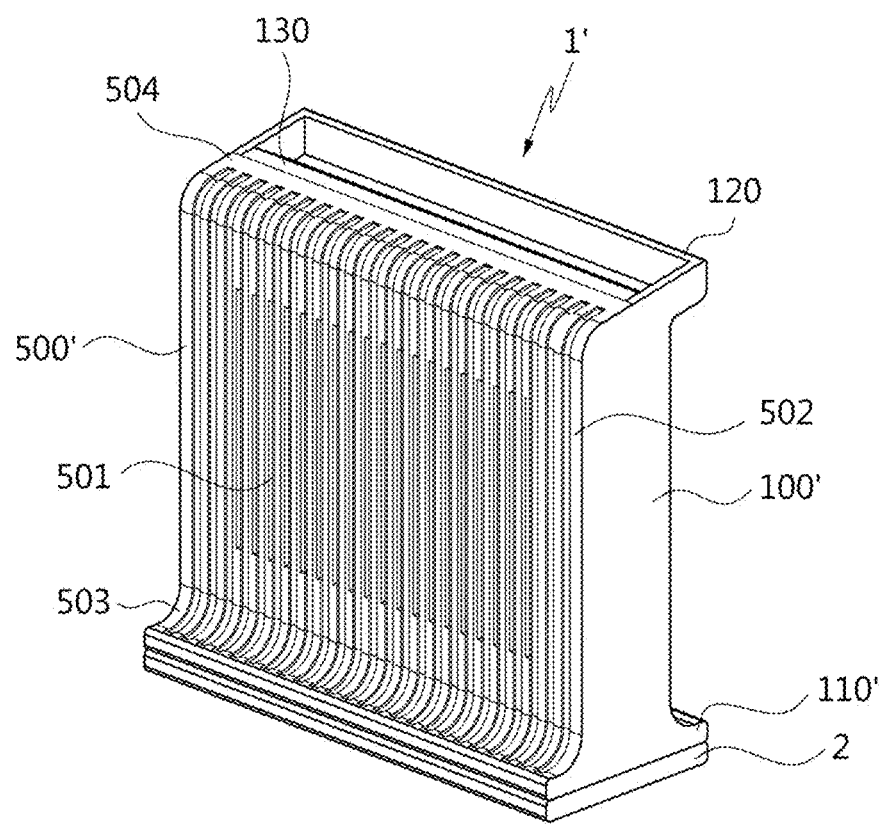

ON/OFF   BATTERY
 131A      131B

Lv1 | Lv2 | Lv3
        131C

Roll Filter   Carbon Filter
   131F          131G

FIG. 16H

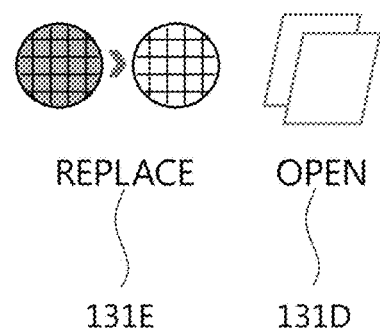

REPLACE    OPEN
  |          |
  131E      131D

FIG. 16I

|  | UI | ACTION | INDICATION |
|---|---|---|---|
| On/Off | Power indicator | Gesture swipe | Light on/off |
| Air Flow | Fan Level Indicator | Gesture swipe | Step 1-2-3 |
| Roll Filter Change Required | Roll Filter Indicator | - | Light on |
| Roll Filter Change | Replace Button | Button touch | Unwinding of Roll Filter |
| Carbon Filter Change Required | Carbon Filter Indicator | - | Light on |
| Pre-Filter open | Open Button | Button touch | Pre-Filter unlatched |
| Battery status | Battery indicator | - | Color+Step |
| Battery charging | | | Blink |

AIR CLEANER WITH ROLLABLE FILTER

CROSS-REFERENCE TO RELATED APPLICATION(S)

This application claims priority under 35 U.S.C. § 119 to U.S. Provisional Application No. 62/927,088, filed on Oct. 28, 2019, and Korean Patent Application Nos. 10-2020-0093354, 10-2020-0093355, 10-2020-0093356, 10-2020-0093359, and 10-2020-0093367, all filed Jul. 27, 2020, whose entire disclosures are hereby incorporated by reference.

BACKGROUND

1. Field

The present disclosure relates to an air cleaner.

2. Background

Cooking often results in emission of harmful contaminants and carcinogens such as smoke, oil mist, dust, or other pollutants. Many kitchens have a kitchen hood installed above a stove or cooktop to fan out residual contaminants; however, kitchen hoods are very often not properly maintained, reducing their effectiveness. Oil, dust, smoke, and other pollutants may remain in the air after cooking and cling onto cabinets, countertops, or other surfaces, which may become a breeding ground for bacteria such as *Staphylococcus aureus* ("staph"), *Escherichia coli* ("*E. coli*"), and *Streptococcus pneumoniae* (which may cause meningitis, pneumonia, sinusitis, and other infections). Other harmful substances produced during cooking may include carbon monoxide, nitrogen dioxide, formaldehyde, volatile organic compounds, black carbon, and polycyclic aromatics hydrocarbon, which may pose health risks.

Most fine dust generated during baking or frying is in the form of oil mist, which may stick to and clump on conventional air purifiers or kitchen hoods. The oil mist may block dirty air from entering a suction grill of an air purifier or cleaner, decreasing an efficiency of the air cleaner. If oil mist clings near a discharge grill of an air purifier or cleaner, the oil may be further spread throughout the indoor space, increasing contamination.

KR 20040007482A discloses an air purifier having an ultraviolet lamp and a photocatalyst. KR 100582006 B1 discloses a tabletop air purifier to filter fine smoke (e.g., cigarette smoke). The tabletop air purifier suctions air from a front and discharges air out left and right openings, pushing the air back toward the front. Such an air flow may be disruptive or annoying to nearby users, and the discharged clean air may also mix with dirty air and recirculate. The filter inside of the tabletop air purifier is not easily replaceable, and the tabletop air purifier needs to be installed close to a wall outlet.

KR 200484435 Y1 discloses a detachable small air cleaner. The detachable small air cleaner is not easily cleaned and must be taken apart to be cleaned. In addition, a front gap is formed that attracts oil, dirt, and other contaminants.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 13 is an air cleaner according to another embodiment;

FIG. 15A is a perspective view of the air cleaner of FIG. 13;

FIG. 16B-16H show views of notifications of the user interface;

FIG. 16I is a table explaining a possible implementation of the notifications;

DETAILED DESCRIPTION

Figure 1:
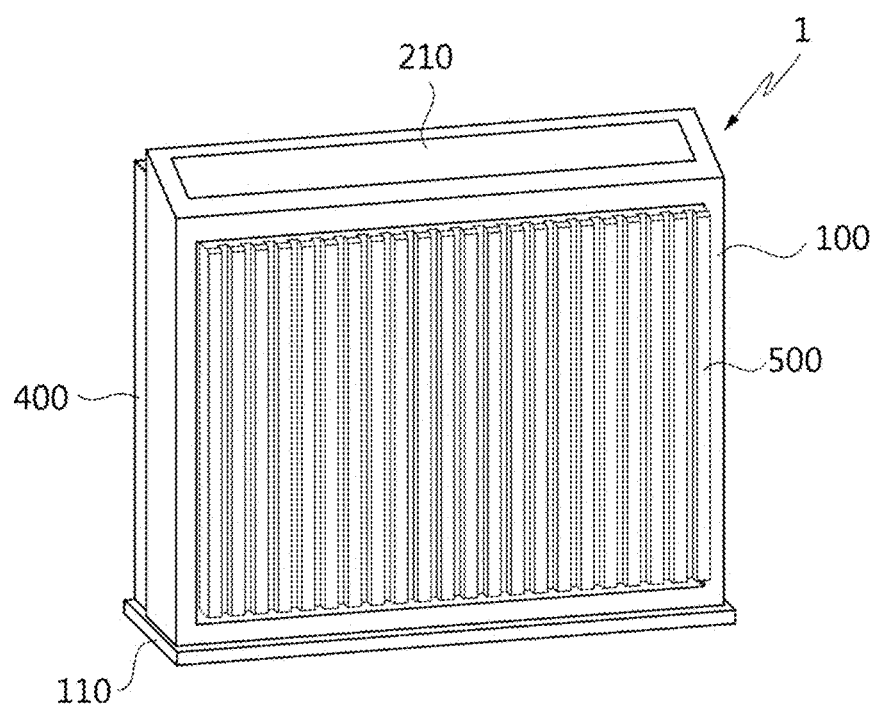
FIG. 1 is a front perspective view of an air cleaner according to an embodiment.
Figure 2A:
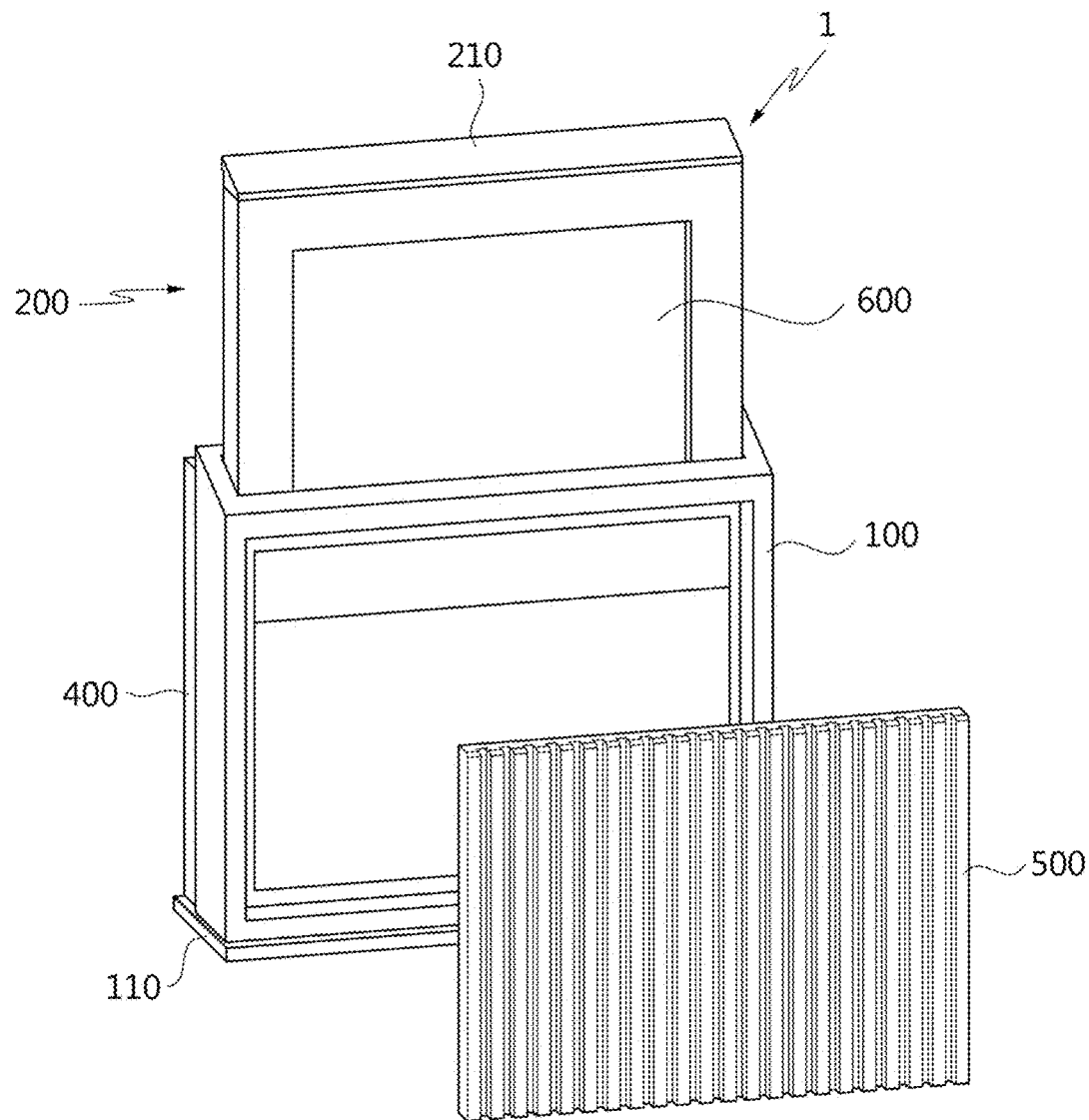
FIG. 2A is a front perspective exploded view showing removal of a prefilter.
Figure 2B:
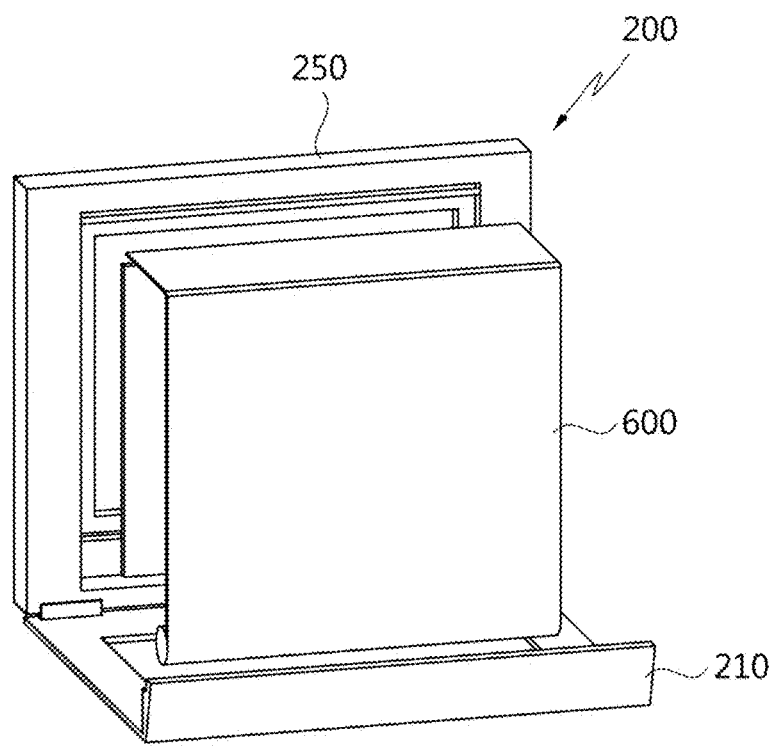
FIG. 2B is a front perspective exploded view showing a roll filter.
Figure 3:
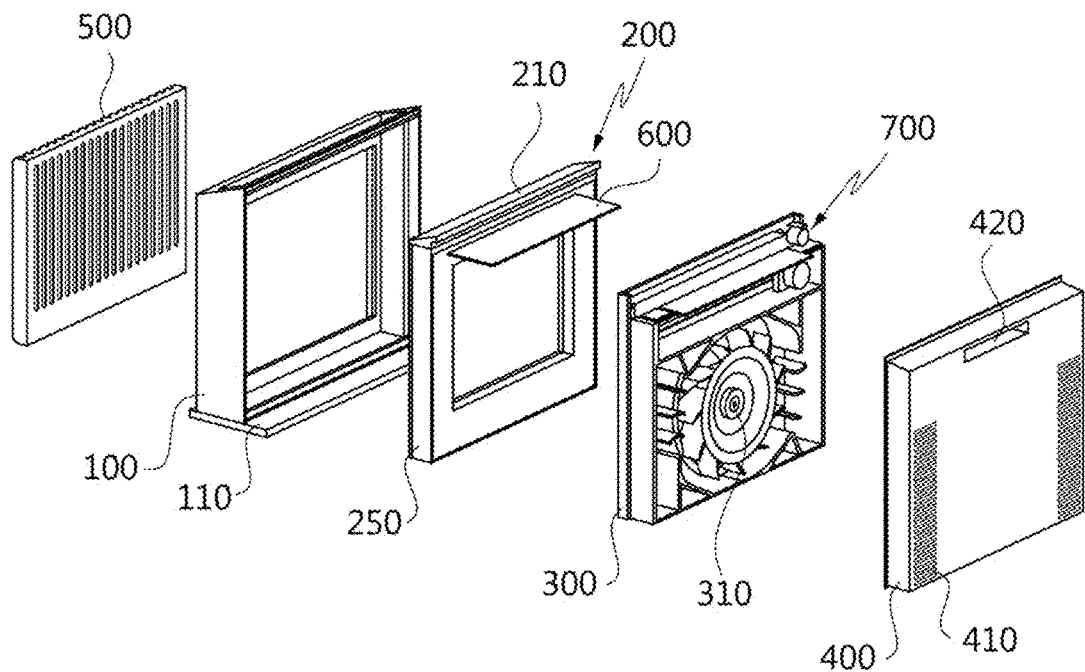
FIG. 3 is a side perspective exploded view from a rear.

Referring to FIGS. 1-4, an air cleaner or purifier 1 may include an outer case or housing 100, a rear cover or case 400 coupled to a rear of the outer case 100, and a pre-filter or suction grill 500 to cover a front opening of the outer case 100. The pre-filter 500 may be easily lifted and removed from the outer case 100 for cleaning. An inside of the air cleaner 1 may include a roll filter 600 to filter air passing through the pre-filter 500. The roll filter 600 may periodically be unwound to expose a fresh section of the roll filter 600, and the old, dirty section may be pulled out of the rear case 400 and cut by a filter cutter 700 to be discarded.

Figure 15B:
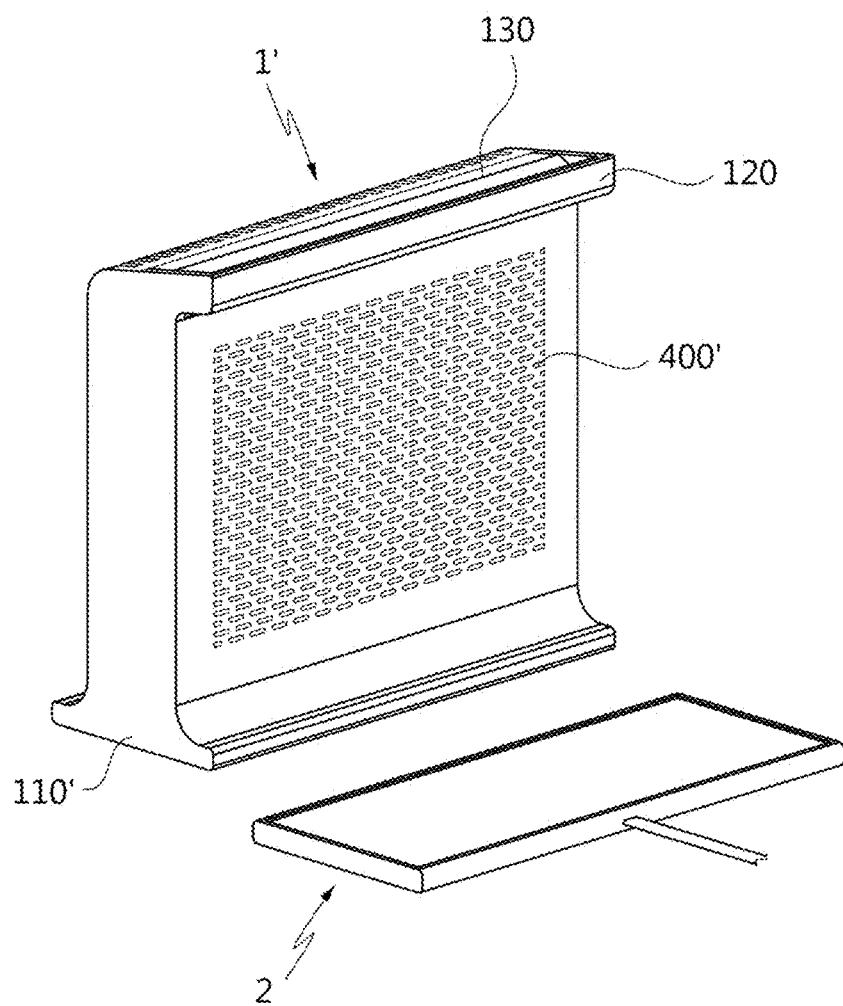
FIG. 15B is a perspective view of the air cleaner of FIG. 13 and a charging pad.

The outer case 100 may have a cuboid shape and define rectangular front and rear openings, but embodiments disclosed herein are not limited to cuboid cases. A bottom of the outer case 100 may include a base 110 to support a weight of the air cleaner 1, which may be relatively lightweight. A total weight of the air cleaner 1 may be 10 pounds (lbs) or less, not including a charging pad 2 (FIG. 15B). For example, the weight of the air cleaner 1 may be 4.5 kg (9.9 pounds). The rear cover 400 may cover the rear opening of the outer case 100 and be configured to be pressed-fit and/or snap-fitted onto the outer case 100. The rear cover 400 may be optionally further secured with screws, bolts, adherents, etc. The base 110 may be configured for wireless charging and may include a battery configured to be charged when the base 110 is seated on a wireless charging pad 2.

The front opening of the outer case 100 may be an opening through which suctioned air enters. The pre-filter 500 may have a plurality of openings and may be configured to filter out large droplets of oil or large particles of dirt from suctioned air. The pre-filter 500 may be made out of a same or similar material as the outer case 100 (e.g., metal, stainless steel, or plastic) and may be pulled or lifted and removed from the outer case 100 for cleaning and to allow access to the roll filter 600 for e.g., visual inspection of the roll filter 600 or replacement of the roll filter 600. The pre-filter 500 may be made of a material configured to be dish-washer safe. Similarly, the rear cover 400 may also be made of a material configured to be dish-washer safe.

The pre-filter 500 may be pressed-fit or friction-fitted into the front opening of the outer case 100, and the pre-filter 500 may be further secured to the outer case 100 via optional magnetic coupling. For example, a magnet may be provided in an upper section of the pre-filter 500, and at least a top of the outer frame 100 may be formed of a ferromagnetic material or have a magnet configured to engage with the magnet in the pre-filter 500.

The outer case 100, the pre-filter 500, and the rear cover 400 may define an interior space of the air cleaner 1. Inside the air cleaner 1, a frame 300 housing a fan 310 may be provided to suction air. A roll filter cartridge 200 may be provided behind the pre-filter 500 and in front of the fan 310. The roll filter 600 may be housed in the roll filter cartridge 200 and filter finer oil mist and particles than the pre-filter 500.

There may be an optional carbon filter provided between the roll filter 600 and the frame 310. The carbon filter may be provided inside of the roll filter cartridge 200 with the roll filter 600, be provided in an optional rear opening of the roll filter cartridge 200, or be provided behind the roll filter cartridge 200 inside of the outer case 100. The roll filter 600 may be configured to filter oil mist, while the carbon filter may be configured to filter odorants. Alternatively or in addition thereto, the roll filter 600 may include carbon so as to serve as both an oil mist filter and odorant filter.

The rear cover 400 may include discharge openings 410 through which air is discharged. The discharge openings 410 may be provided on a rear surface of the rear cover 400, and the fan 310 may be an axial fan configured to suction air through the pre-filter 500 and discharge air out of the discharge openings 410.

The roll filter 600 may have a filter sheet 610 wound or wrapped around a roller 620. The filter sheet 610 may be made of a soft or cuttable fibrous or porous material (fabric, fibroid, paper, cardboard, nonfiber, etc.). The filter sheet 610 may be pulled to unwind from the roller 620 so that the filter sheet 610 covers an opening defined by the roll filter cartridge 200 and aligns with the pre-filter 500 and the fan 310. An end of the filter sheet 610 may be attached (e.g., adhered) to the roller 620, and the roller 620 may be rotated as the filter sheet 610 is unwound. The roller 620 may be implemented as a tension rod with a spring mechanism so that the filter sheet 610 may not be freely unwound and so that, if too much filter sheet 610 is unwound, some of the filter sheet 610 may be rewound.

As an alternative, the filter sheet 610 may not be attached to the roller 620. The roller 620 may remain stationary as the filter sheet 610 is unwound. A bottom of the roll filter cartridge 200 may include a recess in which the roller 620 may be seated, or alternatively may include holes which a shaft of the roller 620 may penetrate to be secured to the roll filter cartridge 200.

As previously described, the filter sheet 610 may include a fibrous or porous material configured to filter oil mist or fine dust from suctioned air. For example, the filter sheet 610 may include nano fibers having a size of 100 nm or 5-6 μm, cellulose or wood pulp or fibers, cardboard, or paper. Alternatively or in addition thereto, the filter sheet 610 may include a fibrous or porous material configured to filter odorants. For example, the filter sheet 610 may include a nonwoven activated carbon or an ultrafine porous activated carbon.

The filter sheet 610 or at least sections thereof may be configured to change colors based on a contamination level, and the user may see the color changing sections through the openings of the pre-filter 500 or from a portion of filter sheet 610 dangling out of the rear cover 400. A plurality of sensor cards may be attached (e.g., adhered or sewn) to sections of the filter sheet 610, and the sensor cards may change colors based on exposure to oil or gas. Alternatively, the filter sheet 610 may be woven with color changing fiber, thread, or yarn that changes colors based on exposure to oil or gas (e.g., hydrogen chloride or ammonia). The color changing thread may be woven in sections of the filter sheet 610, or the entire filter sheet 610 may be woven with the color changing thread.

Alternatively or in addition thereto, an optional differential pressure sensor may be provided to determine a contamination level of the filter sheet 610 by sensing a flow of air entering the filter sheet 610 and a flow of air exiting the filter sheet 610, and comparing the two air flows. The greater the difference between the two air flows, the more contaminated the filter sheet 610 may be.

When the section of the filter sheet 610 aligning with the pre-filter 500 becomes dirty, the roll filter 600 may be unwound so that a fresh section of the filter sheet 610 aligns with the pre-filter 500. The roll filter cartridge 200 may include a gear or roller assembly 220 to pull and unwind the filter sheet 610. The gear assembly 220 may be provided at a top section of the roll filter cartridge 200 to maintain a tension of a section of the filter sheet 610 aligning with the pre-filter 500. The gear assembly 220 will be described in more detail with reference to FIG. 5.

The used, dirty section may pass through an opening (e.g., slit or slot) 320 in the frame 300 and an opening (e.g., slit or slot) 420 in the rear cover 400. A filter cutter 700 may be coupled to the frame 300 to cut the used, dirty section off, which may be pulled out of the slits 320 and 420 in the frame 300 and rear cover 400 to be discarded. When the filter sheet 610 has been completely unwound from the roller 620, the roll filter 600 may be replaced with a new roll filter 600 and the old roller 620 and any leftover filter sheet 610 may be discarded, similar to replacement of paper towels.

A top of the outer case 100 may have an upper opening through which a top of the roll filter cartridge 200 is exposed. The roll filter cartridge may include a support 250 and a front frame or cover 210 removably coupled to the support 250 to secure the roll filter 600 in the roll filter cartridge 200. As an example, the front cover 210 may be hinged to a rear bottom edge of the support 250 and have an upper section configured to be snap-fitted or pressed-fitted onto an upper section of the support 250, but embodiments disclosed herein are not limited hereto. A top section of the front cover 210 may be exposed through the upper opening of the outer case 100, and may serve as a handle to allow the roll filter cartridge 200, along with the roll filter 600, to be slid out of the outer case 100. The top section of the front cover 210 may be inclined to correspond to an inclination of the top of the outer case 100.

An inner side of the outer case 100 may include a spring and latch to engage with a latch of the support 250 such that the roll filter cartridge 200 may be spring loaded into the outer case 100. As an example, the spring may be provided at a bottom of the outer case 100 and the latch may be provided at a bottom of the support 250, but positions of the spring and latch are not limited. When the roll filter cartridge 200 is slid into the upper opening of the outer case 100, the spring may be compressed and the support 250 may be locked to the outer case 100 to close the upper opening of the outer case 100. When a downward force is applied to the top of the front cover 210, the support 250 may be unlocked from the outer case 100. A restoring force of the spring may push the roll filter cartridge 200 slightly upward so that the user may easily grab the top of the front cover 210 to remove the roll filter cartridge 200 and remove or replace the roll filter 600.

A display and user interface may be provided on the top of the front cover 210. Alternatively, the display and user interface may be provided on a section of the outer case 100. The display and user interface may be a touch screen, liquid crystal display (LCD), and/or include capacitive touch sensors and light emitting diodes (LED) provided on a printed circuit board (PCB) behind a plurality of notifications or indicators formed of a plurality of holes etched into a surface of the front cover 210 and/or the outer case 100. Alternatively or in addition thereto, the user interface may include light or motion sensors. Embodiments disclosed herein are not limited to an implementation of the display and user interface. The user may control an operation of the air cleaner 1 via the user interface (e.g., speed up or slow down the fan 310, turn the fan 310 on or off, or unwind or cut the roll filter 600.)

The air cleaner 1 may include a sensor assembly to monitor a level of dust, oil, odors, or other harmful gases (e.g., carbon monoxide) in the air surrounding the air cleaner 1. Alternatively or in addition thereto, the air cleaner 1 may have a sensor to compare a flow rate of suctioned air and a flow rate of discharged air to determine when the pre-filter 500 needs to be washed and/or the roll filter 600 needs to be unwound and cut. In yet another alternative or optional addition, the filter sheet 610 may be configured to change color when it is time to be replaced, and the user may control the air cleaner 1 to unwind the roller 620 when the user sees that a hanging portion of the filter sheet 610 exposed through the slit 420 of the rear cover 400 is a certain color (e.g., purple, yellow, brown, etc.). The display may indicate contamination levels sensed from the sensor assembly.

Figure 4:
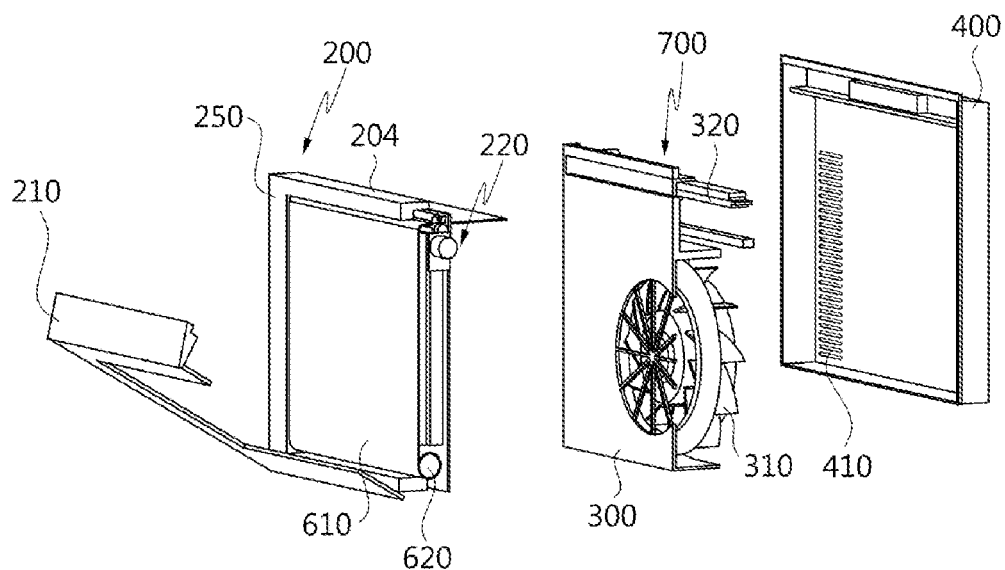
FIG. 4 is a side perspective exploded view from a front.
Figure 5:
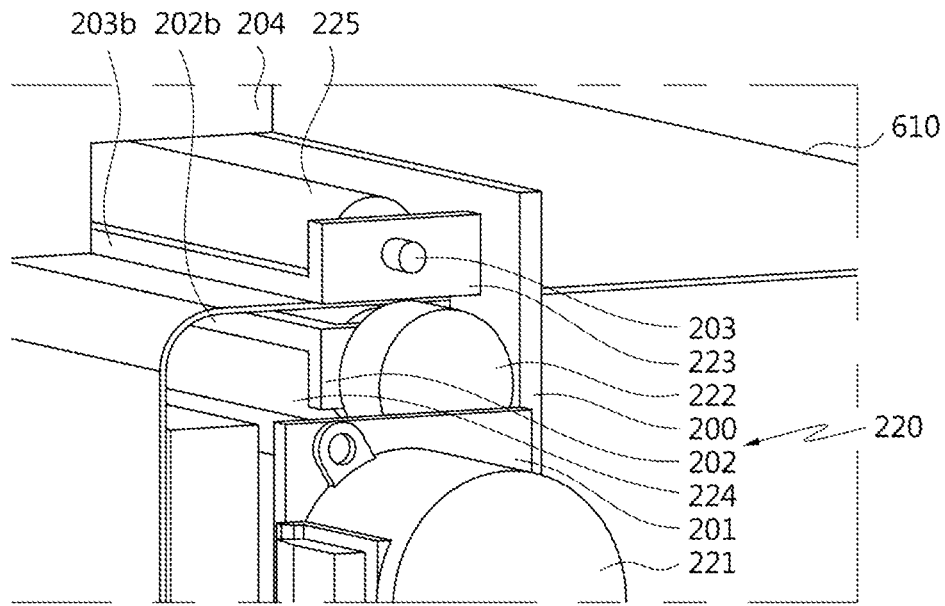
FIG. 5 is a perspective view of a roller assembly.

Referring to FIGS. 4-5, the gear assembly 220 may ensure a smooth feeding of the filter sheet 610 toward the filter cutter 700 (FIG. 4) via a plurality of gears and a plurality of rollers, and the gear assembly 220 may alternatively be referred to as a filter guide or a feeding assembly. The support 250 of the roll filter cartridge 200 may have a top section or frame 204 extending horizontally across the top. The top section 204 may house an upper or first roller 225. A first bracket 203 may be provided at a bottom of the top section 204 to provide side sections having holes, and a shaft 223 of the upper roller 225 may be inserted into the holes of the first bracket 203. A bottom of the first bracket 203 may have an opening through which a bottom of the upper roller 225 is exposed. The top section 204 of the support 250 may cover a top of the upper roller 225. The first bracket 203 may have an optional front section or wall 203b to provide additional support and rigidity to the first bracket 203.

A second bracket 202 may be provided under the first bracket 203 to house a lower or second roller 224. Like the first bracket 203, the second bracket 202 may have side sections having holes, and a shaft of the lower roller 224 may be inserted into the holes of the second bracket 202. A top of the second bracket 202 may have an opening through which a top of the lower roller 224 is exposed. The second bracket 202 may have an optional front section or wall 202b to provide additional support and rigidity to the second bracket 202.

The shaft of the lower roller 224 may be connected to a roller gear 222. A roller motor 221 may be provided under the roller gear 222 and coupled to a side wall 201 of the roll filter cartridge 200. The roller motor 221 may be coupled to an inner gear, and the roller motor 221 may be configured to rotate the roller gear 222 via the inner gear to rotate the lower roller 224.

The upper roller 225 and the lower roller 224 may be configured to contact each other, and the filter sheet 610 may be fed between the upper roller 225 and the lower roller 224. When the roller motor 221 is turned on, the roller gear 222 may rotate in a direction that feeds the filter sheet 610 toward the rear cover 400 (i.e., clockwise in FIG. 5). The upper roller 225 may not be driven by the roller motor 221 and instead rotate via friction as the filter sheet 610 is moved by the lower roller 224. The upper roller 225 may primarily serve as a guide to maintain a position of the filter sheet 610 and prevent the filter sheet 610 from slipping off of the lower roller 224. Alternatively, the upper roller 225 may be driven by a separate gear and motor configuration, which may be synchronized with the roller gear 222 and roller motor 221 driving the lower roller 224.

A rear surface of the support 250 may include an opening (e.g., slit or slot) through which the filter sheet 610 passes toward the filter cutter 700. After passing through the slit of the rear surface of the support 250, the filter sheet 610 may pass through the slit 320 of the frame 300.

There may be an optional gear sensor in the roller motor 221 or the roller gear 222 to sense an operation of the roller motor 221 and/or a rotation of the inner gear or roller gear 222. A controller may be electrically connected to the gear sensor, and may determine how much of the filter sheet 610 has been fed through the upper and lower rollers 225 and 224 based on a number of turns of the roller motor 221 and/or the inner gear or roller gear 222. The roller motor 221 may be automatically turned off when the controller has determined that a predetermined amount of the filter sheet 610 has been fed through the upper and lower rollers 225 and 224; i.e., when at least one of the roller motor 221, the inner motor, or the roller gear 222 has completed a predetermined number of rotations. The predetermined amount of filter sheet 610 and/or the predetermined number of rotations may be set based on a height of the front opening of the case.

Figure 6A:
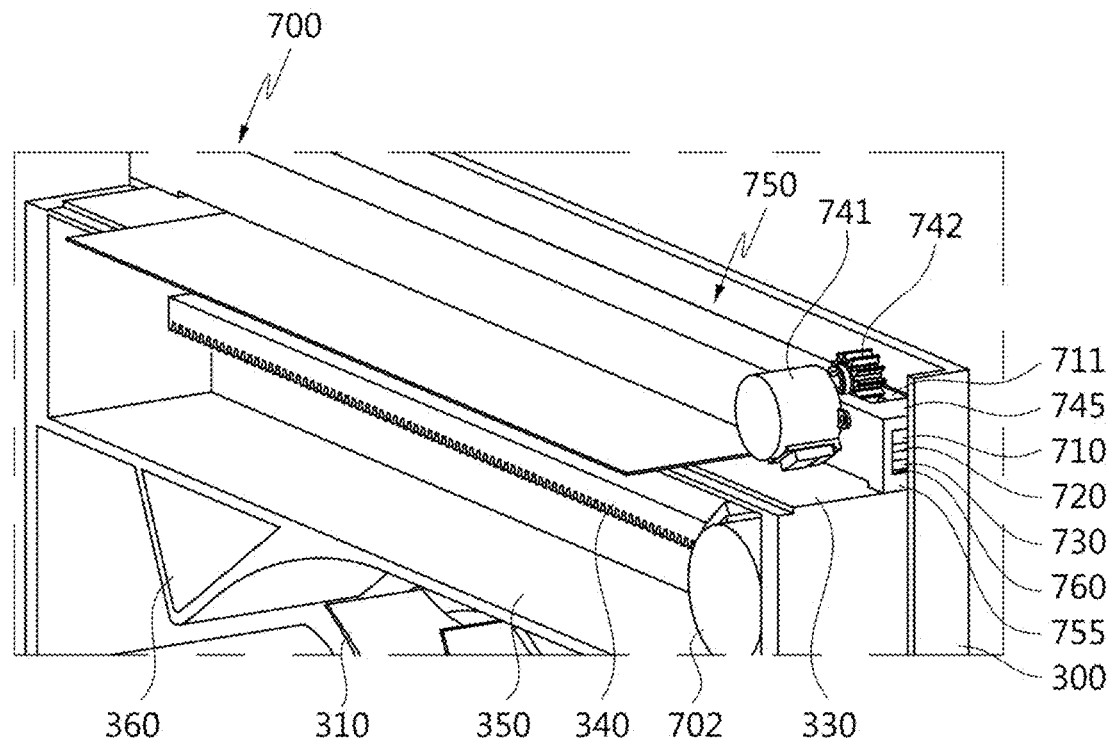
FIG. 6A is a perspective view of a filter cutter.
Figure 11:
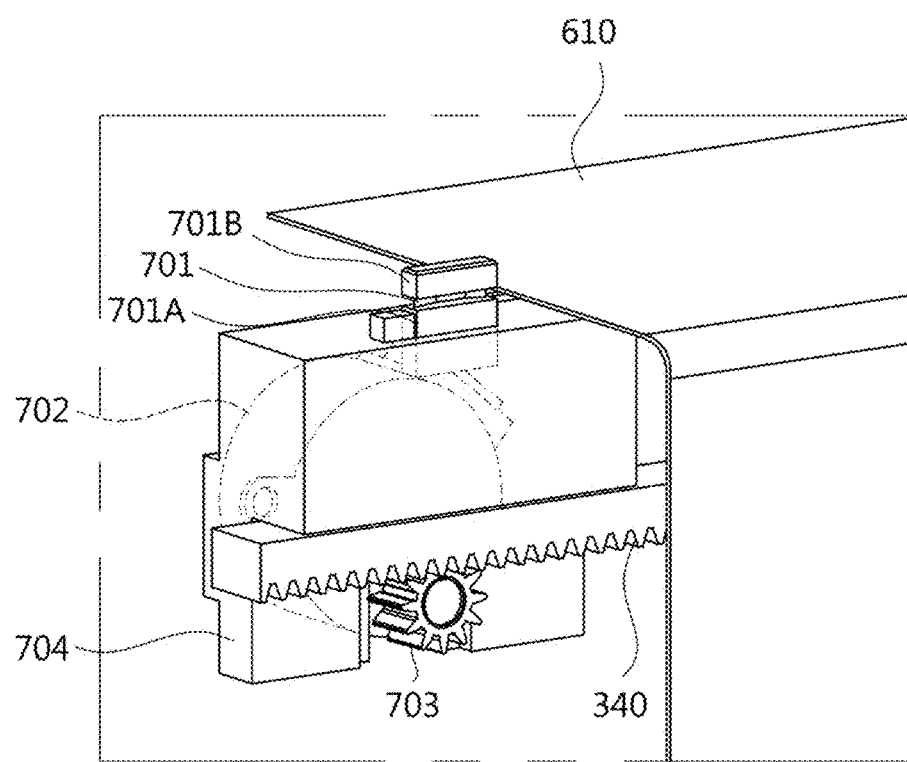
FIG. 11 is an enlarged view of the filter cutter showing the blade from a front.

Alternatively or in addition thereto, the filter sheet 610 may have markings or serrations at predetermined intervals, and a marking sensor (e.g., light or laser sensor) may be provided in one of the first bracket 203 or the second bracket 202 to sense when the markings or serrations have passed over the sensor. The predetermined amount of filter sheet 610 fed through the upper and lower rollers 225 and 224 may be determined based on a predetermined number of markings or serrations that has passed over the sensor. The roller motor 221 may be automatically turned off after the predetermined number of markings has passed over the sensor. In the case where the filter sheet 610 is serrated, a blade 701 (FIG. 11) of the filter cutter 700 may be omitted, while a clamp 750 (FIG. 6) of the filter cutter 700 may remain so that the user may tear off the filter sheet 610 for disposal. Details of the filter cutter 700 will be described with reference to FIGS. 6A-11.

Referring to FIGS. 6A-11, the filter cutter 700 may be provided at a rear of the frame 300 to cut the filter sheet 610 after being fed through the slit 320 (FIG. 4) of the frame 300. The filter cutter 700 may include a blade 701 configured to move between sides of the frame 300 to cut the filter sheet 610 and also a clamp 750 to hold down the filter sheet 610 during cutting.

A rear of the frame 300 may include a ledge 330 to provide a flat surface on which the filter sheet 610 is fed. The ledge 330 may include an opening (e.g., slit or slot) 330a through which the blade 701 is inserted so as to cut the filter sheet 610. A blade motor 702 may be provided under the ledge 330 and housed in a blade housing 704. The blade 701 may be coupled to a top of the blade housing 704. A section of the clamp 750 may be provided over the blade 701 or have an interior space in which the blade 701 may move to hold the filter sheet 610' down on both sides (i.e., front and rear sides) of the blade 701 during cutting. Details of an arrangement of the blade 701 and the blade motor 702 and a movement of the blade 701 will be described later.

The frame 300 may include a beam 350 to support and separate the filter cutter 700 from the fan 310. A V-shaped protrusion 360 may extend below a bottom of the beam 350 to further support and/or shield the fan 310 from the filter cutter 700.

The clamp 750 may include a rectangular clamp cover or housing 740 extending between sides of the frame 300. First, second, and third layers of a prescribed contour 710, 720, and 730 may be provided inside of the clamp cover 740. The first layer 710 may be a top layer, the second layer 720 may be an intermediate layer, and the third layer 730 may be a bottom layer configured to contact the filter sheet 610 and/or the ledge 330 through a bottom opening of the clamp 750. Alternatively, the bottom of the clamp cover 740 may be closed to contact the filter sheet 610 and/or the ledge 330, and the third layer 730 may contact the bottom of the clamp cover 740.

The first and second layers 710 and 720 may be wedges that are stacked on top of each other to form a rectangle, and may be called first and second (i.e., upper and lower) wedges. A bottom surface of the second layer 720 may be relatively flat and coupled to a flat top surface of the third layer 730. The third layer 730 may be a holding block that holds down the filter sheet 610'. The third layer 730 may have an upper section having the top surface and a lower section having a bottom surface which is configured to clamp the filter sheet 610. The first layer 710 may be moveable or slideable with respect to the second layer 720, while the third layer 730 may be fixed (e.g., adhered or pressed-fit via grooves and protrusions) to the second layer 720. As an alternative, the second and third layers 720 and 730 may be formed integrally or permanently fixed so as to form one unitary holding block.

The bottom surface of the third layer 730 may include an opening (e.g., slit or slot) 730A (FIG. 10B) that aligns with the slit 330a of the ledge 330 of the frame 300. The blade 701 may protrude through the slits 330a and 730A of the ledge 330 and third layer 730, respectively, while the bottom surface of the third layer 730 may move down and up to clamp and unclamp the filter sheet 610 depending upon a state of the clamp 750.

A top surface of the second layer 720 may be inclined downward from a first side (i.e., a right side in FIG. 6B) of the frame 300 toward a second side (i.e., a left side in FIG. 6B) of the frame 300 such that a thickness of the second layer 720 at the first side is greater than a thickness of the second layer 720 at the second side. A bottom surface of the first layer 710 may be inclined downward from the first side of the frame 300 toward the second side of the frame 300 such that a thickness of the first layer 710 at the second side is greater than a thickness of the first layer 710 at the first side.

The clamp 750 may further include ledges 755 and leaf springs 760 to facilitate a clamping motion. The ledges 755 may be formed as a stepped portion on an inner side of the clamp cover 740, but embodiments disclosed are not limited. For example, the ledges 755 may alternatively be coupled (e.g., bonded or welded) to a top of the ledge 330 of the frame 300. The upper section of the third layer 730 may be longer than a bottom section so as to have first and second (i.e., right and left) ends that protrude horizontally past the bottom section. First and second (i.e., right and left) ledges 755 may be provided below the first and second ends of the third layer 730, respectively. First and second (i.e., right and left) leaf springs 760 may be coupled to a top of the first and second ledges 755, respectively, or alternatively to a bottom of the upper section of the third layer 730 at positions above the first and second ledges 755. Bottoms of the first and second ends of the third layer 730 may be provided on top of the first and second leaf springs 760, respectively, such that the leaf springs 760 are provided between the ledges 755 and the third layer 730.

The bottom section of the third layer 730 may extend downward toward the ledge 330. Sides of the clamp cover 740 may be fixed to the side walls of the frame 300, and the bottom section of the third layer 730 may be exposed through the bottom opening of the clamp cover 740. As an alternative, if the ledges 755 are formed with the ledge 330 of the frame 300 instead of with the clamp cover 740, the clamp cover 740 may have a bottom surface having a contour corresponding to a contour of the third layer such that the clamp cover 740, and not the third layer 730, contacts the leaf springs 760 and the filter sheet 610.

A top surface of the first layer 710 may be formed with teeth 711 in a section at the second side where the second layer 720 is thinnest and the first layer 710 is thickest, as opposed to the first side, where the first layer 710 is thinnest. The teeth 711 may be exposed through an upper opening formed in a top of the clamp cover 740 to engage with a clamp gear 742. The clamp motor 741 may be configured to rotate the clamp gear 742.

When the clamp motor 741 is turned on, the clamp gear 742 may turn to push the teeth 711 and thus the first layer 710 horizontally with respect to the second layer 720. Due to the inclination of the bottom surface of the first layer 710 and the top surface of the second layer 720, the second and third layers 720 and 730 may be pressed downward on the filter sheet 610 at sections of the filter sheet 610 that are in front of and behind the slits 330a and 730A (FIG. 10B) through which the blade 701 protrudes. Cutting by the blade 701 is more effective when the filter sheet 610 is clamped downward onto the ledge 330. A more detailed explanation of the clamping motion will be described with reference to FIGS. 6B and 6C.

Figure 6B:
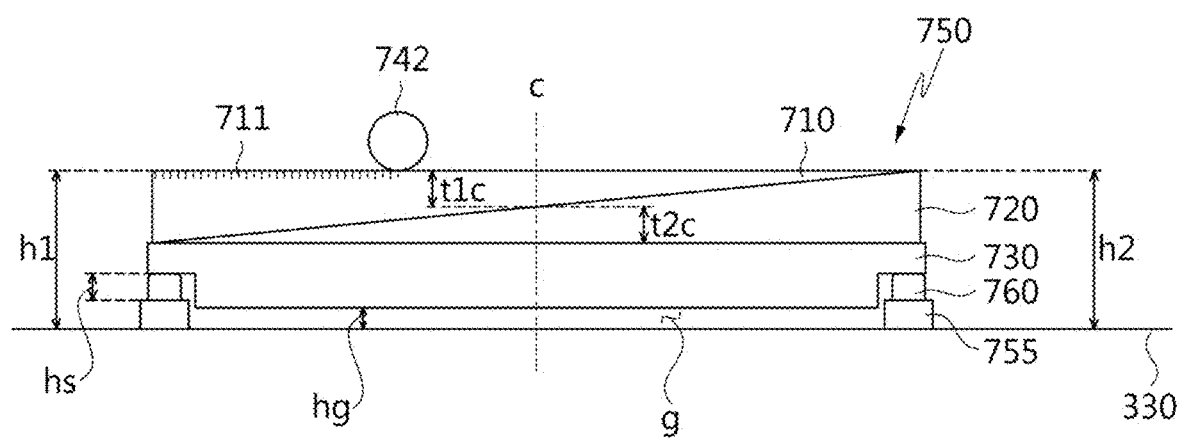
FIG. 6B is a front view of a clamp in an opened state.
Figure 6C:
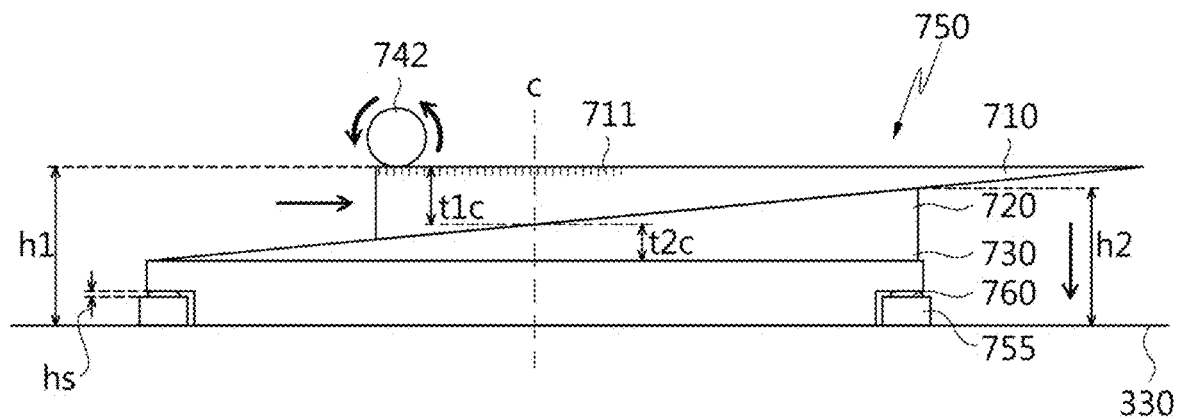
FIG. 6C is a front view of a clamp in a closed state.
Figure 7:
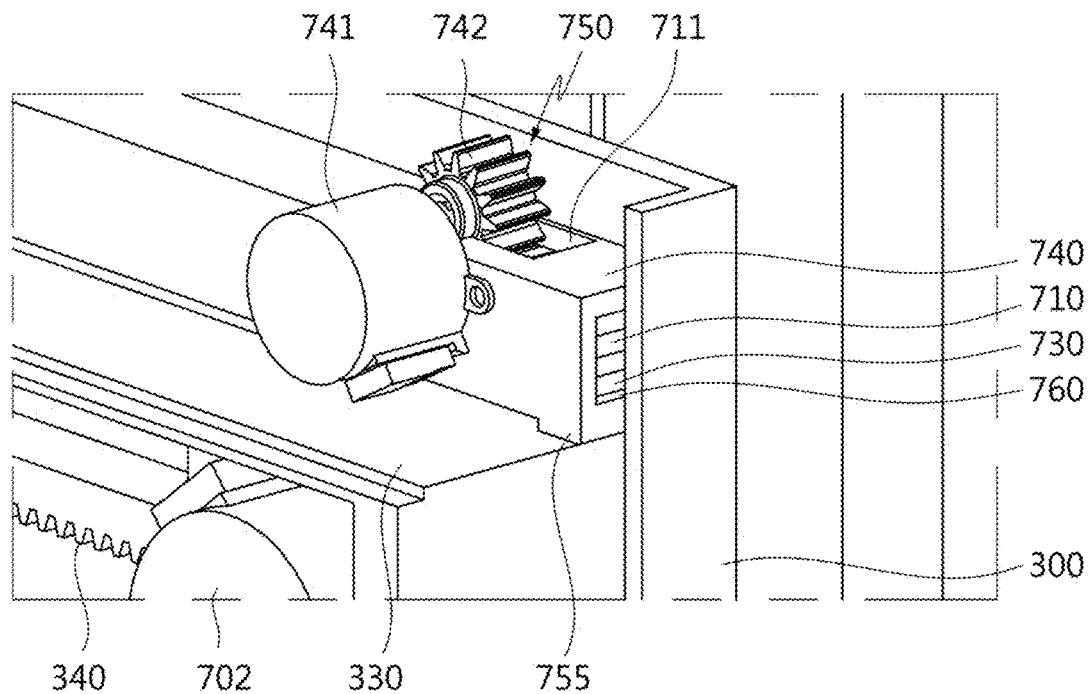
FIG. 7 is an enlarged perspective view of a clamp.
Figure 8:
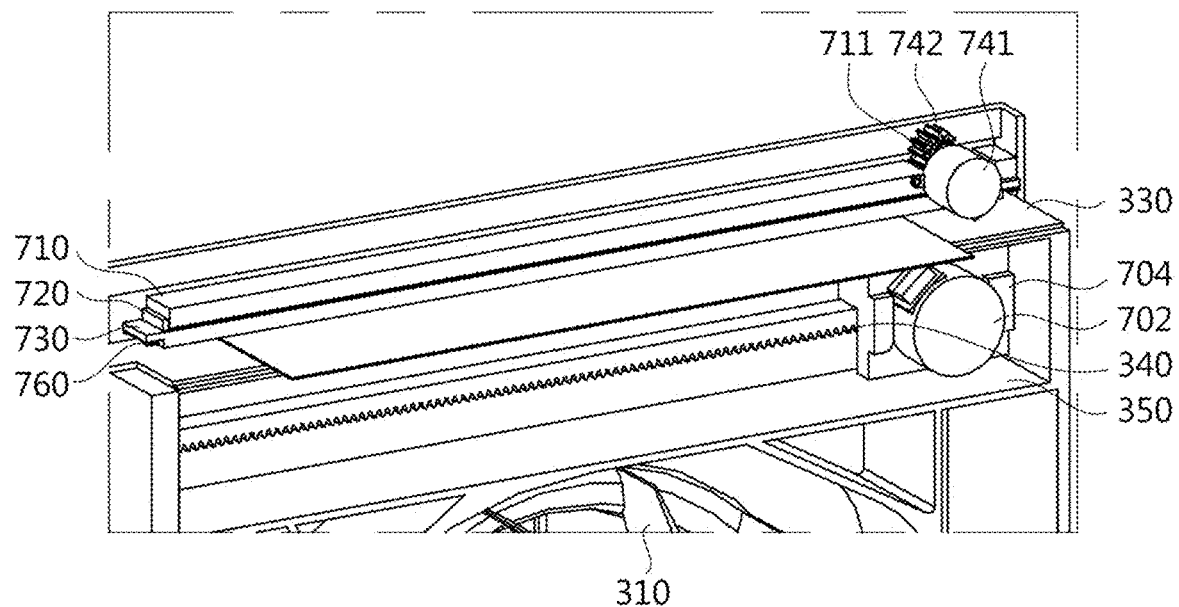
FIG. 8 is a perspective view of the clamp and a motor and a rack of the filter cutter.

FIGS. 6B and 6C show a perspective from a front side of the air cleaner 1, while FIGS. 7 and 8 show a perspective from a rear side of the air cleaner 1. FIGS. 6B and 6C omit the clamp cover 740. In describing the motion of the clamp 750, lower case letters will denote variables, while upper case letters will denote constant or fixed values. Some of the angles, inclinations, sizes, and proportions of FIGS. 6B and 6C are exaggerated to emphasize a movement of the first layer 710 with respect to the second layer 720.

Referring to FIG. 6B, an initial or opened state of the clamp 750 may leave a gap g between the bottom of the third layer 730 and the ledge 330 of the frame 300. The gap g may align with the slit 320 formed in the front of the frame 300. The gear assembly 220 (FIG. 4) may feed the filter sheet 610 through the slit 320 and the gap g before cutting.

At the initial state of the clamp 750, the first and second leaf springs 760 may be uncompressed so that each have a height $h_s$ that initially equals L1. A height $h_g$ of the gap g may initially equal G1. The height $h_1$ from the ledge 330 to a top of the first layer 710 may equal H1. The height $h_2$ from the ledge 330 to a top of the second layer 720 at its thickest point may initially equal H1. The thickness $t1_c$ of the first layer 710 at a central vertical axis c may initially equal D1. The thickness $t2_c$ of the second layer 720 at the axis c may equal D2.

Referring to FIG. 6C, the clamp gear 742 may be rotated in a first rotational direction (e.g., counterclockwise in FIG. 6C). The clamp gear 742 may engage with the teeth 711 formed in the first layer 710, and the first layer 710 may be pushed toward the first (i.e., right) side. As the first layer 710 is pushed rightward, the thickness $t1_c$ of the first layer 710 at the axis c may increase to be greater than D1. However, because the second layer 720 has not moved, the thickness $t2_c$ of the second layer 720 may remain constant at a thickness of D2.

The clamp cover 740 may prevent the first layer 710 from rising and keep the top surface of the first layer 710 flat. Thus, instead of the first layer 710 rising, the second layer 720 may be lowered. The clamp cover 740 may further have a horizontal (i.e., right-left) length larger than a horizontal length of the first layer 710 to accommodate the movement of the first layer 710. Due to the increased thickness $t1_c$ of the first layer 710, the second layer 720 may be pushed downward such that the height $h_2$ from the ledge 330 to the top of the second layer 720 decreases to be lower than H1. A change in height $h_2$ of the second layer 720 from the ledge 330 ($\Delta h_2$) may be equal to the change in thickness $t1_c$ of the first layer 710 ($\Delta t1_c$).

The second layer 720 may push the third layer 730 downward to compress the leaf springs 760 such that the height $h_s$ of the leaf springs 760 decrease to be less than L1. A change in height $h_s$ of the leaf springs 760 ($\Delta h_s$) may be equal to the change in thickness $t1_c$ ($\Delta t1_c$) and therefore also equal to the change in height $h_2$ of the second layer 720 ($\Delta h_2$).

As the third layer 730 is moved downward, the bottom section of the third layer 730 may approach the ledge 330 such that the height $h_g$ of the gap g decreases to be less than G1. A change in the height $h_g$ of the gap g ($\Delta h_g$) may equal the change in thickness $t1_c$ ($\Delta t1_c$), the change in height $h_2$ of the second layer 720 ($\Delta h_2$), and the change in heights $h_s$ of the leaf springs 760 ($\Delta h_s$).

Thus, during a movement of the clamp 750, $\Delta t1_c = \Delta h_2 = \Delta h_s = \Delta h_g$, while the height from the ledge 330 to the top of the first layer 710 $h_1$ remains constant at H1, in addition to a horizontal position and thickness $t2_c$ of the second layer 720. A horizontal position of the third layer 730 and thickness of the third layer 730 at the axis c may also remain constant. As the horizontal position of the first layer 710 changes, the vertical positions of the second and third layers 720 and 730 change, while the vertical position of the first layer 710 remains the same. Since the first layer 710 is not lowered, the teeth 711 may remain engaged with the clamp gear 742 such that the first layer 710 is prevented from sliding back toward the second (i.e., left) side.

The bottom surface of the third layer 730 may be flat so as to even out a downward force on the filter sheet 610, as the downward force on the first side (i.e., right side) of the second layer 720 may be a bit greater than the downward force on the second side (i.e., left side) of the second layer 720. The length of the bottom section of the third layer 730 may be greater than or equal to a sum of the height of the ledge 755 and a height of the leaf springs 760 $h_s$ when fully compressed so that eventually, the bottom section of the third layer 730 may contact the ledge 330 of the frame 300 to close the gap g in a final or closed state of the clamp 760.

At the final or closed state of the clamp 760, the gap g will be closed such that the height of the gap $h_g$ will equal 0. In such a state, the thickness $t1_c$ of the first layer 710 at the axis c may equal D3, which is greater than D1. The height $h_s$ of the leaf springs 760 may equal L2, which is less than L1. L2 may represent a partially compressed state or a fully compressed state, depending on a length of the bottom section of the third layer 730. The height $h_2$ from the ledge 330 to the top of the second layer 720 may equal H2, which is less than H1. Since $\Delta t1_c = \Delta h_2 = \Delta h_s = \Delta h_g$, then $|(D3-D1)|=|(H2-H1)|=|(L2'L1)|=G1$.

Cutting may be easiest when the clamp 750 is in the closed state, while feeding of the filter sheet 610 may be easiest when the clamp 750 is in the opened state. Feeding of the filter 610 may occur upon installation of a new roller 620 in the roll filter cartridge 200 and when the filter sheet 610 is dirty and needs to be cut. Immediately after cutting off a dirty section of the filter sheet 610, the clamp 750 may be held in the closed state to hold down a front, uncut edge of the filter sheet 610 and to keep the clean section of the filter sheet 610 facing the pre-filter 500 tense and secure. As an alternative, the clamp 750 may be opened, while the filter sheet 610 may primarily be secured between the upper and lower rollers 225 and 224. Optionally, after the clamp 750 is opened, the filter sheet 610 may be slightly unwound by the upper and lower rollers 225 and 224 to draw out a sufficient amount (e.g., an inch) of filter sheet 610 to be clamped down during an operation of the air cleaner 1. After the filter sheet 610 has been slightly unwound, the clamp 750 may return to a closed state.

To open the gap g, the clamp gear 742 may be rotated in a second rotational direction opposite to the first rotational direction (i.e., clockwise in FIGS. 6B and 6C). The thickness $t1_c$ of the first layer 710 at the axis c may decrease to approach D1, reducing a downward force applied to the leaf springs 760. A restoring force of the leaf springs 760 may decompress the leaf springs 760 such that the height $h_s$ of the leaf springs 760 increase to approach L1. The third layer 730 may be pushed upward by the restoring force of the leaf springs 760, and the second layer 720 may be pushed upward such that the height $h_2$ from the ledge 330 to the top of the second layer 720 is increased to approach H1. As the third layer 720 is moved upward, the gap g may open such that the height $h_g$ of the gap g approaches G1. The leaf spring 760 may alternatively be implemented as another type of spring or elastic material (e.g., coil spring). As another alternative, the ledge 755 may be omitted, while a length of the leaf spring 760 may be increased and/or a length of a bottom section of the third layer 730 may be decreased accordingly. In such an alternative, the length of the bottom section of the third layer 730 may be greater than or equal to a length of the leaf spring 760 in a fully compressed state.

Referring to FIGS. 7-11, the blade motor 702 and the blade housing 704 may be provided under the ledge 330 and clamp 750. The blade motor 702 may be provided in or coupled to a side of the blade housing 704. The blade 701 may be a metal blade or razor provided between a base 701A and a cap or cover 701B. The base 701A may be fixed to an upper surface of the blade housing 704, and the blade 701 may protrude through the slit 330a in the ledge 330 and the slit 730A for the third layer 730 of the clamp 750. The cap 701B may cover a top of the blade 701 to prevent accidental cuts of fingers, etc., during replacement of the blade 701, while first and second sides (i.e., left and right sides) of the blade 701 may be configured to cut the filter sheet 710. The cap 701B may extend into the slit 730A of the third layer 730, while a height of the blade 701 may be configured such that the side of the blade 701 overlaps with the filter sheet 610, which may rest on the ledge 330 of the frame 300.

A rack 340 may protrude from a rear of the frame 300 to be between the ledge 330 and the beam 350. The rack 340 may extend between sides of the frame 300. A bottom surface of the rack 340 may include teeth configured to engage with a blade gear 703, which may be rotated by the blade motor 702. When the blade motor 702 is turned on, the blade gear 703 may move along the rack 340 to move the blade motor 702, blade housing 704, and blade 701 between sides of the frame 300. The slits 330a and 730A may have a left-right length that are less than or equal to a left-right length of the rack 340, and the blade 701 may move along the slits 330a and 730A of the ledge 330 and third layer 730 of the clamp 750.

A section of the blade housing 704 may be stepped or protruded forward to be seated on top of the rack 340 to provide added support to the blade housing 704. The top of the rack 340 may be optionally coated in a material configured to reduce friction between the blade housing 704 and the rack 340 during movement of the blade gear 703 along the rack 340.

The blade gear 703 may move from the first side to the second side of the fan housing 300 so that the second side of the blade 701 cuts the filter sheet 610. When the filter sheet 610 needs to be cut again, the blade gear 703 may move from the second side of the fan housing 300 to the first side of the fan housing 300 so that the first side of the blade 701 cuts the filter sheet 610. Since the blade gear 703 may move across the rack 340 once per cut, the blade 701 may be preserved. Although the figures show that the teeth of the rack 340 are formed on the bottom surface, alternatively, the teeth of the rack 340 may be formed on an upper surface.

Figure 9A:
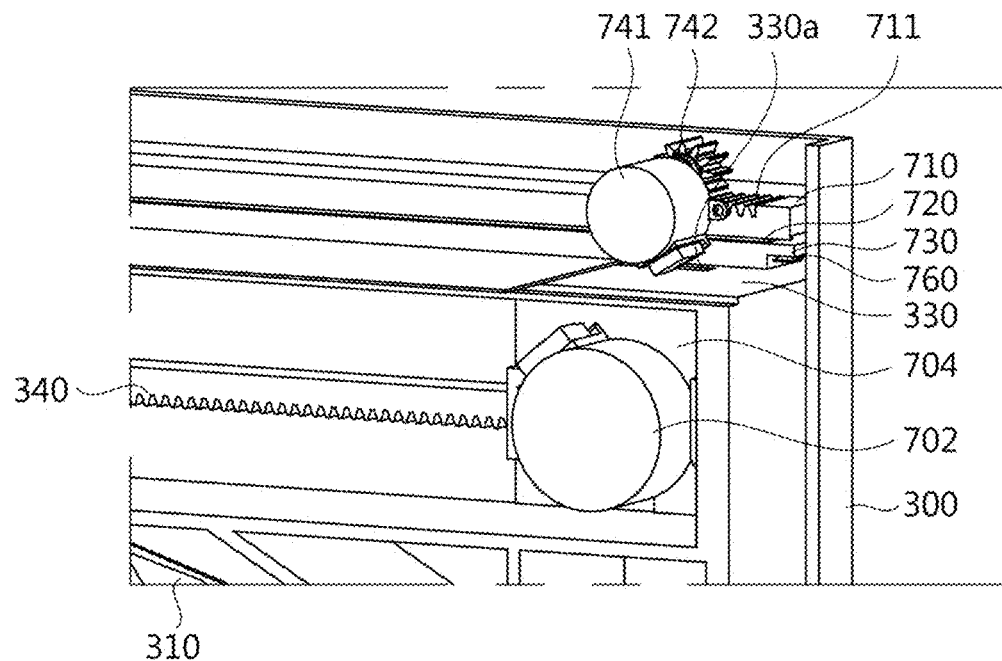
FIG. 9A is an enlarged perspective view of the clamp, the motor, and the rack of the filter cutter.
Figure 9B:
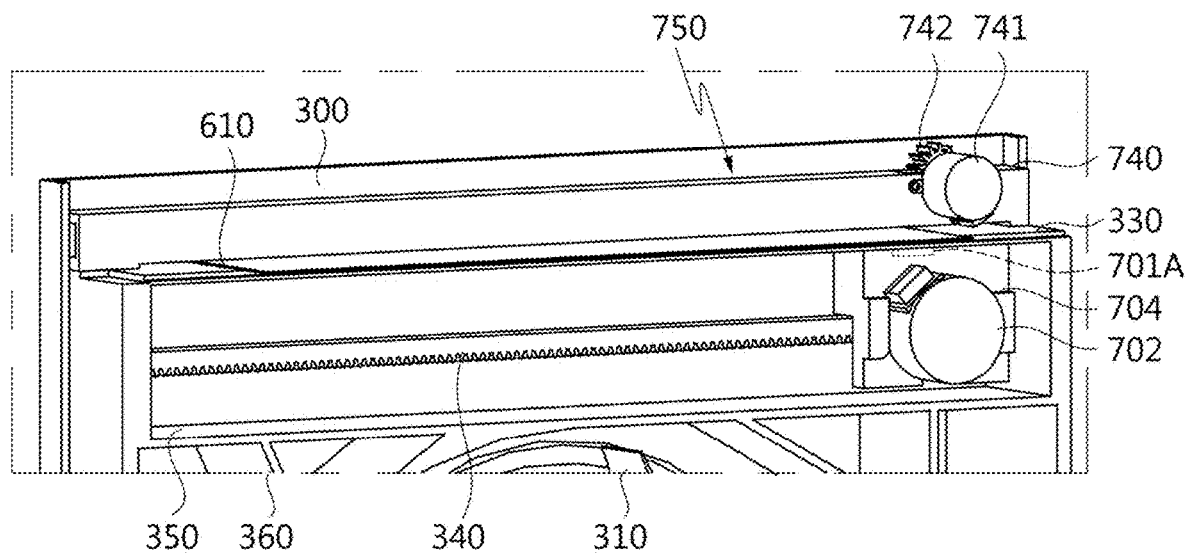
FIG. 9B is a perspective view of the clamp, the motor, the rack, and a blade housing of the filter cutter.
Figure 10A:
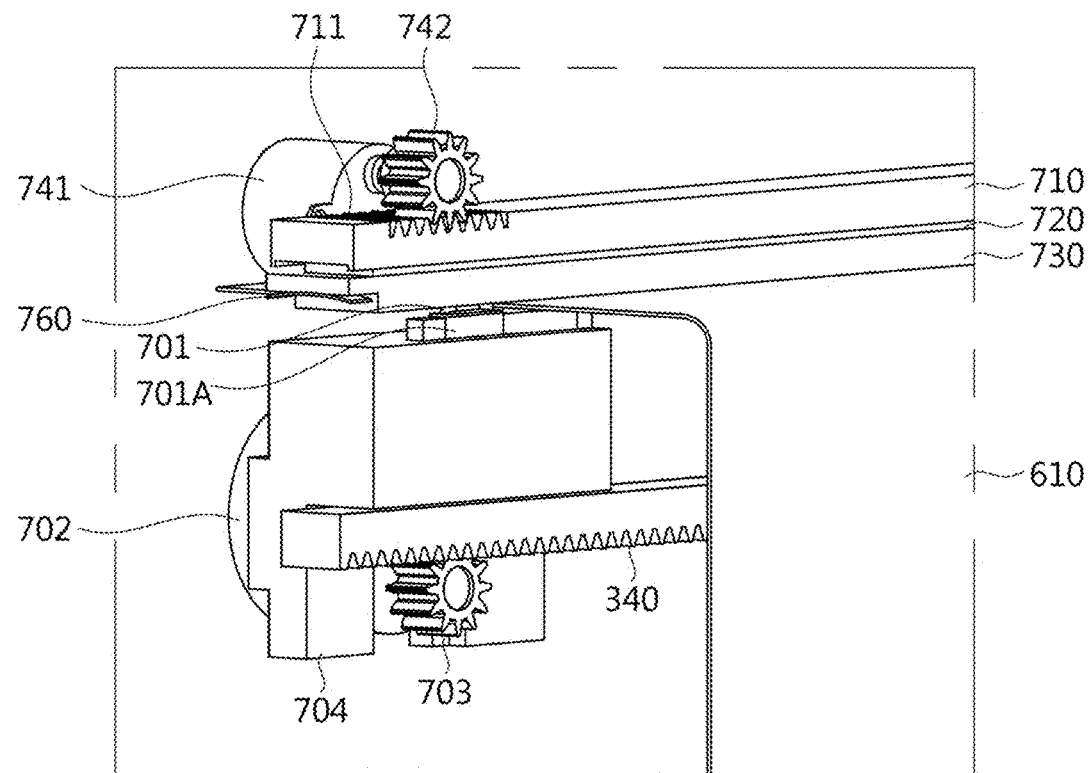
FIG. 10A is an enlarged perspective view of the clamp and the filter cutter without a frame from a front.
Figure 10B:
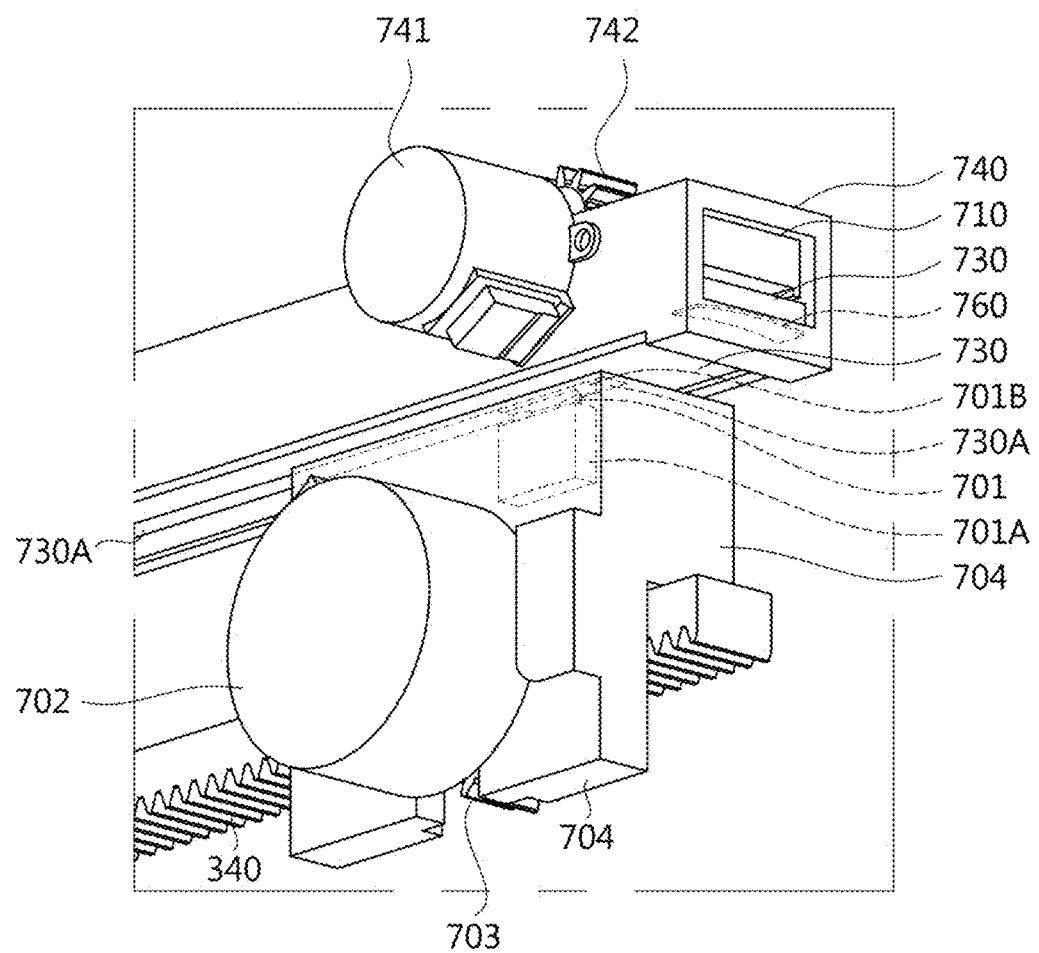
FIG. 10B is an enlarged perspective view of the clamp, the rack, the blade housing, the blade, and a slot of the clamp from a rear.

As shown in FIGS. 4 and 9A-9B, the clamp 750 may be provided to contact a rear surface of the frame 300. The blade housing 704 may also be adjacent to the rear surface of the frame 300, but may not contact the rear of the frame 300 so as to reduce friction during movement. Alternatively, the blade housing 704 and the rear of the frame 300 may be coated in a slippery material to facilitate movement.

Referring to FIGS. 9A-10B, the blade housing 704 may be provided under the clamp 750. The blade may protrude through the slit 330a of the ledge 330 and into an inside of the clamp 750 via the slit 730A of the third layer 730. The slit 730A formed in the third layer 730 of the clamp 750 may define a movement path of the blade 701. The left-right length of the slit 730A may be longer than a length of the filter sheet 610 so that the filter sheet 610 may be fed onto the ledge 330 to be between a leftmost position of the blade 701 and a rightmost position of the blade 701.

As an alternative to the blade 701 being inserted into the clamp assembly 750, the slit 730A may be omitted, and the blade 701 may be provided very close to a side or edge of the clamp 750. As one example, the blade 701 may be provided between the clamp 750 and the rear surface of the frame 300 so that the blade 701 cuts the filter sheet 610 at a section tensed between the clamp 750 and the gear assembly 220. In such an alternative embodiment, the clamp 750 may be spaced apart from the rear surface of the frame 300, while the blade housing 704 remains adjacent to the rear surface of the frame 300. The slit 330a may be formed on the ledge 330 at a position between the clamp 750 and the rear surface of the frame 300, and the blade 701 and cap 701B may protrude through the slit 330a and be exposed. The filter sheet 610 may be tensed between the upper and lower rollers 225 and 224 (FIG. 5) and the clamp 750, and the blade 701 may cut the tensed portion of the filter sheet 610. The filter sheet 610 may be secured between the upper and lower rollers 225 and 224 during an operation of the fan 310, and the clamp 750 may be opened after cutting so that the user may easily pull the filter sheet 610 out of the rear cover 400 for disposal.

As another alternative example where the blade 701 is not inserted into the clamp 750, the blade 701 may be positioned at a rear of the clamp assembly 750 to cut a section of the filter sheet 610 as close as possible to the clamp. In such an alternative embodiment, the clamp 750 may remain adjacent to the rear surface of the frame 300, while the blade housing 704 and rack 340 may protrude rearward so that the blade 701 may be positioned very close to a rear side of the clamp 750 (instead of penetrating through it) so as to efficiently cut the filter sheet 610 after the filter sheet 610 has been fed through the clamp 750. In such an embodiment, after the filter sheet 610 has been cut, the clamp 750 may remain in a closed position to keep the clean section of the filter sheet 610 facing the pre-filter tensed during operation of the air cleaner 1. Embodiments disclosed herein are not limited to such a configuration of the clamp 750, rollers 225 and 224, and blade 701.

Referring back to FIGS. 7-11, an operation of the filter cutter 700 may be started a predetermined time after an operation of the gear assembly 220 has completed, which may be determined based on a number of turns of the gear motor 221 or based on markings passing through the gear assembly 220. The predetermined time may account for a time needed for the clamp 750 to clamp down the filter sheet 610.

Alternatively or in addition thereto, an operation of the filter cutter 700 may be started automatically after a lowering of the clamp 750. The clamp 750 may include a sensor to sense a rotation of the clamp gear 742, and when the clamp gear 742 has stopped rotating, the blade motor 702 may be operated to cut the filter sheet 610.

Control methods of the filter cutter 700 are not limited. As another alternative, the blade motor 702 may be operated once the gear sensor senses a predetermined number of turns of the clamp gear 742. The predetermined number of turns may correspond to a number of turns of the clamp gear 742 needed to move the first layer 710 a sufficient distance to close the gap g and hold down the filter sheet 610. As another alternative, a markings sensor may be provided in the base 701A of the blade 701 to sense markings or serrations on the filter sheet 610, and an operation of the blade motor 702 may not begin until the clamp gear 642 has stopped turning and the markings sensor of the blade 701 senses markings on the filter sheet 610.

In order to keep track of a movement of the blade 701, a motor or gear sensor may be provided to sense a rotation of the blade motor 702 or blade gear 703. The blade motor 702 may not be turned off until the gear sensor senses a predetermined number of turns of the blade motor 702 or blade gear 703. The predetermined number of turns may correspond to the blade housing 704 being moved completely across the filter sheet 610. As an alternative, if the markings sensor is provided in the base 701A of the blade 701, the markings sensor may sense a number of markings or serrations that the blade 701 has passed over, and the blade motor 702 may be turned off when the markings sensor senses a predetermined number of markings, which may be equal to a number of markings provided across the filter sheet 610.

The user may also control the blade motor 702 via the user interface to direct when to cut the filter sheet 610. The controller may determine via the motor or gear sensor in the gear assembly 220 how much of the filter sheet 610 has been cut to predict when the filter sheet 610 is close to running out. The display on the outer case 100 and/or the roll filter case 200 may indicate to a user when to replace the roll filter 600.

Referring to FIGS. 4-11, the user may install the roll filter 600 in the roll filter cartridge 200 by placing the roller 620 at a bottom and unwinding the filter sheet 610 upward. The filter sheet 610 may be fed through the upper and lower rollers 225 and 224 of the gear assembly 220. An end of the filter sheet 610 may be held between the upper and lower rollers 225 and 224 so that the filter sheet 610 remains secured as the fan 310 suctions air. The end of the filter sheet 610 may additionally be fed through the slit 320 and the gap g via the gear assembly 220 to be further secured under the clamp 750 during an operation of the fan 310. The front cover 210 may be pressed-fit onto the support 250 of the roll filter cartridge 200 to further secure the filter sheet 610 in place.

The filter sheet 610 may collect oil mist and fine dust. Regular filters that collect oil mist may be hard to clean, but the filter sheet 610 may simply be discarded. The controller may determine that the filter sheet 610 has reached a predetermined contamination level or more and operate the roller motor 221 and then the blade motor 702 accordingly.

This determination of the contamination level by the controller may be based on a variety of implementations of sensors. For example, there may be an air flow sensor provided in front of the filter sheet 610 and another air flow sensor provided behind the filter sheet 610, and the controller may compare measurements. When a difference in sensed air flow is greater than a predetermined amount, the controller may determine that the filter sheet 610 has reached the predetermined contamination level or more. As another example, there may be an air quality sensor provided inside of the roll filter case 200 to sense an air quality (e.g., oil level, dust level, carbon dioxide or smoke level, carbon monoxide level, or odor level), and the controller may determine that the filter sheet 610 has reached the predetermined contamination level or more based on detections by the air quality sensor.

As another example, the filter sheet 610 may be configured to change color when the filter sheet 610 has absorbed a predetermined amount of oil or dust or based on a weight of the filter sheet 610, and the user may input a command and/or there may be a light sensor or other sensor configured to alert the controller when the color of the filter sheet 610 has changed. In yet another example, a cooking frequency may be determined based on a sensor sensing an operation of the fan 310 or based on data stored in a memory keeping track of user commands, and when the cooking frequency has reached a predetermined number of times or more, the controller may estimate that the filter sheet 610 has reached the predetermined contamination level.

When the controller determines that the filter sheet 610 has reached the predetermined contamination level, the clamp motor 741 may be turned on to open the clamp 750, and the roller motor 621 may be turned on to feed the filter sheet 610 between the upper and lower rollers 225 and 224, through the slit 320 of the frame 300, and through the gap g of the clamp assembly 750. The controller may automatically stop the roller motor 621 when the filter sheet 610 has been fed or unwound by a predetermined amount, which, as previously described, may be based on a number of turns of the roller gear 222, a markings sensor, etc. As the filter sheet 610 unwinds, a new, clean section of the filter sheet 610 may extend between the roller 620 and the top of the roll filter cartridge 200, while a portion of the dirty section may hang out of the slit 420 of the rear cover 400.

When the filter sheet 610 has been unwound by the predetermined amount, the controller may control the clamp motor 741 to close the clamp 650. The controller may operate the blade motor 702 based, as previously described, upon an operation of the clamp motor 741, gear assembly 220, a marking sensor in the gear assembly 220 or base 701A of the blade 701, etc. The user may also input a command via the user interface to cut the filter sheet 610 when the user sees that the filter sheet 610 is hanging out of the slit 420 of the rear cover 400.

The controller may determine that the blade 701 has cut across the filter sheet 610 (e.g., from the first side of the frame 300 to the second side of the frame 300) based on an operation of the blade motor 702 or based on the markings sensor provided in the base 701A of the blade 701. Since the blade 701 may cut from both left and right sides, when the blade 701 has cut across the filter sheet 610, the controller may not operate the blade motor 702 to reverse a direction of the blade gear 703 until the next time the filter sheet 610 is cut. Alternatively, the blade 701 may be configured to cut from one side, in which case the controller may operate the blade motor 704 to reverse a direction of the blade gear 703 and return the blade 701 back to the first side of the frame 300. The user may discard the cut off section of the filter sheet 610. Implementations of how the controller controls an unwinding and cutting of the filter sheet 610 are not limited to the above-described implementations.

Figure 12:
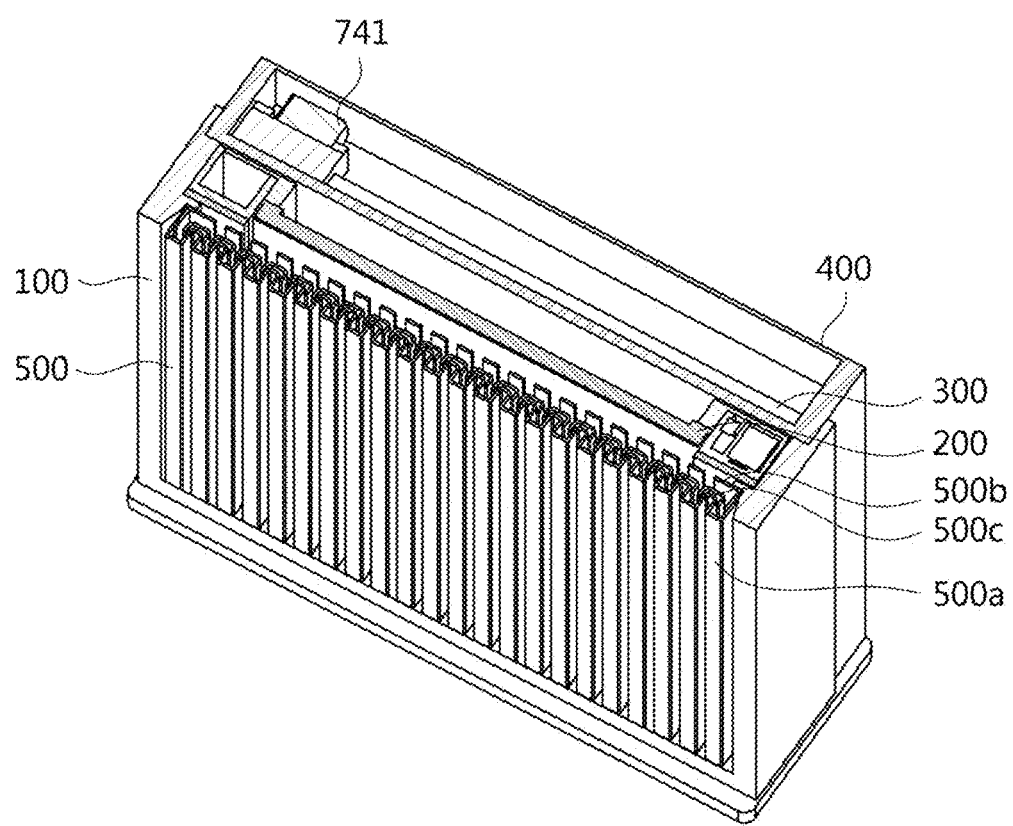
FIG. 12 is a top cut view of the air cleaner of FIG. 1.
Figure 14A:
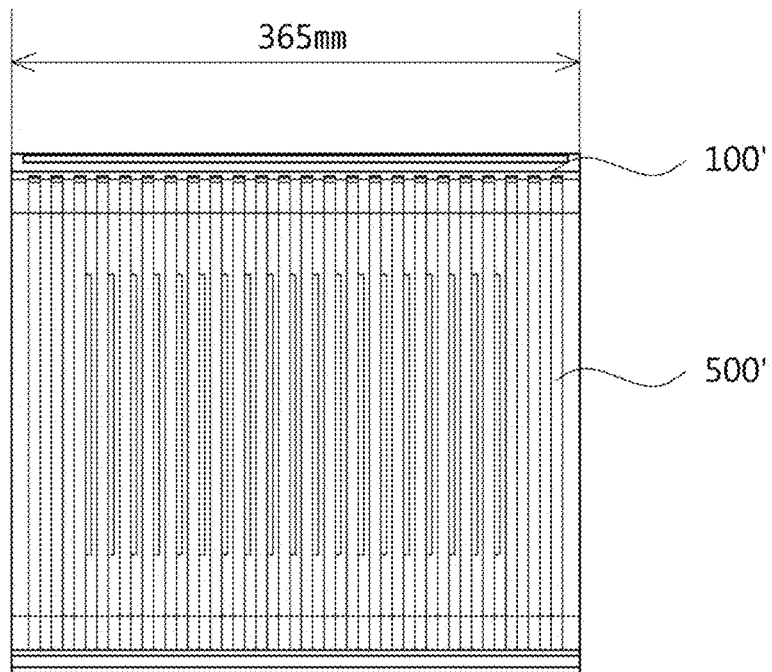
FIG. 14A is a front view of the air cleaner of FIG. 13.
Figure 14B:
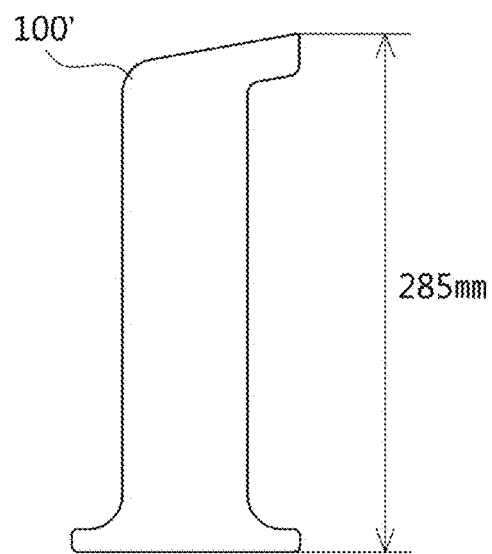
FIG. 14B is a side view of the air cleaner of FIG. 13.

Referring to FIG. 12, the pre-filter 500 may have an accordion shape or a plurality of curves and bends to filter large particles of foreign matter from suctioned air. The pre-filter 500 may include a first or front grill 500a, a second or rear grill 500b, and a third or inner grill 500c provided between the first and second grills 500a and 500b. The first grill 500a may have slats in a zig-zag pattern, accordion pattern, or a pattern of alternating rectangular bends, C-Bends, |_|-bends, or U-bends. Openings may be formed at rearmost surfaces of the bends and/or in side surfaces of the bends. The second grill 500b may be a plate having a plurality of openings. The plurality of openings in the second grill 500b may align with the openings of the first grill 500a, or alternatively may be staggered with the openings of the first grill 500a. The third grill 500c may include a plurality of slats that are bent or curved to correspond to the slats of the first grill 500a. The slats of the third grill 500c may align with the openings or rear most surfaces of the first grill 500a, or alternatively may be staggered.

A top of the pre-filter 500 may include at least one magnet so as to be secured to a magnet or ferromagnetic material of the outer case 100. Alternatively, sides or a bottom of the pre-filter 500 may include a magnet. As another alternative, the outer case 100 may include at least one magnet at an edge of the front opening, and the pre-filter 500 may be made of a ferromagnetic material.

FIGS. 13 through 15B illustrate an air cleaner 1' according to an alternative embodiment. In terms of function, the air cleaner 1' may be very similar to the air cleaner 1 described with reference to FIGS. 1-12, and differences may be primarily described. The air cleaner 1' may have an outer case 100' having a front opening in which a pre-filter 500' is secured. A rear cover 400' may be secured to a rear opening of the outer case 100'.

Figure 17:
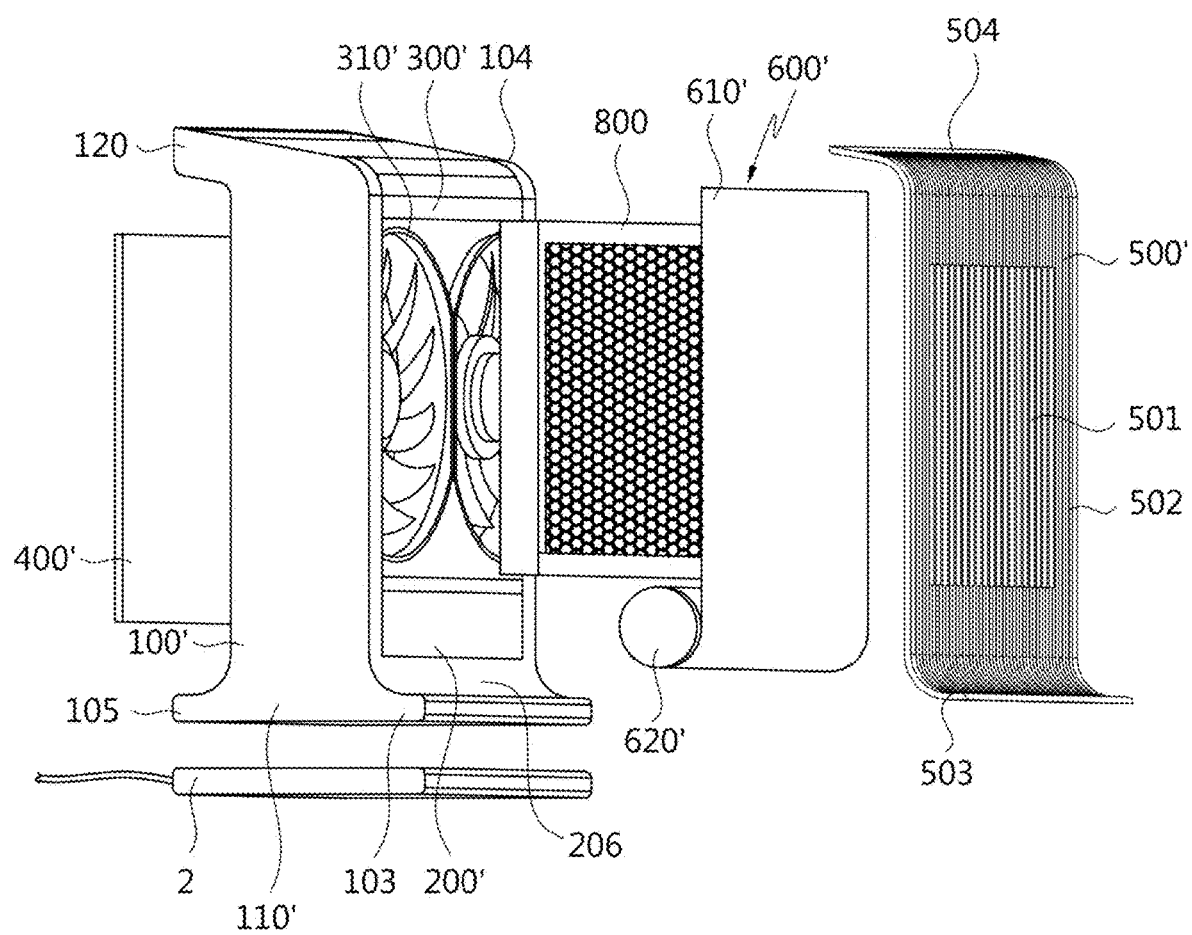
FIG. 17 is an exploded view of the air cleaner of FIG. 13.
Figure 20:
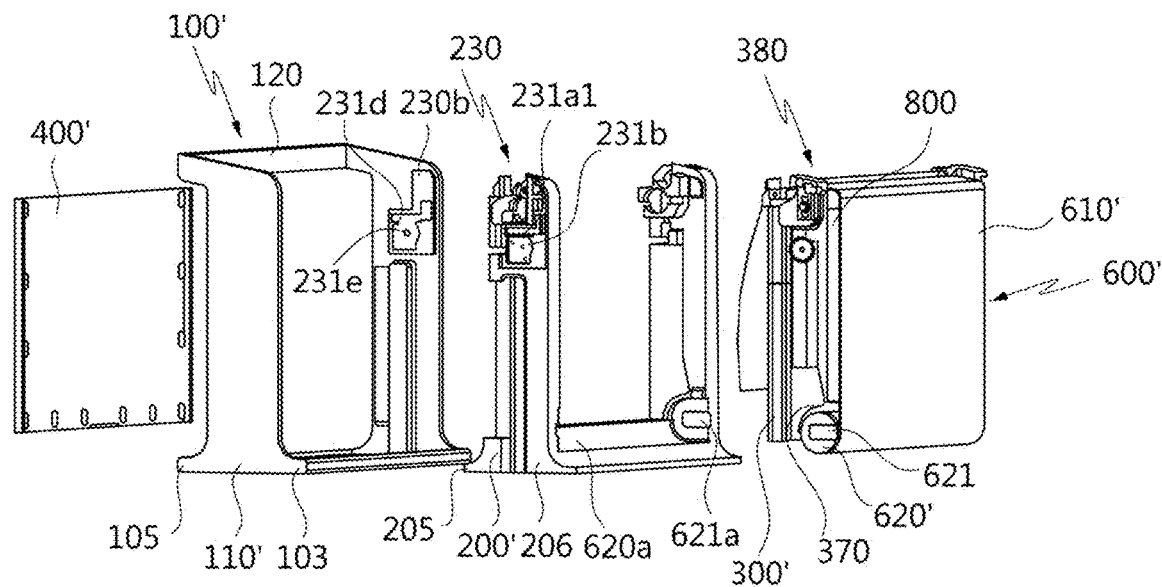
FIG. 20 is an exploded view showing an outer case and a roll filter frame.

Referring briefly to FIGS. 17 and 20, between the pre-filter 500' and the rear cover 400', a roll filter 600' may be provided behind the pre-filter 500' to filter oil mist, a frame 300' supporting at least one fan 310' may be provided behind the roll filter 600' to suction air, and an optional carbon filter 800 may be provided between the roll filter 600' and the frame 300' to further filter suctioned air. The roll filter 600' may be substantially similar to the roll filter 600 described with reference to FIGS. 1-12, and the frame 300' may similarly include a filter cutter 700' (FIG. 23) substantially similar to the filter cutter 700 described with reference to FIGS. 1-12. The roll filter 600' may be made out of a hybrid material having both fibers and a carbonized material to filter both oil mist and odorants. Finer dust may be filtered by the carbon filter 800.

Referring back to FIGS. 13-15B, the outer case 100' may be made of a metallic material (e.g., stainless steel or brushed stainless steel), and the pre-filter 500' may be made of a similar metallic material or a painted metallic material (e.g., black metal). The pre-filter 500' may have a plurality of vertical slats and openings through which suctioned air may enter.

Tops of the slats of the pre-filter 500' may be curved such that the pre-filter 500' has an upper section 504, and the front opening of the outer case 100' may be partially formed in a curved upper surface of the outer case 100'. Alternatively, the upper surface of the outer case 100' may be formed with a recess in which the upper section 504 of the pre-filter 500' may be provided. Bottoms of the slats of the pre-filter 500' may be curved such that the pre-filter 500' has a lower section 503, and the front opening of the outer case 100' may be partially formed in a curved lower surface or section of the outer case 100'. Alternatively, the lower surface of the outer case 100' may be formed with a recess in which the lower section 503 of the pre-filter 500' may be provided. More details on the shape and coupling of the pre-filter 500' will be described with reference to FIGS. 17-19.

The air cleaner 1' may designed based on standard dimensions of a countertop, standard dimensions of home appliances, or standard dimensions of cookware. For example, in the U.S., a standard depth of a kitchen countertop may be 24-26 inches (e.g., 25.5 inches), and a length from a first side (i.e., left side) of the outer case 100' to a second side (i.e., right side) of the outer case 100' may range from 23-26 inches (e.g., 25.5-25.6 inches, or 647-650 mm) so that the air cleaner 1' may be seated on a countertop such that the pre-filter 500' faces a cooktop or stovetop. The height of the outer case 100' may be less than a length of the outer case 100' (e.g., 11.2 inches or 285 mm), but embodiments disclosed herein are not limited. As an example, a ratio of the length to the height may be 1.25-1.26, and the height of the outer case 100' may be 508 mm-516 mm when the length is 650 mm. A thickness or width defined from the front to the rear may be 76 mm at a smallest point, which will be described in more detail later.

As another example, some cookware in the U.S. may range from 12-18 inches, and the length of the outer case 100' may range from 12-18 inches (e.g., 14.4 inches, or 365 mm) so that the outer case 100' may be seated on a countertop next to a stove top such that the pre-filter 500' faces cookware on the stovetop. The height of the outer case 100' may be less than a length of the outer case 100' (e.g., 11.2 inches or 285 mm), but embodiments disclosed herein are not limited. In a similar example, the outer case may be 300 mm long and 240 mm high to correspond to smaller cookware. The outer case 100' (along with the outer case 100 described with Reference to FIGS. 1-12) may be configured to have a length that is shorter than a length and/or a width of an average cooktop surface.

The air cleaner 1' may be lifted and transported to be near other cooking appliances as needed (microwave, toaster oven, air fryer, rice cooker, etc.). Although the air cleaner 1' may be designed based on countertop size or cookware size, alternatively, the air cleaner 1' may be designed to be even shorter (e.g., a height of 6 inches or 152 mm) be more portable or slimmer to fit in smaller spaces (e.g., on a ledge behind a cooktop, on top of a cabinet, between a toaster oven and a wall, etc.). Alternatively, the air cleaner 1' may be designed to be a bit bigger (e.g., 36 inches or 900 mm) to suction more air.

A center section 502 may extend between the upper and lower sections of the pre-filter 500'. The openings between the slats of the pre-filter 500' may be formed as center openings 501 formed in the center section 502 of the pre-filter 500', while the upper and lower sections 504 and 503 of the pre-filter 500' may not have openings. A solid surface may be provided under the slats in the upper and lower sections 504 and 403, in addition to sides and a top and bottom of the center section 502. There may not be a surface behind the center openings 501 to allow suctioned air therethrough.

The outer case 100' may have a rear opening in which a rear cover or case 400' is provided. The rear cover 400' may be made of a same or similar material as the pre-filter 500' or, alternatively, as the outer case 100', but embodiments disclosed herein are not limited. The rear cover 400' may include a plurality of openings through which air is discharged. A bottom rear of the outer case 100' may be curved. The rear cover 400' may be formed as a plate that, when coupled to the rear opening of the outer case 100' becomes flush with a rear of the outer case 100'. Alternatively, a bottom section of the rear cover 400' may be curved to correspond to a curvature of the outer case 100'. In such a configuration, the bottom rear of the outer case 100' and/or a inner support 200' may include a recess or opening in which the curved bottom section of the rear cover 400' may be provided. Details on the rear cover 400' will be provided with reference to FIGS. 17-19.

The outer case 100' may be formed with a handle 120 to facilitate transportation and portability. The handle 120 may extend upward and rearward to be slightly inclined from sides of the outer case 100'. The handle 120 may be formed integrally with the outer case 100' so as to maintain stability and durability of the handle 120 and outer case 100'; however, embodiments of the handle 120 are not limited.

A base 110' may be provided below the outer case 100'. The base 110' may be formed of a same or similar material of the outer case 100' so as to provide a uniform and sleek appearance. The base 110' may be configured to sit on a wireless charging pad 2. Details of a shape of the outer case 100' will be described in more detail with reference to FIGS. 17-19.

The wireless charging pad 2 may be plugged into an external or commercial power supply (e.g., wall socket) and include a wireless power transmitter or wireless power transceiver. The base 110' may include a battery and a wireless power receiver or wireless power transceiver configured to engage with the wireless power transceiver in the charging pad 2. The battery of the base 110' may be wirelessly charged via the charging pad 2 and provide power for an operation of the air cleaner 1'. The wireless charging pad 2 may be configured to charge other portable devices such as mobile phones or tablets.

The base 110' may include an optional terminal or socket and/or a power cord configured to plug into an external or commercial power supply (e.g., wall socket). The wireless charging pad 2 may be optional if the base 110' is directly connected to an external commercial power supply.

A user interface 130 may be provided in an upper recess of the outer case 100' or alternatively to close an upper opening of the outer case 100'. The user interface 130 may indicate operation information of the air cleaner 1' and allow the user to input commands.

Figure 16A:
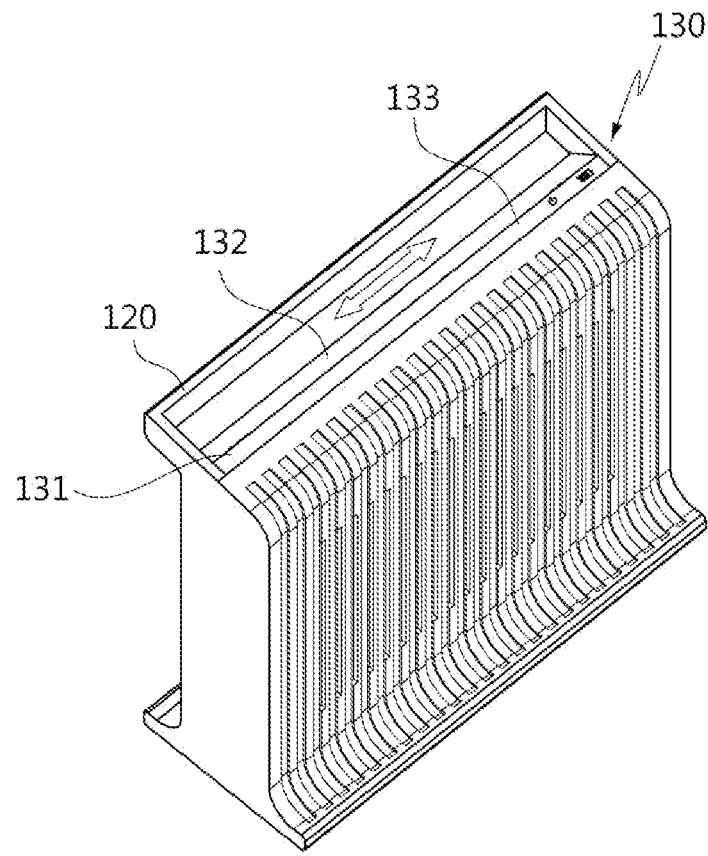
FIG. 16A is a top view of the air cleaner of FIG. 13 showing a user interface and motion sensor.
Figure 16B:
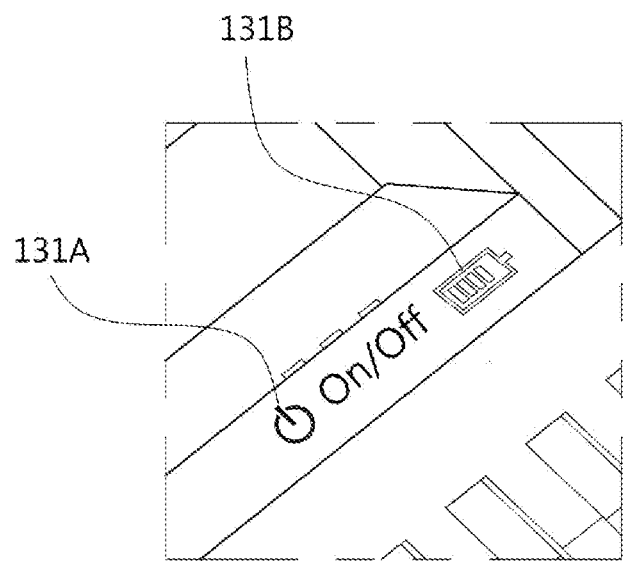
Figure 16C:
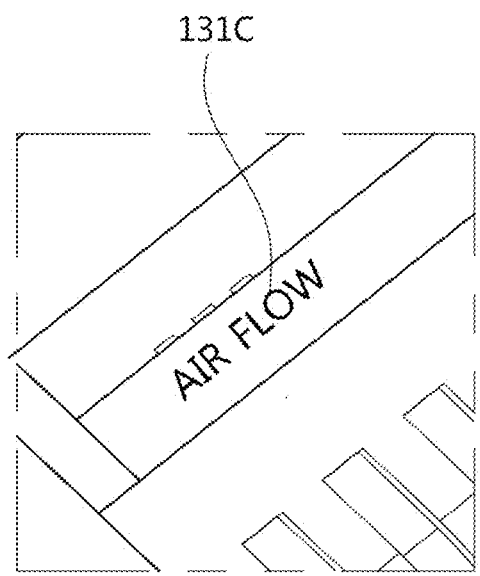
Figure 16D:
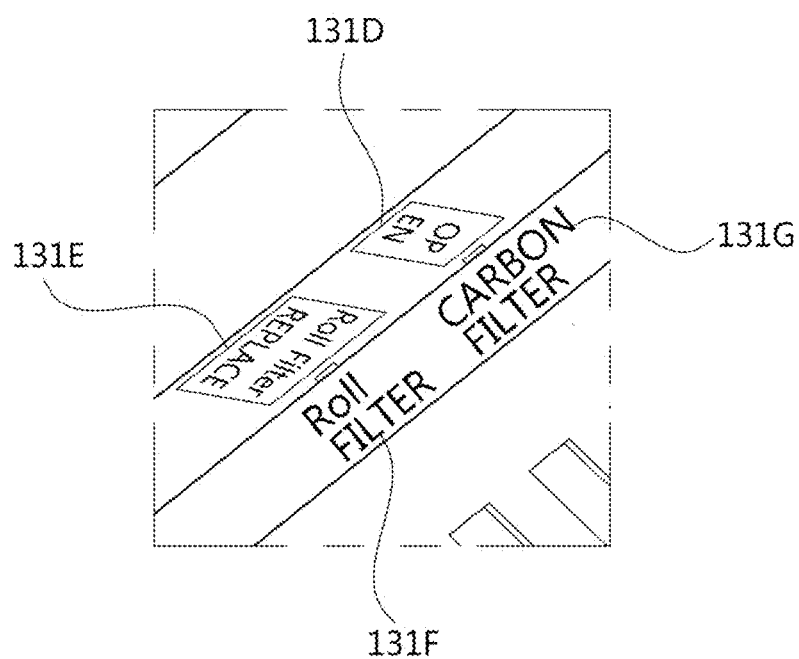
Figure 16E:
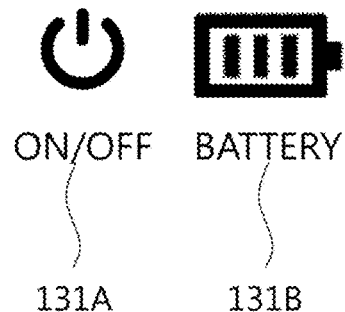
Figure 16F:
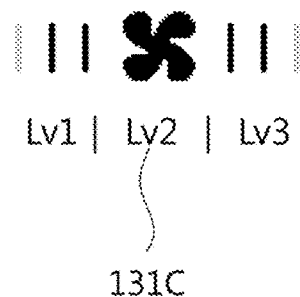
Figure 16G:
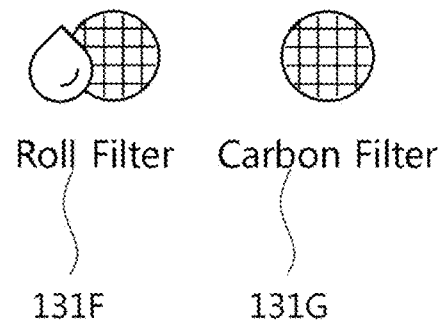

Referring to FIG. 16A, the user interface 130 may have a panel or strip 133 with a plurality of notifications 131 to indicate operating information of the air cleaner 1' and a motion sensor 132 to sense user commands. Each of the notifications 131 may include a plurality of holes formed (e.g., surface etched) through the upper surface of the panel 133, which may be made of metal or plastic. A printed circuit board (PCB) may be provided under the panel 133, and a plurality of light emitting diodes (LEDs) may be provided behind the holes of the notifications 131 to be illuminated through the holes of the notifications 131.

The motion sensor 132 may be a passive infrared (PIR) sensor, a light or laser sensor, a photosensor, or an ultrasonic sensor, but embodiments disclosed herein are not limited to an implementation of the motion sensor 132. The user may use the motion sensor 132 to turn the air cleaner 1' on and/or off and to increase a speed of the fan 310, but embodiments disclosed herein are not limited. Since the user does not have to physically touch the air cleaner 1' to input commands, an exterior of the air cleaner 1' may remain clean during cooking. Alternatively or in addition thereto, there may be capacitive touch sensors provided with the notifications 131, and the user may touch certain notifications 131 to input commands. As another alternative, the display 131 may be implemented as a touch screen and/or a liquid crystal display (LCD).

The holes of the notifications 131 may be formed in various designs, letters, and/or numbers. The notifications 131 may additionally be implemented on touch buttons. For example, referring to FIGS. 16A-16H, the notifications 131 may include an Operation Status or Power notification 131A to indicate whether the air cleaner 1' is operating, a Battery notification 131B to indicate a charge amount or a charging status of the battery in the base 110', a Fan Speed or Air Flow notification 131C to indicate a speed of the fan 310', a Roll Filter notification 131F to indicate a status of the roll filter, a Carbon Filter notification 131G to indicate a status of the carbon filter 800, a Replace notification 131E to indicate when to replace one of the filters (e.g., roll filter 600' or carbon filter 800), and an Open notification 131D to indicate when to remove or unlatch the pre-filter 500' for replacement or cleaning such that the user is guided during a replacement process. The Open and Replace notifications 131D and 131E may be provided on push buttons implemented via a spring, and the Roll Filter and Carbon Filter notifications 131F and 131G may be provided as LED or touch notifications above the push buttons. As an alternative, some or all of the notifications 131 may be implemented as capacitive touch sensors instead of physical push buttons to provide a sleek appearance.

Alternatively or in addition thereto, an optional Pre-Filter notification 131 or alarm may be provided to indicate when to replace the pre-filter 500' for washing and cleaning. A Cut Filter notification or button may be provided to cut the roll filter 600' via the filter cutter 700'.

The Power and Battery notifications 131A and 131B may be provided at a first side (e.g., left side in FIG. 16A) of the panel 133. The Open, Replace, Roll Filter, and Carbon Filter notifications 131D-131G may be provided at a second side (e.g., right side in FIG. 16A) of the panel 133. The Fan Speed notification 131C may be provided in a middle section of the panel 133 near the motion sensor 132, or alternatively be provided at the first or second side of the panel 133 to be adjacent to another notification 131.

Referring to FIGS. 16A-16I, the Power notification 131A may resemble the international standard standby symbol corresponding to International Electrotechnical Commission (IEC) standard 60417-5009, but embodiments disclosed herein are not limited. The user may gesture or swipe across the motion sensor 132 in a first direction (e.g., left to right) to turn the air cleaner 1' on, and the Power notification 131A may be illuminated. The air cleaner 1' may be turned on at first predetermined fan speed. To turn the air cleaner 1' off, the user may gesture or swipe across the motion sensor 132 in a second direction (e.g., right to left) when the fan 310' is operating at the first predetermined fan speed.

The Battery notification 131B may resemble a battery outline with vertical lines inside of the outline to resemble a charging level. As an example, the Battery notification 131B may have three vertical lines to indicate a low charge amount, a moderate charge amount, and a fully charged amount. Alternatively or in addition thereto, different colors may indicate different charge amounts (e.g., red for low, red and blinking for very low, yellow or orange for moderate, and green for high or fully charged). The Battery notification 131B may be configured to blink or turn another color (e.g., white or purple) during charging (e.g., when the air cleaner 1' is plugged in or placed on the charging pad 2.)

The Fan Speed notification 131C may resemble a fan symbol (e.g., International Standard for Organization or ISO 7000-0089) with vertical lines on left and right sides to indicate a speed level. As an example, there may be three vertical lines on the left of the fan symbol and three vertical lines on the right of the fan symbol. When the fan 310' is operating at a low speed, the vertical line on the left closest to the fan symbol and the vertical line on the right closest to the fan symbol may be illuminated. When the fan 310' is operating at a normal speed, the two vertical lines on the left closest to the fan symbol and the two vertical lines on the right closest to the fan symbol may be illuminated. When the fan 310' is operating at a high speed, all of the vertical lines and optionally the fan may be illuminated. Embodiments disclosed herein are not limited. For example, at a low speed of the fan 310', a predetermined number of vertical lines on the left may be illuminated. At a medium speed, the fan symbol may be illuminated, alternatively to or in addition to the vertical lines on the left. At a high speed, a predetermined number of vertical lines on the right may be illuminated, alternatively to or in addition to the fan symbol and/or the vertical lines on the left. Colors may also be used to indicate a fan speed (e.g., red for high and blue for low).

When the fan 310' is operating at the first predetermined fan speed, the user may swipe across the motion sensor 132 in the first direction to increase the fan speed to a second predetermined fan speed, and the Fan Speed notification 131C may change accordingly. At the second predetermined fan speed, the user may swipe across the motion sensor 132 in the first direction to increase the fan speed to a third predetermined fan speed, or the user may swipe across the motion sensor 132 in the second direction to decrease the fan speed back to the first predetermined fan speed, and the Fan Speed notification 131C may change accordingly. At the third predetermined fan speed, the user may swipe across the motion sensor 132 in the second direction to decrease the fan speed back to the second predetermined fan speed, and the Fan Speed notification 131C may change accordingly. In addition, the user interface 130 may be configured such that, when the user swipes in the first direction when the fan 310' is operating at the third predetermined fan speed, the air cleaner 1' may be turned off, and the Power notification 131A may change accordingly.

The Roll Filter notification 131F may resemble a circle with gridlines and a droplet partially imposed on the circle to indicate a filter and an oil droplet, as the roll filter 600' may collect fine oil mist. The Roll Filter notification 131F may be illuminated to indicate that the roll filter 600' needs to be unwound to display a fresh filter sheet 610'. The Replace notification 131E may optionally be illuminated in conjunction with the Roll Filter notification 131F. The Roll Filter notification 131F may also be illuminated (e.g., as another color or blinking) to indicate that the filter sheet 610' has been mostly unwound and that it is time to replace the roller 620' and install a new roll filter 600'. The Open notification 131D may optionally be illuminated to guide the user through the replacement process, but embodiments disclosed are not limited. Alternatively or in addition thereto, the Roll Filter notification 131F may change colors depending on a contamination level of the filter sheet 610' (e.g., white, blue, or green for clean, yellow or orange for dirty, and red or brown for very dirty).

The Carbon Filter notification 131G may resemble a circle with gridlines. The Carbon Filter notification 131G may be illuminated to indicate that the carbon filter 800 needs to be replaced. The Open notification 131D may optionally be illuminated in conjunction with the Carbon Filter notification 131G. Alternatively or in addition thereto, the Carbon Filter notification 131G may change colors depending on a contamination level of the carbon filter 800 (e.g., white, blue, or green for clean, yellow or orange for dirty, and red or brown for very dirty).

The Replace notification 131E may be illuminated when it is time to unwind the filter sheet 610' from the roller 620'. The Replace notification 131E may be illuminated to guide a user through the unwinding process. When the user pushes the button on which the Replace notification 131E is provided, the clamp 750' may open and the gear assembly 220' may turn to feed the filter sheet 610' through the gear assembly 220' and slit 320 of the frame 300. The clamp 750' may automatically close once the filter sheet 610' has been unwound a predetermined amount, and the filter cutter 700' may automatically cut the filter sheet 610' once the clamp 750' has closed, but embodiments disclosed herein are not limited. For example, the user may manually direct the filter cutter 700' to cut the filter sheet 610' via a motion swipe across the motion sensor 132.

The Open notification 131D may resemble a parallelogram partially imposed onto another parallelogram, but embodiments disclosed herein are not limited. When the user presses the button on which the Open notification 131D is provided, the pre-filter 500' may be unlatched via a latch assembly 230 described later with respect to FIG. 20. When the carbon filter 800 has reached a predetermined contamination level or more, the Carbon Filter notification 131G may be illuminated, with or without the Open notification 131D being illuminated. The user may press the button on which the Open notification 131D is provided, and the pre-filter 500' may become unlatched. The clamp 750' may open if it was previously closed. The user may remove the pre-filter 500' from the outer case 100' and the roll filter 600' to access the carbon filter 800.

When a new roll filter 600' needs to be installed because the filter sheet 610' is running low or out, the Roll Filter notification 131F may be illuminated, along with the open notification 131D to distinguish from the case in which the roll filter 600' needs to be unwound due to refresh the filter sheet 610'. Alternatively, the Roll Filter notification 131F may blink or emit a color to distinguish from when the Roll Filter notification 131F is indicating that the roll filter 600' needs to be unwound. The user may press the button on which the Open notification 131D is provided. The pre-filter 500' may become unlatched and the clamp 750' may open if it was previously closed. The user may remove the pre-filter 500' from the outer case 100' to access the roll filter 600'.

The controller of the air cleaner 1' may have a communication module having a WiFi module and/or a Blue Tooth module to allow the user to input commands remotely via a mobile web application on a mobile device or computer or via a remote controller. The controller may also have a memory to store information from various sensors (e.g., air quality sensors, filter sensors, air flow sensors, temperature sensors, or information manually entered by the user) and automatically control a speed of the fan 310' or an unwinding and cutting of the roll filter 600'.

As an example of an implementation of the user interface 130 to control an operation of the air cleaner 1' and a speed of the fan 310', when the air cleaner 1' is turned off, the user may wave or swipe a hand across the top of the air cleaner 1' to turn the air cleaner 1' on. The motion sensor 132 may detect the user's swipe, and the Power notification 131A may be illuminated. Alternatively, the Power notification 131A may be changed from illuminating light of a first color (e.g., red) to illuminating light of a second color (e.g., green). The user may confirm by the indication of the Power notification 131A that the air cleaner 1' is turned on. The at least one fan 310' may be operated at the first predetermined speed. While the air cleaner 1' is turned on, the user may wave or swipe the hand again to increase the speed of the fan 310' and/or cycle through predetermined speeds.

Upon a detection by the motion sensor 132 of a second swipe, the speed of the fan 310' may be operated at the second predetermined speed. There may be three preset or predetermined fan speeds that roughly correlate to a low speed, a medium speed, and a high speed. Alternatively or in addition thereto, the speed of the fan 310' may be automatically adjusted to correspond to a smoke, odor, and/or oil level sensed by an air quality sensor assembly, or may be automatically adjusted to maintain a predetermined air flow differential calculated by comparing an air flow of suctioned air and an air flow of discharged air.

A bottom of the base 110' may have a seating sensor to sense when the base 110' is not seated on a surface. Alternatively, the handle 120 may have a sensor (e.g., a temperature sensor or light sensor) to sense when the handle 120 has been gripped. The controller may determine based on the seating sensor (or alternatively, the sensor in the handle 120) that the air cleaner 1' has been lifted, and the fan 310' may be automatically stopped. In addition, the controller may determine that the pre-filter 500' has been removed based on a hall sensor provided near the top of the outer case 100' to sense a magnetic force from a magnet in the pre-filter 500', based on a weight sensor to sense a change in weight of the pre-filter 500', or based on a light sensor to sense an increase in light upon a removal of the pre-filter 500'. When the controller has determined that the pre-filter 500' has been removed, the fan 310' may be automatically stopped.

As an example of an implementation of the user interface 130 to control an unwinding of the roll filter 600', the Roll Filter notification 131F may be illuminated when the controller determines that the filter sheet 610' has reached a predetermined contamination level or more. Alternatively, the Roll Filter notification 131F may be changed from illuminating light of a first color (e.g., white, blue, or green) to illuminating light of a second color (e.g., purple, orange, or brown). As another alternative, there may not be a Roll Filter notification 131, and the user may know that the roll filter 600' needs to be unwound based on a color of the filter sheet 610', which may be partially exposed through an opening or slit in the rear cover 400'.

When the user is ready to unwind the roll filter 600' (e.g., after cooking), the user may press a button or touch sensor (e.g., the button on which the Replace notification 131E is provided) on the user interface 130 to indicate a desire to unwind the roll filter 600'. If the fan 310' is running, an operation of the fan 310' may be stopped automatically when the user presses the button. The roll filter 600' will be unwound by a predetermined amount such that some of the filter sheet 610' is moved out of the slit of the rear cover 400'. Alternatively, the user interface 130 may be configured such that the user may swipe across the motion sensor 132 to unwind the roll filter 600'.

Figure 23:
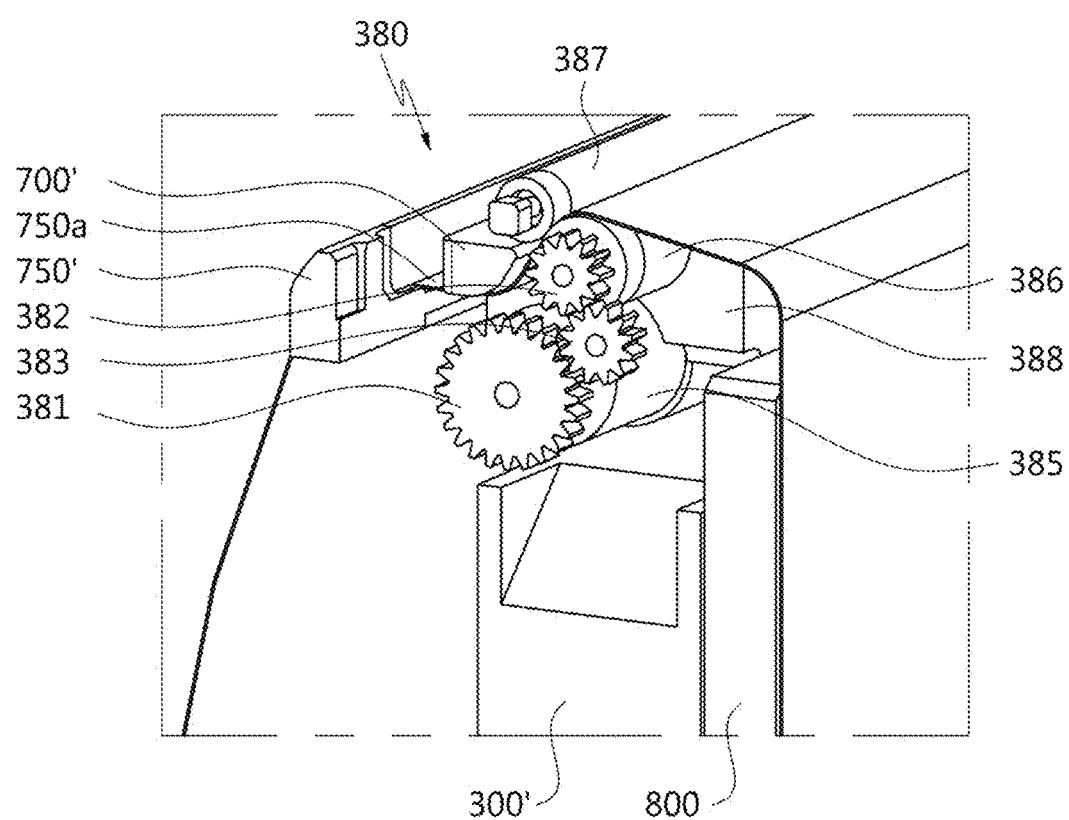
FIG. 23 is an enlarged view of a roller assembly.

Once the fan 310' has stopped, the roll filter 600' has stopped unwinding, and the clamp 750' has closed, the roll filter 600' may be automatically cut. Alternatively, a notification 131 may indicate that the roll filter 600' is ready to be cut (e.g., by blinking the Replace notification 131E, illuminating an "Cut Filter" notification 131, and/or by an audible alert). The user may then press a button or touch sensor on the user interface 130 (or alternatively use a motion swipe), and the filter sheet 610' may be cut by the filter cutter 700' (FIG. 23). The user may discard the cut off section of the filter sheet 610'.

As an example of an implementation of the user interface 130 to control a replacement of the roll filter 600', the roll filter notification 131F and the "Open" notification 131D may be illuminated. Alternatively, the roll filter notification 131 may be changed from illuminating light of a first color (e.g., white, blue, or green) to illuminating light of a second color (e.g., red or blinking red) or an audible alert may be provided. The controller may determine to illuminate such notifications 131F and/or 131D based on a roller motor sensor keeping track of an unwinding of the roll filter 600' or based on a sensor in the filter cutter 700' (FIG. 23) keeping track of an operation of the filter cutter 700'. The user may also manually determine that the roll filter 600' needs to be replaced based on a small amount of filter sheet 610' dangling out of the rear cover 400' after commanding an unwinding of the roll filter 600'.

Figure 21A:
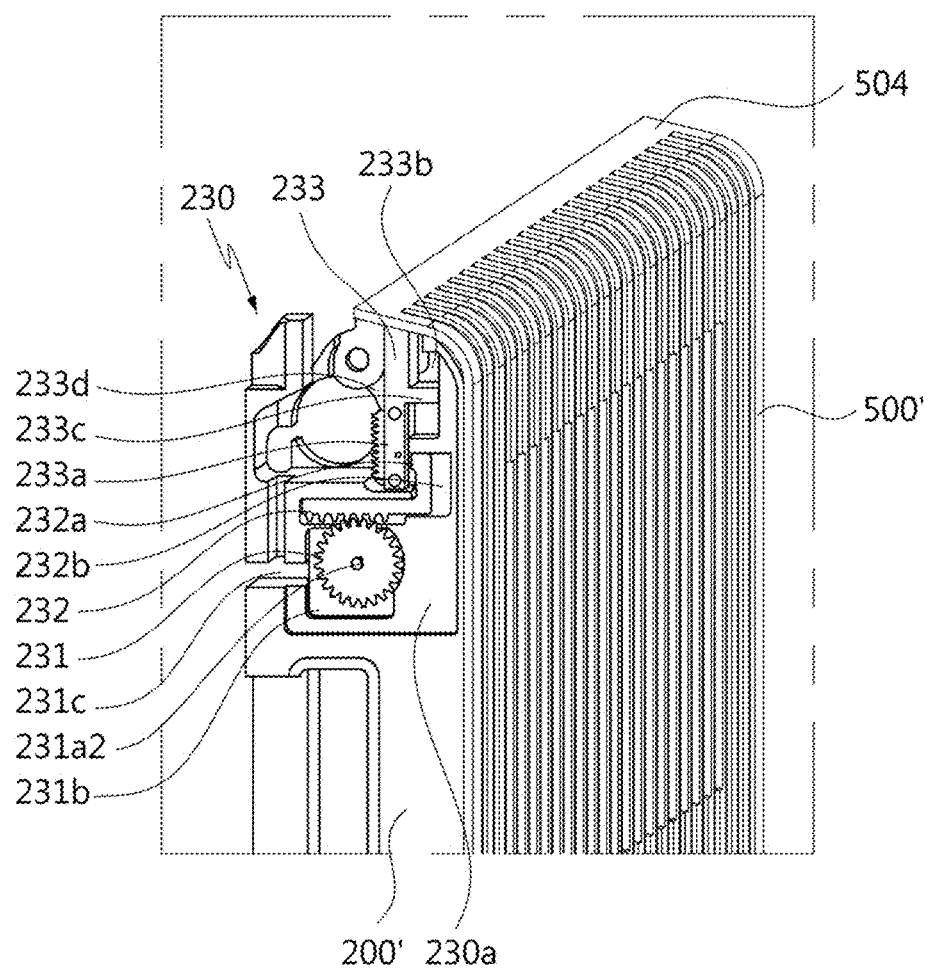
FIG. 21A shows a latch assembly and the pre-filter attached to the roll filter frame.

The user may press a button or touch sensor on the user interface 130 (e.g., the button on which the Open notification 131D is provided) to indicate a desire to replace the roll filter 600'. If the fan 310' is running, an operation of the fan 310' may be stopped automatically when the user has presses the button. If the clamp 750' is closed, the clamp 750' may be opened to allow release of the old filter sheet 610' and insertion of the new filter sheet 610' through the gap g (FIG. 6B). The pre-filter 500' may be released from the inner support 200' via the latch assembly 230 described with reference to FIGS. 20-21B.

An optional "Remove Pre-Filter" notification 131 or alarm may be illuminated or sounded to guide the user through the process. The user may remove the pre-filter 500' from the outer case 100' to access the roll filter 600'. An optional "Remove Roll Filter" notification 131 or alarm may be illuminated or sounded at this point to guide the user through the removal process. The user may remove the roller 620' and discard the roller 620' and any remaining filter sheet 610'.

An optional "Replace Roll Filter" notification 131 or alarm may be illuminated or sounded once the roller 620' has been removed (which may be detected by, e.g., a weight sensor), and the user may insert a new roller 620' with a new filter sheet 610' into the interior space of the air cleaner 1, unwind the new filter sheet 610' and feed the filter sheet 610' through the frame 300' so as to secure a top of the filter sheet 610'. The controller may determine via a weight sensor or a sensor in the filter cutter 700' and/or the frame 300' that a new roll filter 600' has been installed, and the clamp 750' may be closed.

An optional "Replace Pre-Filter" notification 131 or alarm may be illuminated or sounded. The user may place the pre-filter 500' back onto the front of the outer case 100'. Details of how the pre-filter 500' couples to the outer case 100' and inner support 200' will be described later. As an alternative to touching buttons or touch sensors on the user interface 131, the user may also progress through the above-described process of replacing the roll filter 600' by swiping over the motion sensor 132 to initiate the process and/or to indicate completion of certain steps.

As an example of an implementation of the user interface 130 to control a replacement of the carbon filter 800, the Carbon Filter notification 131G and optionally the Open and/or Replace notifications 131D and/or 131E may be illuminated. Alternatively, the Carbon Filter notification 131G may be changed from illuminating light of a first color (e.g., white, blue, or green) to illuminating light of a second color (e.g., red, orange, blinking red, or blinking orange) and/or an audible alert may be provided.

The controller may determine to illuminate the Carbon Filter notification 131G based on a sensor sensing an air flow of suctioned air entering the carbon filter 800 and an air flow of air leaving the carbon filter 800 or alternatively based on a cooking frequency, passage of time, a contamination level sensor sensing a dust or contamination level of the carbon filter 800, or a weight sensor sensing a weight of the carbon filter 800, but embodiments disclosed herein are not limited. The user may also determine that the carbon filter 800 needs to be replaced based on a quality of air being discharged from the rear cover 400'.

The user may press a button or touch sensor on the user interface 130 (e.g., the button on which the Open notification 131D is provided) to indicate a desire to replace the carbon filter 800. If the fan 310' is running, an operation of the fan 310' may be stopped after the user presses the button. The pre-filter 500' may be released from the inner support 200'.

An optional "Remove Pre-Filter" notification 131 or alarm may be illuminated or sounded to guide the user through the removal process. The user may remove the pre-filter 500' from the outer case 100'. An optional "Remove Roll Filter" notification 131 or alarm may be illuminated or sounded, and the user may temporarily remove the roll filter 600'. An optional "Remove Carbon Filter" notification 131 or alarm may be illuminated or sounded when the controller determines that the roll filter 600' has been removed, and the user may remove the carbon filter 800 and discard the carbon filter 800.

A "Replace Carbon Filter" notification 131 or alarm may be illuminated or sounded when the controller determines that the carbon filter 800 has been removed, and the user may insert a new carbon filter 800 into the interior space of the air cleaner 1'. An optional "Replace Roll Filter" notification 131 or alarm may be illuminated or sounded, and the user may re-install the roll filter 600. The optional "Replace Roll Filter" notification 131 or alarm may be operated when the controller determines via a weight sensor or a sensor in the filter cutter 700' and/or the frame 300' that the roll filter 600' has been properly installed. The user may place the pre-filter 500' back onto the front of the outer case 100'. As an alternative to touching buttons or touch sensors on the user interface 130, the user may also progress through the above-described process of replacing the carbon filter 800 by swiping over the motion sensor 132 to initiate the process and/or to indicate completion of certain steps. In addition, the controller may alternatively wait to alert the user to replace the carbon filter 800 until the next time the roll filter 600' needs to be replaced so that the user may replace both in one step.

The Battery notification 131B and/or an audible notification may indicate a charge or charging status of the battery in the base 110. As an example, the battery notification 131 may be designed to show levels of charge by lines inside of a battery shape or outline. When the charge of a battery is at or below a first predetermined charge level, the battery notification 131 may be illuminated by red light. When the charge of the battery is at or below a second predetermined charge level that is less than the first predetermined charge level, the battery notification 131 may be illuminated by blinking red light to alert the user to plug in the air cleaner 1' or to place the air cleaner 1' on the charging pad 2 (FIG. 15B). At least one of the first predetermined charge level, the second predetermined charge level, or a third predetermined charge level between the first and second predetermined charge levels, the fan 310' may be stopped or slowed if it is running to conserve power.

The user interface 130 may be optionally configured to guide a user through a cleaning of the pre-filter 500'. The Open notification 131D and/or an optional pre-filter notification 131 or alarm may be illuminated or sounded. Alternatively, the pre-filter notification 131 may be changed from illuminating light of a first color (e.g., white, blue, or green) to illuminating light of a second color (e.g., red, orange, blinking red, or blinking orange), and/or an audible notification may be provided. As another alternative, a "Clean Pre-Filter" notification 131 may be illuminated. The user may press a button or a touch sensor to indicate a desire to clean the pre-filter 500' (e.g., the button on which the Open notification 131D is provided). If the fan 310' is running, an operation of the fan 310' may be stopped when the user presses the button.

The pre-filter 500' may be unlatched via the latch assembly 230 described later. An optional "Remove pre-filter" notification 131 or alarm may be illuminated or sounded. The user may remove the pre-filter 500'. The user may clean the pre-filter 500' by, for example, placing it in a dishwasher. The fan 310' may be maintained in an off state while the pre-filter 500' is removed from the outer case 100'. During cleaning, an optional "Replace pre-filter" notification 131 or alarm may be illuminated or sounded, or alternatively, the air cleaner 1' may be turned off. When the user re-attaches the pre-filter 500' to the outer case 100', an operation of the fan 310' may be resumed, or alternatively, the air cleaner 1' may be turned back on in a standby mode. As another alternative, the air cleaner 1' may remain off until the user desires to turn on the air cleaner 1'.

Implementations of the notifications 131, an input of user commands, turning the air cleaner 1' on and off, and processes guiding the user in unwinding the roll filter 600', replacing the roll filter 600', replacing the carbon filter 800', and cleaning the pre-filter 500' may not be limited. Determinations by the controller may be based on a variety of implementations of sensors (e.g., air quality sensors, weight sensors, infrared sensors, light or laser sensors, photosensors, or air flow sensors) and are not limited.

Referring to FIGS. 17-20, the pre-filter 500' may be coupled to a front of the outer case 100', the rear cover 400' may be coupled to a rear of the outer case 100', and the outer case 100', the rear cover 400', and the pre-filter 500' may form an interior space in which the inner support 200', frame 300', carbon filter 800, and roll filter 600' are provided. The base 110' may be provided at the bottom of the outer case 100' to support the outer case 100', rear case 500', pre-filter 500', frame 300', inner support 200', carbon filter 800, and roll filter 600'. The base 110' may house the battery, the controller (which may alternatively be provided at the top), and the wireless power transceiver or receiver. The base 110' and a bottom of the outer case 100' may include openings for wiring (coupled to a plug), or the base 110' may include a socket so that the base 110' may receive power directly from an external or commercial power supply instead of via the charging pad 2.

The inner support 200' may be provided within an inner contour of the outer case 100'. The inner support 200' may have a front lower section 206 having a concave curvature and a rear lower section 205 having a concave curvature. Details of the inner support 200' will be described with reference to FIGS. 20-21B.

A cross-section of the pre-filter 500' when viewed from a first or second side (i.e., a left or right side) may resemble a backwards ☐, a backwards S, or ʅ. The center section 502 may be flat or straight, while the upper and lower sections 504 and 503 may be curved to extend in opposite directions.

The upper section 504 may curve to extend rearward and may have a slight inclination upward from a front to a rear. The lower section 503 may curve to extend forward.

A cross-section of the outer case 100' when viewed from the left or the right side may resemble a ⊐-shape, a reverse tau shape, a hangman post shape, or, if the handle 120 is omitted a ☐-shape. A bottom front section of the outer case 100' may have a front lower section 103 that is curved to correspond to a side curvature of the lower section 503 of the pre-filter 500'. A curvature of the lower section 503 of the pre-filter 500' may be equal to a curvature of the front lower section 206 of the inner support 200'. The front lower section 206 of the inner support 200' may be slightly recessed downward or inward from sides of the front lower section 103 of the outer case 100', and the lower section 503 of the pre-filter 500' may be pressed-fit or friction-fitted into the front lower section 206 of the inner support 200'.

A top front section of the outer case 100' may have an upper section 104 that is curved to correspond to the curved upper section 504 of the pre-filter 500'. A curvature of the upper section 504 of the pre-filter 500' may be equal to an outer curvature of the upper section 104 of the outer case 100'. The upper section 504 of the pre-filter 500' may wrap around a top of the roll filter 600' and engage with a latch assembly 230 (FIG. 20) of the inner support 200'. The pre-filter 500' may be spring loaded into the roll filter case 200' and popped out or released by the latch assembly 230 by a restoring force. The latch assembly 230 may be controlled via the controller, and details of the latch assembly 230 will be described with reference to FIGS. 20-21B.

The upper section 504 of the pre-filter 500' may be further secured to the upper section 104 of the outer case 100' via magnetic coupling. For example, at least one magnet may be provided in the upper section 504 of the pre-filter 500', and the outer case 100' (or at least the upper section 104 of the outer case 100') may be made of a ferromagnetic material. Alternatively, the upper section 104 of the outer case 100' may have a magnet with a polarity opposite to a polarity of the magnet provided in the upper section 504 of the pre-filter 500'. As another alternative, a magnet may be provided in the upper section 104 of the outer case 100', and the pre-filter 500' (or at least the upper section 504 of the pre-filter 500') may be made of a ferromagnetic material. In yet another alternative or in addition thereto, the lower section 503 of the pre-filter 500' may be further secured to the front lower section 103 of the outer case 100' (or alternatively, the front lower section 206 of the inner support 200') via magnetic coupling. Implementations of magnetic coupling are not limited hereto. For example, sides of the pre-filter 500' and/or the outer case 100' may have magnets.

A bottom rear section of the outer case 100' may have a rear lower section 105 that is curved to extend opposite from the front lower section 103. The rear lower section 105 and the front lower section 103 may be symmetrical along a vertical axis of the outer case 100'. The rear lower section 205 of the inner support 200' may fit within the rear lower section 105 of the outer case 100'.

A width of the outer case 100' defined by a distance between the rear cover 400' and the pre-filter 500' may be 150 mm or less. A bottom width of the base 110' defined between the rear lower section 105 and the front lower section 103 may be wider than a middle width of the outer case 100' representing a length of the right side or the left side of the outer case 100' at a middle position. A top width of the outer case 100' may be defined between the handle 120 and the upper section 104 of the outer case 100'. The bottom width of the outer case 100' may be, for example, approximately 130 mm or 0.4 feet, but embodiments disclosed herein are not limited. The middle width may be approximately 76 mm or approximately 3 inches, but embodiments disclosed herein are not limited. For example, a ratio of the length (or alternatively, the height) to the middle width may be 3.0-4.0. The top width may be smaller than the bottom width so as to maintain a low center of gravity. Alternatively, the top width may be equal to or greater than the bottom width so as to have a larger handle 120.

The roll filter 600' may have a filter sheet 610' wound around a spring tension roller 620' having an internal spring, a pawl, a ratchet, and a pin. The center section 502 of the pre-filter 500' may be primarily straight or flat so as to align with the carbon filter 800 and a section of the filter sheet 610' extending between the roller 620' and the top of the outer case 100'. The center openings 501 may align with the carbon filter 800.

The carbon filter 800 may have a frame configured to be placed in the interior space of the air cleaner 1' between the frame 300' and the pre-filter 500' behind the roll filter 600'. The frame of the carbon filter 800 may surround a carbon sheet or pad containing activated charcoal to filter foreign matter particles from suctioned air that has already passed through the pre-filter 500' and the filter sheet 610'. The pre-filter 500' may be configured to filter foreign matter particles having a first size (e.g., large oil droplets and large dust particles), the filter sheet 610' may be configured to filter foreign matter particles having a second size smaller than the first size (e.g., oil mist, vapor, and/or finer dust), and the carbon filter 800 may be configured to filter foreign matter particles having a third size smaller than the second size (e.g., odors or very fine dust or oil). The carbon filter 800 may be optional. Alternatively, or in addition thereto, a different filter (e.g., a photocatalytic deodorizer having titanium dioxide and an ultra-violet light, a metal or mesh strainer, a HEPA filter, or a cardboard accordion filter) may be provided.

A frame 300' may be provided in the outer case 100' to be adjacent to the rear cover 400'. The frame 300' may be provided within the inner support 200', which will be described in more detail with reference to FIGS. 20-21B. The frame 300' may house a single fan 310' or two fans 310' adjacent in a left-right direction so as to increase a suction power of the air cleaner 1'.

Based on a setting input by the user or based on a determination of the controller of a sensed air quality, the two fans 310' may be operated at various combinations of speeds. For example, if smoke, odor, and oil levels are below a first predetermined level, one of the fans 310' may be operated, or both fans 310' may be operated at a first predetermined fan speed or less. If smoke, odor, and oil levels are above a second predetermined level, both fans 310' may be operated at a second predetermined fan speed or more. If smoke, odor, and oil levels are below a third predetermined level between the first and second predetermined levels, the speeds of the fans 310' may be adjusted so that an average fan speed is a third predetermined fan speed. Implementations of a control of the fans 310' is not limited, nor is a number of fans 310' or an arrangement of fans 310'.

The rear cover 400' may be formed as a plate that fits within a rear opening formed at a rear of the outer case 100'. The rear cover 400' may be friction fitted to a rear of the outer case 100' so as to be easily pulled and removed from the outer case 100' for cleaning and/or reparation of the fans 310'. The rear cover 400' may have an optional magnet to further secure to the outer case 100'. Alternatively, the rear cover 400' may be screwed into the outer case 100' or be adhered to the outer case 100' for added security. The rear cover 400' may include a plurality of discharge openings through which clean air may be discharged and a slit through which a section of the filter sheet 610' may pass so that the user may discard the section of the filter sheet 610' after cutting or pulling and ripping out the filter sheet 610'.

Figure 21B:
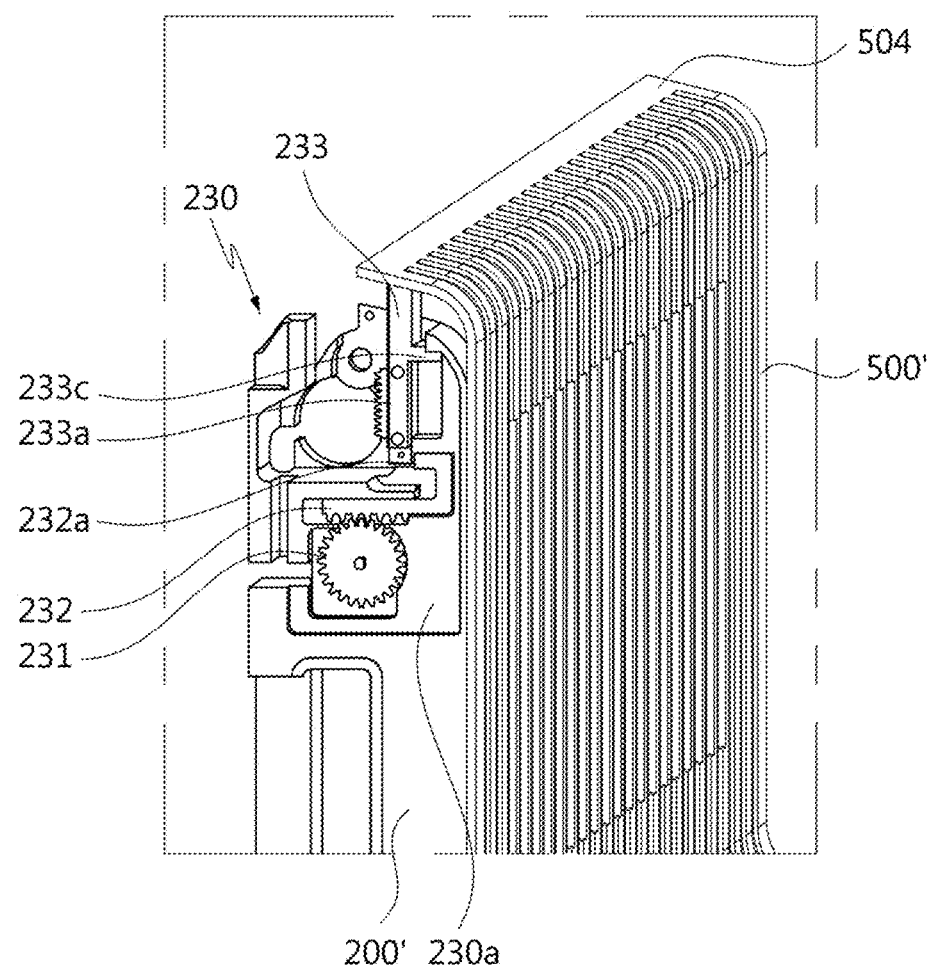
FIG. 21B shows the latch assembly and the pre-filter lifted from the roll filter frame.

Referring specifically to FIGS. 20-21B, an arrangement of the frame 300' and the inner support 200' may be different than the arrangement of the frame 300 and the roll filter cartridge 200 described with reference to FIGS. 1-12. The inner support 200' may have a latch assembly 230 configured to push the pre-filter 500' upward and release the pre-filter 500' from the outer case 100'. The frame 300' may include a gear or roller assembly 380 to unwind the filter sheet 610' and feed the filter sheet 610' to the filter cutter 700' (FIG. 23) and out of the rear cover 400'.

The inner support 200' may have a □-shaped cross-section when viewed from the left or right so as to resemble a cross-section of the outer case 100' without the handle 120'. A bottom front of the inner support 200' may have the curved front lower section 206 which fits inside of the front lower section 103 of the outer case 100'. A bottom rear of the inner support 200' may have the curved rear lower section 205 which fits inside of the rear lower section 105 of the outer case 100'. Outer sides of the inner support 200' may have a plurality of protrusions and/or recesses, and inner sides of the outer case 100' may have a plurality of recesses and/or protrusions configured to engage with the protrusions and/or recesses of the inner support 200', and the inner support 200' is pressed fitted or slid into the outer case 100'.

The frame 300', the carbon filter 800, and the roll filter 600' may be secured to the inner support 200'. The frame 300' may include a roller section or support 370 to support the roller 620' of the roll filter 600'. The roller 620' may be rotatably supported in the roller support 370. For example, an inner side of the roller support 370 may include pins which are inserted into holes 622 (FIG. 22) formed at left and right sides of the roller 620'. The roller support 370 may extend from a front side of the frame 300' and be inclined forward in the downward direction. The bottom of the roller support 370 may be curved so as to fit around a top section of the roller 620'.

A bottom section of the roll filter frame 600' behind and/or above the front lower section 206 may include a recess 620a in which the roller support 370 and the roller 620' may be seated. An outer curvature of the roller support 370 may correspond to an inner curvature of the recess 620a. Inner sides of the inner support 200' may include a side groove or recess 621a, and outer sides of the roller support 370 may include protrusions 621 configured to be pressed-fit into the side groove 621a. The protrusions 621 may serve as a flat pin of the roller support 370.

The roller support 370 may remain fixed, while the roller 620' may rotate within the roller support 370 via shafts and holes 622. Alternatively, the roller support 370 may not be formed with sides, and the protrusions 621 may be formed on outer sides of the roller 620' to serve as flat pins of the roller 620'. In such an alternative, the roller 620' itself may not rotate and the filter sheet 610' may not be attached to the roller 620' and freely slide around the roller 620' when unwound. Embodiments disclosed herein are not limited.

The carbon filter 800 may be secured (e.g., pressed-fit, snap-fitted, or magnetically secured) to a front of the frame 300' in a section above the roller support 370. The frame 300' may be primarily supported by a rear bottom surface of the inner support 200'. A bottom of the carbon filter 800 may be provided above the roller 620'. Top and bottom headers or beams 810A and 810B may protrude outward from the front of the frame 300' to support the carbon filter 800. The bottom header 810B may protrude above the roller 610' at a position that does not interfere with a rotation of the roller 620'.

When the carbon filter 800 is secured between the top and bottom headers 810A and 810B, a front surface of the carbon filter 800 may be flush with front surfaces of the top and bottom headers 810A and 810B so as to provide a smooth front surface over which the filter sheet 610' extends. An end of the filter sheet 610' may be fed through the roller assembly 380, which will be described in more detail with reference to FIGS. 22-25. The pre-filter 500' may be placed over the filter sheet 610', and a top of the pre-filter 500' may be latched over a top of the inner support 200' to cover tops of the filter sheet 610', frame 300', and carbon filter 800'.

A top of the inner support 200' may have the latch assembly 230, which may be configured to couple with a latch or latch hook provided on a bottom surface of the top of the upper section 504 of the pre-filter 500'. The latch assembly 230 may include a gear 231 rotatable on the frame 300', a rack 232 coupled to the inner support 200' to be provided above the gear 231 to engage with the gear 231, and a latch 233 provided above the rack 232 that is spring loaded into a groove or passage of an upper side section of the inner support 200'. The rack 232 may selectively couple with the latch 233 to selectively lock the latch 233. The rack 232 may move forward and rearward between first and second (i.e., closed and opened) rack positions, while the latch 233 may move upward and downward between first and second (i.e., closed and opened) latch positions.

An inner space of the latch 233 may include a spring or elastic member (e.g., a coil spring). Alternatively, a spring may be coupled to an outer side of the latch 233. When the pre-filter 500' is provided on the latch 233, the latch 233 may be pressed downward, and the spring may be compressed by a downward force on the pre-filter 500'. The rack 232 may have a rack lock or hook 232a, which may be inserted into an opening or recess formed in a lower section 233a of the latch 233 to keep the spring in a compressed state and the latch 233 at the first latch position. When the latch 233 is at the first latch position, the rack 232 may be closer to a rear of the inner support 200' at the first rack position.

A bottom of the rack 232 may have teeth configured to engage with teeth of the gear 231. When the gear 231 is rotated in a first direction (i.e., clockwise in FIGS. 21A and 21B), the rack 232 may be moved from the first rack position at the rear of the inner support 200' toward a front into the second rack position, and the rack lock 232a may disengage from the lower section 233a of the latch 233. The spring inside of the latch 233 may push the latch 233 upward via a restoring elastic force into the second latch position, and a top of the latch 233 may push the upper section 504 of the pre-filter 500' upwards and off of the inner support 200' to release the pre-filter 500'.

When the pre-filter 500' is pressed down on the top of the latch 233, the latch 233 may descend to the first latch position, and the spring inside of the latch 233 may be compressed. The gear 231 may be rotated in a second direction opposite to the first direction (i.e., counterclockwise in FIGS. 21A and 21B) to move the rack 232 from the second rack position at the front of the inner support 200' toward the first rack position toward the rear. The rack lock 232a may engage with the lower section 233a of the latch 233 to hold the latch 233 down in the first latch position and keep the spring compressed.

Figure 22:
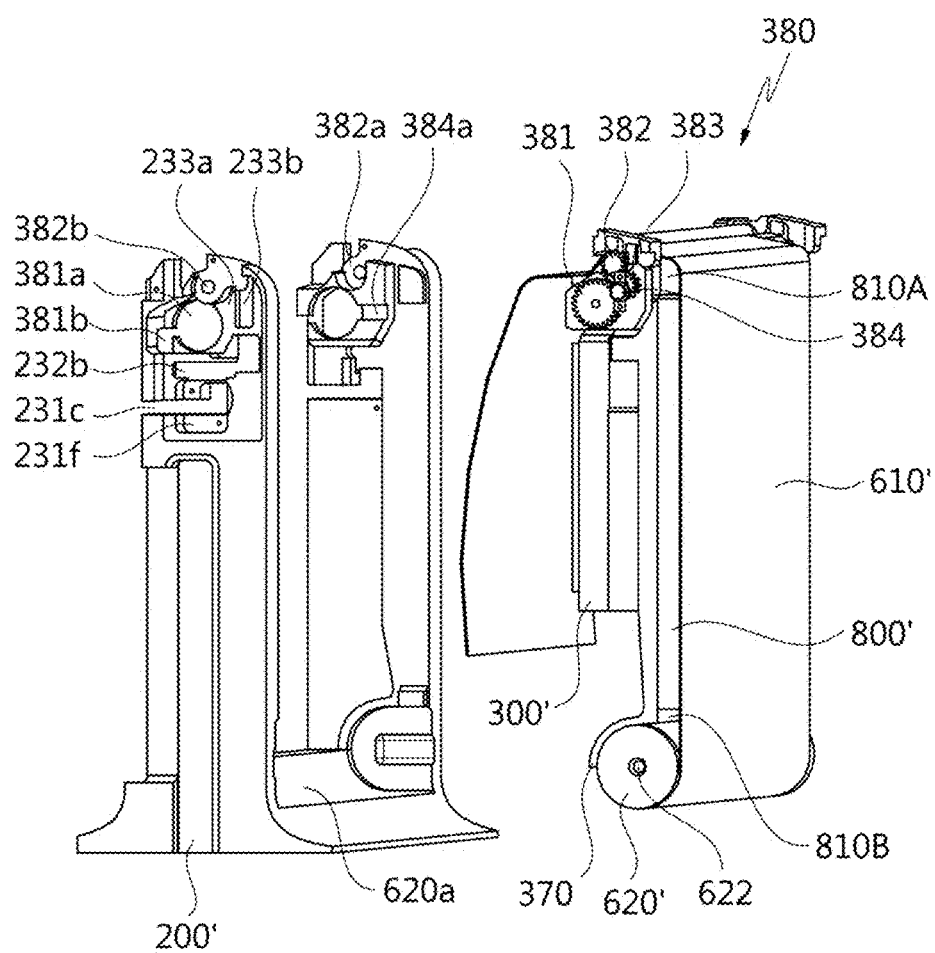
FIG. 22 is a perspective view showing inner sides of the roll filter frame.

Referring to FIGS. 20-22, left and right side surfaces of the inner support 200' may have various combinations of recesses, grooves, and/or openings in which the gear 231, rack 232, and latch 233 are received so that a frontward/rearward movement of the rack 232 and a vertical movement of the latch 233 does not interfere with a coupling of the inner support 200' within the outer case 100'. Implementations of how the recesses, grooves, and/or openings are combined are not limited.

As an example, an outer side of the inner support 200' may be formed with a gear recess 231f. An optional gear base 231b may be seated in the gear recess 231f. A gear lock 231a1 may protrude from an upper section of the gear base 231b to couple to an inner circular recess or groove formed on an inner side (i.e., a rear side in FIGS. 20-22) of the gear 231. As the gear 231 rotates, the gear lock 231a1 may remain in the inner circular recess.

An outer gear shaft 231a2 may protrude from an outer side (i.e., a front side in FIGS. 20-22) of the gear 231. An inner side of the outer case 100' may be formed with a gear and rack protrusion 231d. The outer gear shaft 231a2 may be inserted into a circular hole or groove 231e formed in the gear and rack protrusion 231d. The gear 231 may turn between the gear recess 231f and the gear and rack protrusion 231d. Alternatively, the gear and rack protrusion 231d may be omitted, and the inner side of the outer case 100' may be formed with a gear and rack recess to increase a size of a space in which the gear 231 may turn.

The gear base 231b may have a square or rectangular shape, and the gear recess 231f may have a square or rectangular shape with an optional round or curved portion to allow the gear 231 to spin. Surfaces of the gear base 231b and/or the gear and rack protrusion 231d may be formed to be smooth so as to facilitate a rotation of the gear 231. Shapes of the gear base 231b and gear recess 231f are not limited to rectangular shapes, and alternatively, the gear base 231b and the gear recess 231f may be circular.

An L-shaped opening 231c may be formed to extend from the rear of the side of the inner support 200' and penetrate the gear recess 231f. The gear 231 may be fixed to the frame 300' and rotate around an inner gear shaft coupled to the gear 231 and the frame 300'. There may be a motor provided at a side of or inside of the frame 300' to rotate the inner gear shaft of the gear 231. When coupling the frame 300' to the inner support 200', the inner gear shaft and/or a base of the gear 231 may be inserted into and slid along the L-shaped opening 231c until the gear lock 231a1 locks into the inner circular recess formed on the inner side of the gear 231.

A rack recess 232b may be formed above the gear recess 231f. The rack recess 232b and the rack 232 may have an L shape such that each of the rack recess 232b and the rack 232 have a horizontal section and a vertical section. The rack lock 232a may be formed as a horizontal protrusion or rib extending rearward from the vertical section of the rack 232.

The horizontal section of the rack recess 232b may be formed to be longer than the rack 232 and a width or thickness of the vertical section of the rack recess 232b may be thicker than a width or thickness of the rack 232. Dimensions of the rack recess 232b may be configured so that the rack 232, including the rack lock 232a, may freely move forward and rearward between the first and second rack positions within the rack recess 232b, while a vertical movement of the rack 232 may be restricted.

First and second latch recesses 233d and 233b may be formed above the rack recess 233 to receive the latch 233. The latch 233 may have a latch stopper 233c, which may be a horizontal protrusion or rib extending forward from a main body of the latch 233. The main body of the latch 233 may be received in the first latch recess 233a, while the latch stopper 233c may be received in the second latch recess 233b. A length of the first latch recess 233d may be longer than a length of the latch 233 so that the latch 233 may freely move vertically between the first and second latch positions.

A length of the second latch recess 233b may be configured to limit and guide a vertical movement of the latch stopper 233c and the latch 233. When the latch 233 is pushed upward by the restoring force of the spring, the latch stopper 233c may be caught on an upper end of the second latch recess 233b so that the latch 233 does not accidentally disengage from the inner support 200'.

A shape of the gear and rack protrusion 231d may be configured to correspond to shapes of the gear recess 231f and the rack recess 232b. The gear and rack protrusion 231d may be at least partially inserted or fitted into the gear recess 231 and the rack recess 232b to secure the gear 231 and the rack 232 between the outer case 100' and the inner support 200'. Alternatively, the gear and rack protrusion 231d may be formed as a recess so as to increase a space in which the gear 231 may turn and the rack 232 may move and to prevent or reduce an interference with a movement of the gear 231 and the rack 232.

The outer side of the inner support 200' may be formed with an optional general or overall recess 230a. The general recess 230a may encompass the gear recess 231f, the rack recess 232b, and the first and second latch recesses 233d and 233b. The general recess 230a may be a shallower recess than the gear recess 231f, the rack recess 232b, and the first and second latch recesses 233d and 233b such that the gear recess 231f, the rack recess 232b, and the first and second latch recesses 233d and 233b are deeper recesses formed within the general recess 230a.

The inner side of the outer case 100' may be formed with an optional general or overall protrusion 230b. The general protrusion 230a may encompass the gear and rack protrusion 231d, and may not protrude as far inward as the gear and rack protrusion 231d. The general protrusion 230a may be configured to be at least partially inserted or fit into the general recess 230a to further secure the inner support 200' to the outer case 100'.

Referring to FIG. 22, the inner support 200' may be formed with various combinations of recesses, grooves, and/or openings to receive the roller assembly 380 provided on the frame 300. The roller assembly 380 may include a first gear 381, a second gear 382, a third gear 383, and a roller lock or protrusion 384. The inner support 200' may be formed with a first gear opening 381a to receive the first gear 381, a second gear recess 382a having an optional second gear opening 382b to receive the second gear 383, and a lock groove or recess 384a to receive the roller lock 384.

The first gear opening 381a may penetrate the side of the inner support 200', and the first gear 381 may be exposed through the first gear opening 381a when the frame 300' is coupled to the inner support 200'. The first gear 381 may not penetrate the first gear opening 381a, but alternatively, a depth, position, and size of the first gear opening 381a may be configured so as to surround the first gear 381. The first gear opening 381a may be formed in the first latch recess 233d, but embodiments disclosed herein are not limited. Alternatively, an inner side of the inner support 200' may be formed with an optional first gear recess to receive the first gear 381, and the first gear opening 381a may be omitted.

The first gear opening 381a may be formed with an optional L-shaped hole or opening 381b to facilitate removal of the roller assembly 380 and the frame 300' from the inner support 200'. The roller assembly 380 and/or an inner side of the inner support 200' may have an optional hook configured to hook onto the first gear opening 381a and/or the L-Shaped hole 381b.

Referring back to FIG. 22, an inner side of the inner support 200' may be formed with the second gear recess 382a. The second gear recess 382a may have a circular or semi-circular shape and have a radius that is equal to or greater than a radius of the second gear 382 so that the second gear 382 may freely rotate within the second gear recess 382a. There may be an optional second gear opening or hole 382b formed in a side of the second gear recess 382a. The second gear 382 may be at least partially exposed through the second gear opening 382b.

The roller lock 384 may protrude from an outer side of the frame 300' and may at least partially cover the third gear 383. The roller lock 384 may include a tab extending vertically over the third gear 383 and a knob or lock having a circular shape, but embodiments disclosed herein are not limited. The inner side of the inner support 200' may include the lock groove 384a, which may have a height corresponding to a height or diameter of the knob of the roller lock 384. The knob of the roller lock 384 may slide into and fit within the lock groove 384a to facilitate a coupling of the frame 300' within the inner support 200'.

Figure 24:
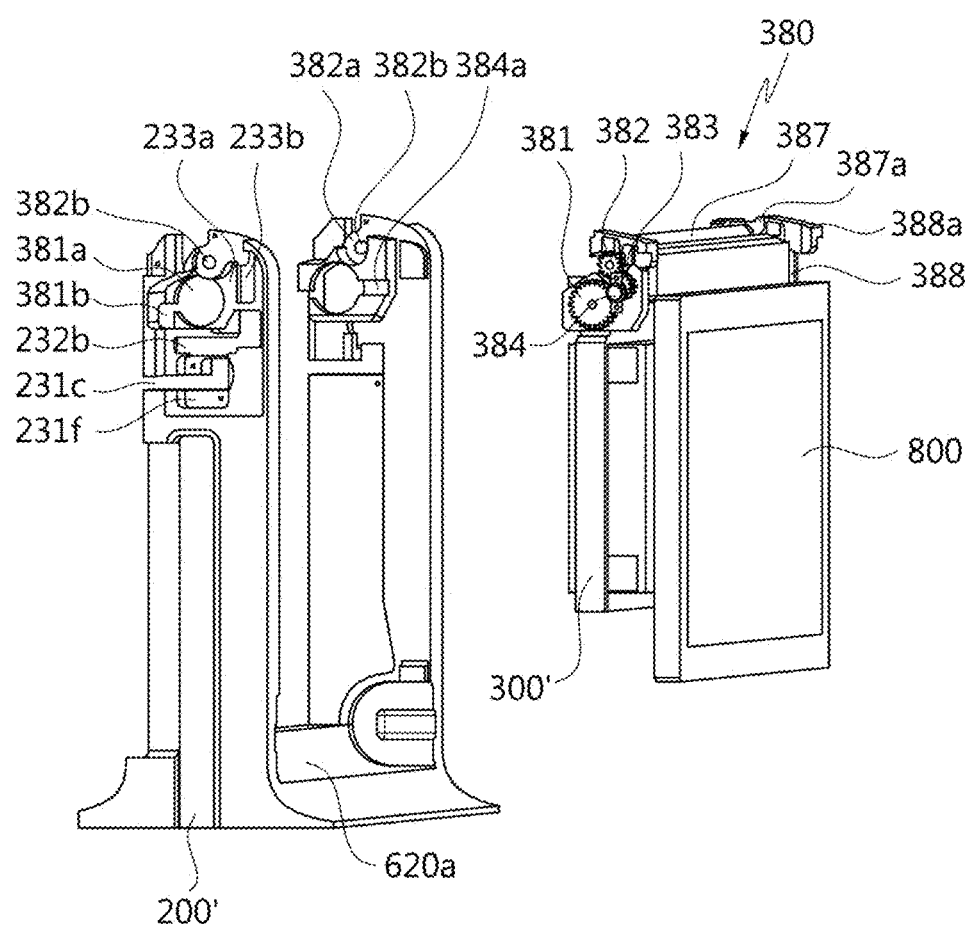
FIG. 24 is an exploded view showing the roll filter frame, a carbon filter, a frame, and a roller assembly.
Figure 25:
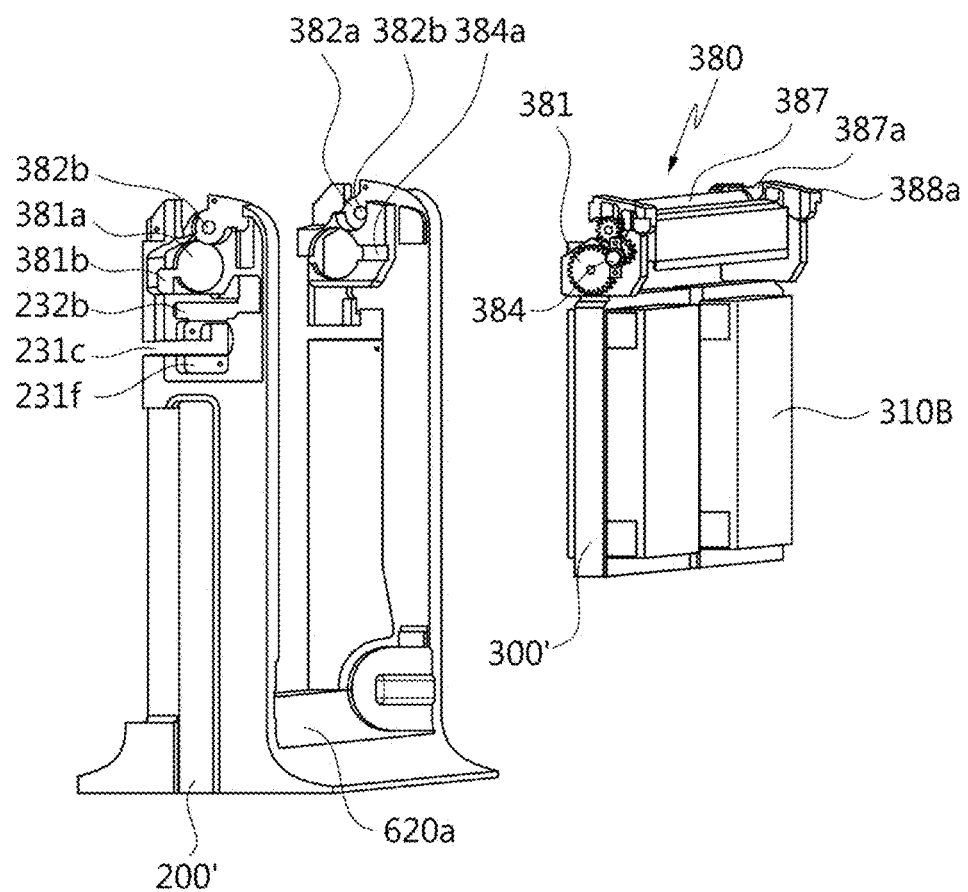
FIG. 25 is an enlarged perspective view showing the roll filter frame, the frame, and the roller assembly.

Referring to FIGS. 23-25, the roller assembly 380 may include a roller frame or ledge 388, a first gear motor 385, a first roller 386, and a second roller 387 configured to draw the filter sheet 610' from the roller 620'. The roller frame 388 may be coupled to a top of the frame 300' and provide a flat upper surface over which the filter sheet 610' may be fed.

The first gear motor 385 may provide a rotational driving force to rotate the first gear 381. The first gear motor 385 may be provided on top of the frame 300' and at a bottom of the roller frame 388. The first roller gear 381 may be engaged with the third roller gear 383, which may not be coupled to a roller. As the first roller gear 381 rotates in a first direction (e.g., clockwise), the third roller gear 383 may rotate in a second direction (e.g., counterclockwise) opposite to the first direction.

The third roller gear 383 may be engaged with the second roller gear 382, which may be coupled to the first roller 386 such that the first roller 386 may rotate with a rotation of the third roller gear 383. As the third roller gear 383 rotates in the second direction, the second roller gear 382 may rotate in the first direction so as to rotate in the same direction as the first roller gear 381.

The top of the roller frame 388 may have a recess provided at a rear side to receive the first roller 386. When the first roller 386 is provided in the recess of the roller frame 388, the top of the roller frame 388 and a top of the first roller 386 may be flush. The filter sheet 610' may be fed over a top of the roller frame 388 and the first roller 386.

The second roller 387 may be provided above the first roller 386 to be in contact with the first roller 386. When the first roller 386 rotates in the first direction, the second roller 387 may rotate in the second direction due to friction against the second roller 387 and/or the filter sheet 610').

The second roller 387 may have an optional filter sheet sensor to sense a feeding of the filter sheet 610'. The filter sheet sensor may be implemented as a light or laser sensor or a weight sensor, but embodiments disclosed herein are not limited. When the filter sheet sensor senses that the filter sheet 610' has been placed on the first roller 386, the first gear motor 385 may turn on to spin the first roller 386 and feed the filter sheet 610' between the first and second rollers 386 and 387. Outer surfaces of the first and/or second rollers 386 and 387 may be made of a material (e.g., rubber) configured to grip or cling to the filter sheet 610' so that a friction force may pull the filter sheet 610' upon a rotation of the first and second rollers 386 and 387. The user may also manually place an edge or end of the filter sheet 610' close to the second roller 387 and/or insert the edge of the filter sheet 610' between the first and second rollers 386 and 387 to facilitate a feeding of the filter sheet 610'.

The second roller 387 may be optionally configured to be raised when the pre-filter 500' is released via the latch assembly 230'. A gap may be formed between the second roller 387 and the first roller 386, and the end of the filter sheet 610' may be placed on the first roller 386. As previously described, the latch 233 may be engaged with the third gear 383, which may prevent a rotation of the first roller 386 during feeding of the filter sheet 610'. When the pre-filter 500' is pressed downward and latched to the filter frame 300' via the latch assembly 230, the pre-filter 500' may also press down on the second roller 387 to close the gap and secure the filter sheet 610' between the first and second rollers 386 and 387. The latch 233 may be disengaged from the third gear 383 so that the first roller 386 is free to rotate via the first gear motor 385 and first gear 381.

Implementations of raising the second roller 387 are not limited. For example, the second roller 387 may be optionally hinged to the roller frame 388 via a hinge 387a that is hinged to a side frame 388a of the roller frame 388. The hinge 387a may be operated manually by the user by pulling up on the second roller 387 to create a gap between the first and second rollers 386 and 387 in which the filter sheet 610' may be placed. The second roller 387 may be pressed down to close the gap and secure the filter sheet 610' between the first and second rollers 386 and 387. An optional motor may operate a rotation of the hinge 387a about the side frame 388a so that a lifting of the second roller 387 may be controlled based on the filter sheet sensor or based on a release of the pre-filter 500' via the latch assembly 230.

As another example, similar to a coupling of the pre-filter 500' via the latch assembly 230, the second roller 387 may be spring-loaded to a top of the filter frame 300' to be latched on and released from the filter frame 300'. The hinge 387a may press down on a spring when the pre-filter 500' is closed to compress a spring, and the spring may be released upon or after a release of the pre-filter 500'. Alternatively, the hinge 387a may be omitted, and the second roller 387 may be coupled to a frame configured to vertically move relative to the side frame 388a to push down on a spring and release via a restoring force of the spring. Embodiments disclosed herein are not limited.

The filter cutter 700' may be provided at a bottom rear of the second roller 387 so as to cut the filter sheet 610' after the filter sheet 610' has been fed through the first and second rollers 386 and 387. A clamp assembly or frame 750' may be provided at a rear of the filter cutter 700' so as to maintain a tension of the filter sheet 610' during cutting. The clamp assembly 750' may be coupled to the side frame 388a of the roller frame 388, but embodiments disclosed herein are not limited. For example, the clamp assembly 750' may alternatively be coupled to a top rear of the frame 300'.

The clamp assembly 750' may have a slit 750a through which the filter sheet 610' may be fed through toward the slit in the rear cover 400'. Positions of the filter cutter 700', first and second rollers 386 and 387, and the clamp assembly 750' may be configured such that the filter sheet 610' passes through the first and second rollers 386 and 387, between the roller frame 388 and the filter cutter 700', and through the slit 750a of the clamp assembly 750'. Alternatively or in addition thereto, the filter cutter 700' may be coupled to the second roller 387 or the hinge 387*a* so that, when the second roller 387 is lifted, the filter cutter 700' (or alternatively a portion thereof) may be lifted, and the filter sheet 610' may be fed under (or, alternatively, through) the filter cutter 700' and secured in such a position upon a closing of the pre-filter 500'.

The filter cutter 700' may be implemented similarly to the filter cutter 700 described with reference to FIGS. 1-12. The filter cutter 700' may include a blade to cut through the filter sheet 610', and the filter cutter 700' may engage with the roller frame 388 so as to move across the filter sheet 610' between left and right sides. The clamp assembly 750' may be implemented similarly to the clamp 750 described with reference to FIGS. 1-12. The clamp assembly 750' may include a plurality of inclined layers configured to be pressed downward upon a horizontal application of force. However, implementations of the filter cutter 700' and the clamp assembly 750' are not limited. Alternatively, if the filter sheet 610' includes perforations or small tears to facilitate ripping, the filter cutter 700' may be omitted. In such an embodiment, the clamp assembly 750' may be provided to hold the filter sheet 610' down during tearing, or alternatively the clamp assembly 750' may be omitted, as the user may manually tear the filter sheet 610' or hold the filter sheet 610' against another support (e.g., a portion of the rear cover 400' forming the slot out of which the filter sheet 610' is dispensed), similar to tearing off a paper towel or piece of saran wrap.

The frame 300' may include at least one motor 310B to operate each fan 310' (FIG. 17). A number of motors 310B may be equal to a number of fans 310', and, as exemplified in FIG. 25, two motors 310B may be provided to correspond to two fans 310' (FIG. 17). The motors 310B may be formed separately and included into an outer casing forming an exterior of the frame 300'. The motors 310B may be configured so that an air flow toward the fan 310' is not blocked. The motors 310B may be provided under the roller assembly 380 so that the filter sheet 610' is guided over the motors 310B to be between a top of the fan housing 300' and a bottom of the top of the case 100'.

As an alternative to the filter cutter 700 described with reference to FIGS. 1-12, a simpler design may omit the filter cutter 700 of the frame 300 and instead include a serrated razor or blade provided to protrude into the slit 420 of the rear cover 400. For example, a serrated blade may be provided in a top of the slit 420 to extend downward. When the filter sheet 610 has been unwound, the user may tear off that portion of the filter sheet 610 by pulling the filter sheet 610 upward against the serrated blade in the slit 420, similar to ripping off a piece of aluminum foil or plastic wrap from a cardboard box having a serrated blade. As another example, the filter sheet 610 may be pre-cut in certain locations to allow the user to simply tear off the filter sheet 610, similar to paper towels. As another alternative, the user may use scissors or another cutting tool to manually cut off the filter sheet 610. As an alternative to the roller motor 221, a simpler design may omit the roller motor 221, and the user may manually unwind the filter sheet 610 by pulling on a portion of the filter sheet 610 hanging out of the rear cover 400.

A number of fans 310' or 310 is not limited. For example, there may be one fan 310' provided at a center of the frame 300', two fans 310' provided to be adjacent in a vertical direction, three fans 310' provided to be adjacent in the left-right direction or in the vertical direction. As another alternative, there maybe two or more frames 300' each having one or more fans 310' that are stacked in a front-rear direction.

Figure 18A:
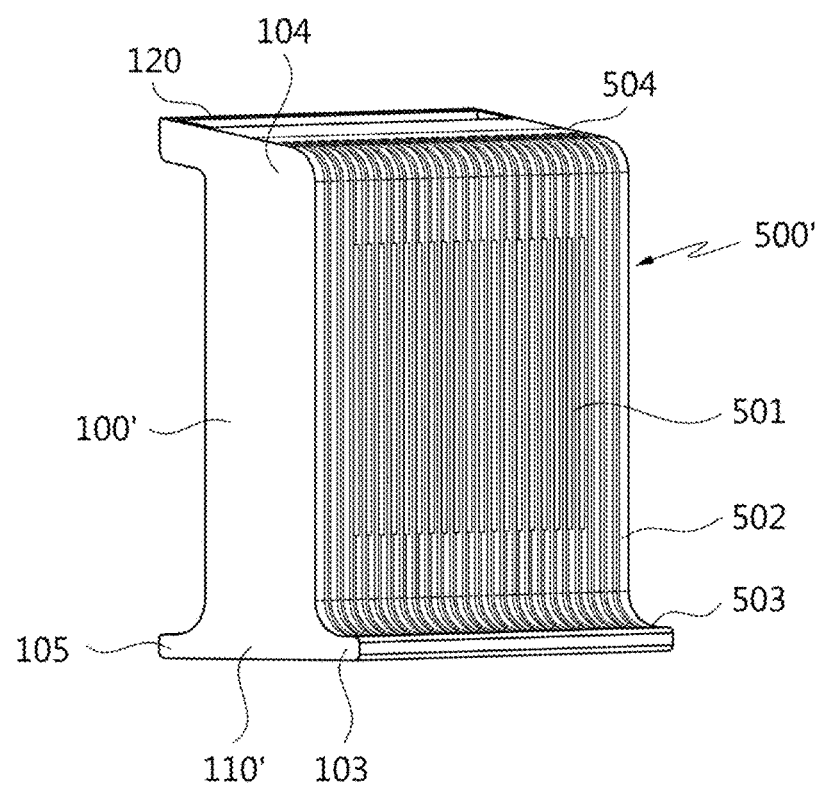
FIG. 18A is a side perspective view with a pre-filter attached to an outer case.
Figure 18B:
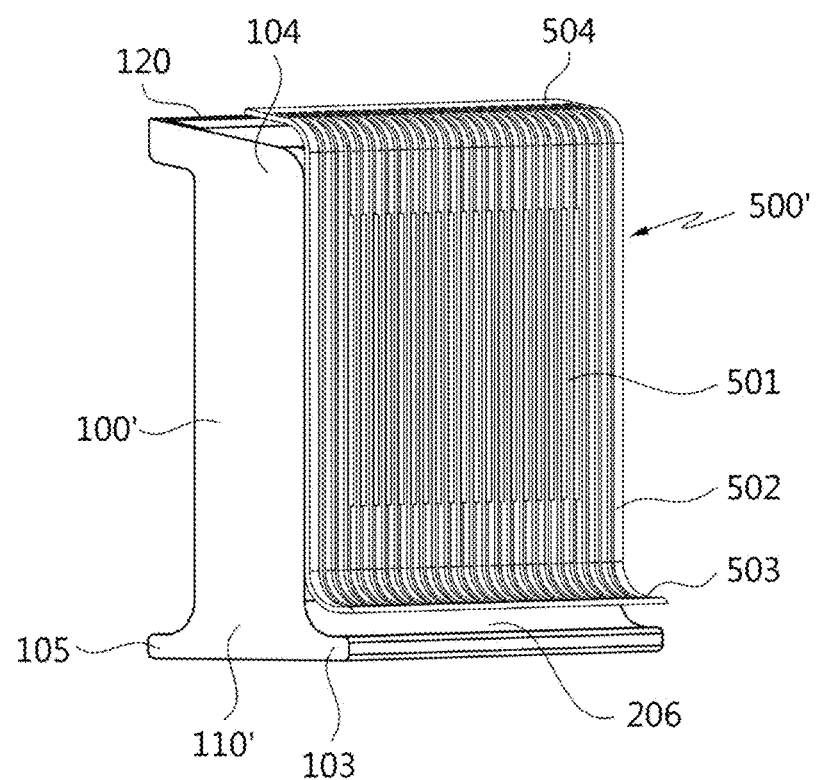
FIG. 18B is a side perspective view with the pre-filter lifted from the outer case.
Figure 19:
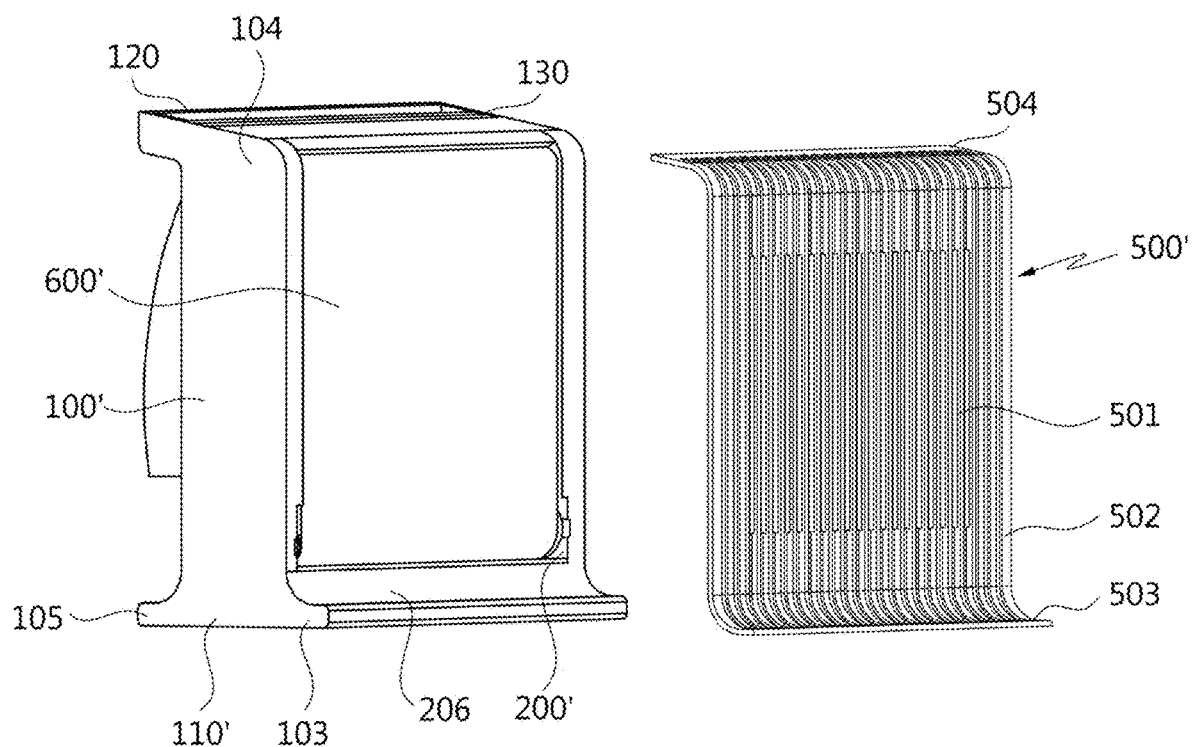
FIG. 19 is a perspective view of the air cleaner with the pre-filter removed.

As an alternative to the ☐-shaped outer case 100' described with reference to FIGS. 17-19, the outer case 100' may have a trapezoidal or curved cuboid shape. A bottom of the outer case 100' may be wider than a top of the outer case 100'. A front of the outer case 100' may define a relatively flat or vertical front opening to receive a rectangularly shaped pre-filter 500'. Alternatively or in addition thereto, the pre-filter 500' may comprise a rectangular grill and an outer wall extending forward and outward from the rectangular grill so as to guide air through the pre-filter 500'. A rear of the outer case 100' may define an inclined rear opening that is inclined rearward from a top to a bottom, and the rear cover 400' may be inclined relative to the floor when coupled to the outer case 100'.

The base 110 or 110' of the air cleaners 1 or 1' may alternatively be powered directly by an external commercial power source via an electrical plug, and wireless charging pads (e.g., wireless charging pad 2) may be omitted.

As another alternative to an implementation of a coupling of the roller 620 in the roll filter cartridge 200, the roller 620 may be provided in a case or a container provided in a bottom of the roll filter cartridge 200, and the filter sheet 610 may be fed through a slit in a top or lid of the case. The roller 620 may rotate freely in the case, which may prevent the roller 620 from moving as the filter sheet 610 is pulled.

As an alternative to the blade housing 704 sliding along the rack 340, alternatively, a stepped portion of the blade housing 704 may not contact the rack 340, leaving a very small gap. In such an embodiment, the stepped portion may primarily serve to balance a center of mass of the blade housing 704.

As an alternative to using time, cooking frequency, filter color, or air flow differential to determine a contamination level of the filter sheet 610', there may be a weight sensor to sense the roll filter 600, and when the weight has increased by a predetermined amount or more, the controller may determine that the predetermined contamination level has been reached.

The clamp 750 may be implemented in various ways. As one simpler implementation, the clamp 750 may include a block having a rack or teeth formed at a left and/or right side. A gear may be provided at a left and/or right side of the frame 300 to engage with the rack. When the gear rotates in a first direction, the block may be raised to form the gap g. When the gear rotates in a second direction opposite to the first direction, the block may be lowered to close the gap g. Such a clamp 750 may omit springs, a ledge, and specially shaped holding blocks or wedges. The gear may be turned manually or alternatively automatically via a motor.

As another simple example, the clamp 750 may be implemented similarly to a hole punch and include a lever and a holding block shaped like the third layer 230 so as to rest on ledges with springs. The user may press the lever to move the holding block downward. A latch may lock with the clamp 750 to keep it in a closed position, and to open the clamp 750 to form the gap g, the latch may be unlocked, and a restoring force of the spring may push a holding block or plate upward.

As another example, the clamp 750 may include a holding block resting on a spring and ledge and at least one piston to move the holding block down. There may be two pistons so that a downward force is evenly applied to the filter sheet 610. When the piston is not moving the holding block downward, a restoring force of the spring may lift the holding block upward to create the gap g.

Similarly, the clamp 750 may include a holding block resting on a spring and ledge and a cam that is rotated to contact the holding block. The cam may be elliptical or eccentric. A cam shaft, which may be horizontal to be parallel with an upper surface of the holding block, may be inserted into the cam at a position such that one side (i.e., a long side) of the cam may be longer than an opposite side (i.e., a short side) of the cam. The cam may be rotated such that the long side contacts the holding block and pushes the holding block down to hold the filter sheet and close the gap g. To open the clamp 750, the cam may be rotated 180 degrees to a position where the long side extends away from the holding block, and a restoring force of the spring may push the holding block upward to contact the short side of the cam and form the gap g. There may be two cams provided that rotate in phase so as to keep a downward force on the filter sheet 610 even and dispersed.

Embodiments of the clamp 750 having a spring that compresses upon a downward motion may, at a resting or neutral state of the spring, remain in an opened position to form the gap g. As an alternative to these embodiments, a position of the spring and holding block may be configured such that the spring is compressed when the holding block is lifted up to form the gap g, and then to close the gap g, the holding block is released, and a restoring force of the spring closes the gap g. In such alternative embodiments, a natural or initial state of the clamp 750 may be a closed position instead of an open position.

Another implementation of the clamp 750 may be more similar to an implementation with the first and second layers 710 and 720 shaped like wedges. Instead of having the clamp gear 742 engage with the teeth 711 of the first layer 710, a thinner end of the first layer 710 may have a blunt end, and a spring (e.g., coil spring) may extend horizontally from the thinner end of the first layer 710. A first knob, button, or handle may be provided on a thicker end of the first layer 710 to protrude outside of the outer case. A second knob, button, or handle may be provided on the end of the spring. To lower the clamp 750, the user may push the first knob, which may move the first layer 710 horizontally and compress the spring. There may be a latch or lock to lock the first layer 710 in place. To raise the clamp 750, the latch may be released, and a restoring force of the spring may move first layer 710 back to its initial position, raising the third layer 730 to form the gap g.

Embodiments of the clamp 750 are not limited and may be implemented in a variety of ways such as hydraulic pumps, pistons, cams, motors, rack and pinions, gears, and linear actuators.

This application is related to co-pending U.S. application Ser. No. 17/020,975 filed on Sep. 15, 2020, Ser. No. 17/020,995 filed on Sep. 15, 2020, Ser. No. 17/021,015 filed on Sep. 15, 2020, Ser. No. 17/021,040 filed on Sep. 15, 2020, and Ser. No. 17/021,057 filed on Sep. 15, 2020, the entire contents of which are hereby incorporated by reference.

Embodiments disclosed herein may provide a portable air cleaner or purifier capable of efficiently cleaning air after cooking. The air cleaner may be light weight so that a user may easily move the air cleaner from, for example, a floor to a counter top or from a counter top to a table. The air cleaner may be suited for use on a countertop next to a cooktop, where a kitchen hood may not be installed or to serve as a secondary kitchen hood, or for use in a second kitchen or mother-in-law suite. The air cleaner may be well-suited for travel, and may be brought to a resort or a hotel. The air cleaner may also be well-suited for mobile homes or trailers.

Embodiments disclosed herein may provide an air cleaner having a tear-off roll filter so that dirty sections of the filter may be discarded and replaced by cleaner sections of the filter. The roll filter may be replaceable, similar to how paper towels are replaceable. The air cleaner may provide a motor to automatically unwind the filter when the filter is dirty and a filter cutter to automatically cut the filter off of the roll for disposal. The roll filter may be made of a fabric or soft material, and may be attached to a frame that slides into and out of a case or housing of the air cleaner.

Embodiments disclosed herein may provide an air filter having a removable metal pre-filter that shields larger oil droplets and dirt from an internal roll filter and that may be washed in a dishwasher.

Embodiments disclosed herein may provide an air cleaner having easily removable filters for easy replacement, cleaning, or reparation. The air cleaner may monitor dirtiness of the filters, cooking frequency, or time and suggest when to repair or clean the filters. The air cleaner may have a roll filter that is automatically rolled and cut based on a dirt level of the filter, time, or cooking frequency.

Embodiments disclosed herein may provide an air cleaner having a battery charged via a charging pad so that a location of the air cleaner may not be limited.

Embodiments disclosed herein may provide an air cleaner that monitors smoke, oil, dust, and odors, and to indicate when various filters of the air cleaner need to be replaced based on smoke, oil, dust, and odor detections.

Embodiments disclosed herein may provide an air cleaner having a sleek, modern, and beautiful design so as to make a room where the air cleaner is located more aesthetically pleasing.

Embodiments disclosed herein may be implemented as an air cleaner comprising an outer case having a first opening and a second opening, a grill coupled to the outer case to cover the first opening and having a plurality of openings through which air may be suctioned, a roll filter provided behind the grill, the roll filter having a roller and a filter sheet wound around the roller, wherein a first unwound section of the filter sheet extends from the roller and faces the grill, and a fan provided behind the roll filter and configured to suction air through the openings of the grill and discharge air out of the second opening.

The grill may filter airborne oil droplets of a first size and the first unwound section of the filter sheet may filter oil mist of a second size smaller than the first size. A secondary filter may be provided between the roll filter and the fan and may be configured to filter foreign matter having a third size smaller than the second size. The secondary filter may be a carbon filter to filter odorants.

The grill may be a made of metal and the roll filter may be made of at least one of a fibrous material or a porous material. The fibrous material may be one of paper, fabric, or nanofiber. The porous material may have ultrafine pores.

The roll filter may be provided in a filter cartridge. The outer case may have a top opening to allow insertion or removal of the filter cartridge into or from the outer case.

An inner support may be provided inside of the outer case. A frame may be supported by the inner support. The fan may be provided in the frame. The roller may be supported by at least one of the inner support or the frame.

The roller may be provided at a bottom of the outer case. The first unwound section of the filter sheet may extend upward from the roller. A portion of the filter sheet may be secured above the fan.

A first roller and a second roller may be provided. The first unwound section of the filter sheet may be fed between the first and second rollers when the first and second rollers are rotating in opposite directions such that a second unwound section of the filter sheet may be pulled from the roller to face the grill.

The cover may include a slit. The first and second rollers may be rotated until an end of the first unwound section of the filter sheet passes through the slit.

A clamp may hold a portion of the filter sheet between the first and second unwound sections of the filter sheet. The clamp may be provided between the cover and the first and second rollers. A cutter may have a blade to remove the first unwound section from the filter sheet.

A display and at least one sensor may be provided. The sensor may sense at least one of a contamination level of the second filter, a difference in air flow of suctioned air and discharged air, or an air quality of discharged air. The display may indicate a sensing by the sensor.

Embodiments disclosed herein may be implemented as an air cleaner comprising an outer case having an air inlet and an air outlet, a grill coupled to the outer case to cover the air inlet through which air may be suctioned, the grill being configured to filter airborne oil droplets of a first size, a first filter provided behind the grill, the first filter including at least one of a fibroid material or a porous material that may be configured to filter oil mist containing particles of a second size smaller than the first size, a second filter provided behind the first filter, the second filter being configured to filter odorants, and a fan provided behind the second filter to suction air through the grill and discharge air out of the air outlet.

A cover may have an opening serving as the air outlet and a slit. The first filter may include a roller provided at a bottom of the outer case and a filter sheet. A first section of the filter sheet may be wound around the roller. A second section of the filter sheet may be selectively secured above the fan and below the outer case. When the roller is unwound, the first section may face the grill and the second section of the filter sheet may pass over the fan and through the slit.

The outer case may include an opening perpendicular to the air inlet. The first filter may be provided on a frame. The frame may be removable through the opening to allow replacement of the first filter with a new first filter.

A frame may be provided. The fan, the first filter, and the second filter may be supported in the frame. The frame may be removable by removing the grill to allow replacement of at least one of the first filter or the second filter.

Embodiments disclosed herein may be implemented as an air cleaner comprising an outer case having a left side, a right side opposite to the left side, a front opening, a rear opening opposite to the front opening, a top opening, and a bottom configured to be seated on a flat surface. A left-right length from the right side to the left side may be longer than a front-rear length from front opening to the rear opening. A rear cover may cover the rear opening and have a plurality of discharge openings through which air is discharged. A grill may be provided on the outer case to cover the front opening and configured to be pulled and removed from the outer case. The grill may have a plurality of suction openings through which air is suctioned. A frame may be provided in the outer case and have left and right sides that align with the left and right sides of the outer case. A fan may be housed in the frame and configured to suction air through the grill and discharge air out of the rear cover. A filter cartridge may be provided in the outer case and have left and right sides that align with the left and right sides of the outer case and a top configured to close the top opening. The filter cartridge may be spring-loaded in the outer case between the frame and the grill and may be configured to be removed through the top opening.

Embodiments disclosed herein may be implemented as an air cleaner comprising a portable air cleaner and a charging pad. The portable air cleaner may include an outer case having a base provided at a bottom, an air inlet, and an air outlet, a battery and a wireless power receiver provided in the base, a grill covering the air inlet and having a plurality of suction openings through which air may be suctioned, a frame provided inside of the outer case behind the grill, a fan housed in the frame and configured to suction air through the grill and discharge air out of the air outlet, the fan being configured to be powered by the battery, and a first filter provided between the grill and the frame. The charging pad may be provided below the base having a wireless power transmitter to wirelessly transmit power to the wireless power receiver of the portable air cleaner when the base may be seated on the charging pad.

A user interface may be provided on top of the outer case and configured to be powered by the battery. The user interface may include a motion detector. An operation of the fan may be controlled based on a sensing by the motion detector. The user interface may include a display to indicate at least one of a speed of the fan, a contamination level of the filter, or a sensed air quality.

The filter may be a roll filter having a sheet wound around a roller. A first motor may be configured to unwind the sheet by a predetermined amount such that a new section of the sheet may be provided between the grill and the fan. The first motor may be configured to be powered by the battery.

A filter cutter may have a blade and a second motor configured to move the blade across the sheet to cut a section of the sheet that may have been unwound and may be no longer between the grill and the fan. The second motor may be configured to be powered by the battery.

A clamp may be configured to press the sheet at a predetermined position to maintain a position of the sheet. The clamp may include a third motor configured to be powered by the battery.

At least one roller may be configured to grip and move the filter sheet such that the filter sheet may be unwound and fed through a slit formed in a cover of the outer case. The roller may be operated by the first motor.

At least one sensor may be configured to be powered by the battery to sense at least one of a contamination level of the filter, markings provided on the filter sheet, or an operation of the first motor. The first motor may be operated based on at least one of a detection by the sensor, a passage of time, a cooking frequency, or a user input.

A second filter may be provided behind the first filter. The first filter may filter oil mist and the second filter filters odorants.

Embodiments disclosed herein may be implemented as a portable air cleaner to be placed adjacent to a cooking appliance comprising an outer case having a left side, a right side opposite to the left side, an air inlet, an air outlet, a bottom, and a top, the left and right sides being perpendicular to the bottom and the top, a grill coupled to the outer case to cover the air inlet through which air may be suctioned, the grill being configured to filter airborne oil droplets of a first size, a first filter provided behind the grill, the first filter including at least one of a fibroid material or a porous material that may be configured to filter oil mist containing particles of a second size smaller than the first size, a second filter provided behind the first filter, the second filter being a carbon filter configured to filter odorants, and at least one fan provided behind the second filter to suction air through the grill and discharge air out of the air outlet. A length of the portable air cleaner may be no greater than a depth or width of a cooking appliance.

The length of the portable air cleaner may be defined by a distance between the left side and the right side and may be 24-26 inches. A width defined by a distance between the air inlet and the air outlet may be 6 inches or less. A height defined by a distance from the top to the bottom may be 12 inches or less.

A battery may be provided in the outer case to power the fan. The outer case may be formed with a handle for transport from a first location to a second location. A total weight of the air cleaner 1 may be 10 pounds (lbs) or less, not including a charging pad. For example, the weight of the air cleaner 1 may be 4.5 kg (9.9 pounds).

A frame may support at least one of the first filter, the second filter, or the fan. The at least one fan may include a first axial fan and a second axial fan that are adjacent to each other along the length.

The filter may be a roll filter having a filter sheet wound around a first roller. The first roller may be adjacent to one of the top or the bottom of the outer case. At least one second roller may be provided adjacent to the other of the top or the bottom of the outer case and configured to unwind the filter sheet from the first roller. The first filter or the grill may be spring-loaded to the outer case so as to be released from the outer case upon a restoring force of a spring.

Embodiments disclosed herein may be implemented as a portable air cleaner configured to be placed adjacent to a cookware. The portable air cleaner may include an outer case having a left side, a right side opposite to the left side, an air inlet, an air outlet, a bottom, and a top, the left and right sides being perpendicular to the bottom and the top, a grill coupled to the outer case to cover the air inlet through which air may be suctioned, the grill being configured to filter airborne oil droplets of a first size, a first filter provided behind the grill, the first filter including at least one of a fibroid material or a porous material that may be configured to filter oil mist containing particles of a second size smaller than the first size, a second filter provided behind the first filter, the second filter being a carbon filter configured to filter odorants, and at least one fan provided behind the second filter to suction air through the grill and discharge air out of the air outlet. A length of the portable air cleaner may be no greater than 18 inches. The length of the portable air cleaner may be defined as a distance between the air inlet and the air outlet and may be at least equal to 12 inches.

The grill may be secured to the outer case via at least one of a latch or a magnet and may be configured to be removable to allow access to an inside of the outer case. The first filter may be a roll filter having a roller and a sheet wound around the roller. The roller may be configured to be removed from an inside of the outer case.

Embodiments disclosed herein may be implemented as an air cleaner comprising an outer case having an air inlet through which air may be suctioned and an air outlet through which air may be discharged, a fan provided inside of the outer case to suction air through the air inlet and to discharge air out of the air outlet, and a filter cartridge including a filter roller and a filter sheet having a plurality of sections wound around the filter roller, each section being configured to be unwound from the filter roller to filter contaminants in the suctioned air such that at least one of the filter sheet or the filter cartridge may be replaced when all sections of the filter sheet have been unwound from the roller.

When a corresponding section may have reached a predetermined contamination level, the filter roller may be unwound to expose an adjacent section to the suctioned air, and the corresponding section may be moved to an outside of the outer case and thereafter separated from the filter sheet.

Unwinding rollers may be provided in the outer case and configured to pull the filter sheet in a direction away from the filter roller so as to unwind the filter sheet from the filter roller. The unwinding rollers may include a first roller, a second roller provided adjacent to the first roller, and a motor configured to rotate the second roller. When the motor is driven, the filter sheet may be passed between the first roller and the second roller such that the filter sheet may be unwound from the roller.

A filter cutter may be configured to cut across the filter sheet to remove the corresponding section of the filter sheet. The filter cutter may include a blade configured to cut the filter sheet, a blade housing coupled to the blade, a rack extending between a first side of the outer case and a second side of the outer case, the rack having a first end closer to the first side of the outer case and a second end closer to the second side of the outer case, a gear moveable with the blade housing and configured to engage with the rack to move across the rack between the first and second ends of the rack, and a motor configured to rotate the gear to move the blade housing across the rack. When the motor is operated, the blade may be moved across the filter sheet to cut the corresponding section from the filter sheet, and the corresponding section of the filter sheet may be configured to be removed without further unwinding the filter sheet.

A clamp may be provided in the outer case to hold down the filter sheet.

The clamp may include a holding block having a bottom surface and an upper surface that may be inclined downward from a first side of the inner frame toward a second side of the inner frame (or, alternatively, a wedge coupled to a top of a block), an upper wedge or block provided on top of the holding block, the upper wedge having a flat or level upper surface and a lower surface that may be inclined downward from the first side of the inner frame toward the second side, and a motor configured to apply a force on the second side of the upper wedge to move the upper wedge in a first direction such that the holding block may be moved in a second direction perpendicular to the first direction, the second direction being a direction toward a portion of the filter sheet to be held down. The grill may be configured to be removed from the outer case to allow access to the roller of the filter.

Embodiments disclosed herein may be implemented as an air cleaner comprising a case having a left wall, a right wall opposite to the left wall, a bottom, a top provided opposite to the bottom, a front opening, and a rear opening provided opposite to the front opening, the right and left walls being perpendicular to the front and rear openings, a left-right direction extending between the right and left walls, and a vertical direction extending between the top and the bottom, a fan provided inside of the case and configured to suction air through the front opening and discharge air out of the rear opening, a grill coupled to the case to cover the front opening, a filter roller provided inside of the case and extending in a left-right direction, the filter roller being configured to rotate and be removable from the inside of the case, and a filter sheet configured to filter foreign matter from suctioned air and wound around the filter roller such that, when the filter sheet may be unwound, a first section of the filter sheet extends in the vertical direction between the filter roller and the top of the case so as to cover an intake of the fan and be exposed through the front opening.

A filter cartridge may be provided inside of the case and have left and right walls that align with the left and right walls of the case. The filter roller may be rotatably coupled to the left and right walls of the filter cartridge and may be configured to be removed from the filter cartridge. The top of the case may include an opening. The filter cartridge may be configured to be inserted through the opening to be removed from the case. A roller assembly may be provided at a top of the filter cartridge to further unwind the filter sheet from the filter roller and guide the first section of the filter sheet through the roller assembly in a direction away from the grill. The roller assembly may include a first roller extending in the left-right direction, a second roller provided above the first roller and configured to engage with the first roller such that, when the first roller may be rotated in a first rotational direction, the second roller may be rotated in a second rotational direction opposite to the first rotational direction, and a motor configured to rotate the first roller. The first section of the filter sheet may be fed between the first and second rollers such that, when the motor rotates the first roller, the first section of the filter sheet may be moved in a direction away from the grill, and a second section of the filter sheet may be unwound from the filter roller to extend in the vertical direction between the filter roller and the top of the case so as to cover an intake of the fan and be exposed through the front opening.

A frame may house the fan. The frame may have left and right walls that align with the left and right walls of the case, respectively. When the filter sheet is unwound, a portion of the filter sheet may move across a top of the frame. A filter cutter and a clamp may be provided on top of the frame. The frame may be provided between the filter cartridge and the rear opening. The clamp may be configured to hold down the portion of the filter sheet. The filter cutter may be configured to cut across the portion of the filter sheet in the left-right direction.

The filter cutter may include a blade having left and right sides, at least one of the left and right sides being configured to cut the filter sheet, a blade housing coupled to a bottom of the blade, a gear moveable with the blade housing, a rack extending between the left and right walls of the frame and configured to engage with the gear, and a motor to rotate the gear. When the motor is operated to turn the gear in a first direction, the blade housing may be moved from the left wall of the frame toward the right wall of the frame. When the motor is operated to turn the gear in a second direction opposite to the first direction, the blade housing may be moved from the right wall of the frame toward the left wall of the frame. The filter sheet may be cut when the gear may be turned in at least one of the first or second directions.

An inner support may have left and right walls coupled to the left and right walls of the outer case. The inner support may have a latch assembly configured to release the grill from the outer case. The fan and the roller filter may be provided in a frame. The frame may be configured to couple to the inner support and have left and right walls that align with the left and right walls of the inner support, respectively. The frame may include a roller support extending downward and the inner support includes a recess. At least one of the roller support or the filter roller may be supported in the recess of the inner support. The fan may be provided in the frame to be above the filter roller.

A roller assembly may be provided at a top of the frame to further unwind the first section of the filter sheet. A clamp may be provided at a top of the frame to hold down a portion of the filter sheet. A filter cutter may be provided at a top of the frame to cut the filter sheet in the left-right direction to remove the first section from the filter sheet.

The latch assembly may include a latch, a spring coupled to the latch, and a lock configured to couple to and decouple from the latch. When the grill is pressed down to couple to the case, the latch may be pushed down, the spring may be compressed, and the lock may be coupled to the latch to maintain a compressed state of the spring. When the lock is decoupled from the latch, a restoring force of the spring may push the latch upward to separate a top of the grill from the case.

Embodiments disclosed herein may be implemented as a filter cartridge, comprising a roller configured to be rotatable inside of and removable from an air cleaner, and a filter sheet having 1st to (n)th sections which are wound around a filter roller. The filter sheet may be made from at least one of a fibrous or porous material configured to filter oil mist. The filter sheet may be unwound to withdraw the (n)th section from the filter roller to filter contaminants. When the (n)th section reaches a predetermined contamination level, the filter sheet may be configured to be further unwound to withdraw an (n−1)th section from the filter roller to filter contaminants, the (n−1)th section being provided adjacent to the (n)th section. When the 1st section reaches the predetermined contamination level, at least one of the filter sheet or the filter roller may be configured to be replaced.

A clamp may be configured to hold down a portion of the filter sheet between consecutive sections of the filter sheet to maintain a position of the filter sheet. A plurality of unwinding rollers may further unwind the filter sheet such that, when the plurality of unwinding rollers are rotated, the nth section of the filter sheet may be fed between the plurality of unwinding rollers and the (n−1)th section of the filter sheet may be unwound from the filter roller to extend between the filter roller and the plurality of unwinding rollers. A filter cutter may include a blade to cut the filter sheet to remove the nth section from the filter sheet.

Embodiments disclosed herein may be implemented as an air cleaner comprising an outer case having an inlet through which air may be suctioned, an outlet through which may be air discharged, a dispensing slit, and a grill covering the inlet, a frame provided inside of the outer case, a fan housed in the frame to suction air through the inlet and discharge air out of the outlet, a roll filter provided inside of the case and having a filter roller and a filter sheet having a plurality of sections wound around the filter roller, a filter cutter configured to cut a corresponding section of the filter sheet that may have moved between the frame and the outer case when unwound, a first motor configured to unwind the filter sheet from the roll filter, and a second motor configured to operate the filter cutter to cut the corresponding section from the filter sheet after the filter sheet may be unwound by a predetermined amount via the first motor.

A user interface may be configured to receive a command to cut the corresponding section of the roll filter. A clamp may be configured to hold a portion of the filter sheet between the corresponding section and an adjacent section. When a user inputs a command to cut the corresponding section of the roll filter, the first motor may be driven to unwind the filter sheet by a predetermined amount, the clamp may be driven to hold down the portion of the filter sheet, and the second motor may be driven such that the filter cutter cuts the corresponding section from the adjacent section. The clamp may include a slot for the filter cutter to slide along a center of the portion of the filter sheet.

The filter cutter may further include a rack extending across the frame, a blade having an upper end, a lower end, and a first sharp edge provided between the upper and lower ends, the upper end being provided above the filter sheet, the lower end being provided below the corresponding section of the filter sheet, and the sharp edge being configured to cut the filter sheet, a blade housing coupled to the lower end of the blade, and a gear coupled to a lower section of the blade housing and configured to engage with the rack. The second motor may be configured to rotate the gear such that, when the gear is rotated in a first rotational direction, the gear may be moved in a first linear direction across the rack to move the blade in the first linear direction across the filter sheet such that the sharp edge of the blade cuts the filter sheet.

The blade may include a second sharp edge provided between the upper end and the lower end. When the gear is rotated in a second rotational direction opposite to the first rotational direction, the gear may be moved in a second linear direction opposite the first linear direction across the rack to move the blade in the second linear direction across the filter sheet such that the second sharp edge of the blade cuts the filter sheet.

The first motor may be automatically turned on based on at least one of a contamination level of the filter sheet sensed by a contamination level sensor, a user command input into a user interface, a difference in air flow of suctioned air and discharged air, a passage of time, or a frequency of operation of the fan. The first motor may be automatically turned off based on at least one of a movement of the filter sheet by a predetermined amount determined based on an operation of the first motor sensed by a motor sensor, a movement of the filter sheet by a predetermined amount determined based on markings provided on the filter sheet and sensed by a markings sensor, a passage of time, or a user command input into a user interface.

A clamp may hold down the filter sheet during cutting. The second motor may be automatically operated based on at least one of a downward movement of the clamp, a user command input into a user interface, or a passage of time after the first motor may have turned off.

A cover may have a dispensing slit. A first roller may be provided under the top of the case. A second roller may be provided between the first roller and the top of the case and configured to engage with the first roller such that, when the first roller may be rotated in a first rotational direction, the second roller may be rotated in a second rotational direction opposite to the first rotational direction. The first roller may be driven by the first motor. The filter sheet may be provided between the first and second rollers such that, when the first roller rotates, the filter sheet may be unwound and moved toward the dispensing slit.

A clamp may be provided between the dispensing slit and the first and second rollers to secure a position of the corresponding section of the filter sheet moving below the top of the outer case.

The frame may include a flat surface onto which the corresponding section of the filter sheet may be guided by the first and second rollers. The clamp may be provided on the flat surface of the frame. The clamp may include a first ledge and a second ledge protruding upward from the flat surface of the frame, a first spring and a second spring provided above the first ledge and the second ledge, respectively, a holding block having an upper section and a lower section, the upper section being longer than the lower section so as to have a first end and a second end protruding outward, the first and second ends being provided above the first and second springs, and the lower section having a flat bottom surface configured to contact the filter sheet or the flat surface of the frame with the filter sheet when the first and second springs are compressed, a lower wedge having a bottom surface and an upper surface, the bottom surface being fixed to the upper section of the holding block and the upper surface being inclined downward from a first side to a second side such that a height of the first side of the lower wedge may be greater than a height of the second side of the lower wedge, an upper wedge having an upper surface and a bottom surface which may be moveable relative to the upper surface of the lower wedge, the bottom surface being inclined downward from a first side to a second side such that a height of the second side of the upper wedge may be greater than a height of the first side of the upper wedge, and a third motor configured to apply a force to move the second side of the upper wedge in a direction toward the first side of the lower wedge such that after the filter sheet may be guided between the flat surface of the frame and the holding block, the holding block may be moved downward to compress the first and second springs and the filter sheet.

The upper surface of the upper wedge may be formed with teeth. The third motor may be configured to rotate a gear configured to engage with the teeth such that, when the gear may be rotated in a first rotational direction, the gear moves the second side of the upper wedge toward the first side of the lower wedge, and the lower wedge and the holding block may be pushed down to compress the first and second springs until the holding block contacts the filter sheet. When the gear is rotated in a second rotational direction opposite to the first rotational direction, the gear may move the second side of the upper wedge away from the first side of the lower wedge, and a restoring force of the first and second springs may push the holding block and the lower wedge upward to create a gap between the bottom section of the holding block and the flat surface of the frame.

The filter cutter may be provided below the flat surface of the frame. The flat surface of the frame may include a first slot. The bottom section of the holding block may include a second slot that vertically aligns with the first slot. The filter cutter may include a blade that protrudes through the first and second slots to cut the filter sheet.

The filter roller may be housed in a roll filter cartridge. The frame may be provided between the roll filter cartridge and the outlet. The first and second rollers may be provided in an upper section of the roll filter cartridge. The clamp and the filter cutter may be provided in an upper section of the frame.

The frame may include a roller support in which the filter roller may be provided. The fan may be provided in an upper section of the frame above the filter roller, and the first and second rollers, the clamp, and the filter cutter are provided on top of the frame.

Embodiments disclosed herein may be implemented as a filter assembly for an air cleaner, comprising a filter having a roller and a filter sheet wound around the roller, a filter guide configured to pull an end of the filter sheet to unwind the filter sheet from the roller, and a filter cutter configured to cut between two adjacent unwound sections of the filter sheet. The filter cutter may include a blade having at least one cutting edge configured to cut the filter sheet, a rack extending across the filter sheet, a gear configured to engage with the rack, and a blade housing coupled to the blade and moveable with the gear such that, when the gear is rotated in a first rotational direction, the gear, the blade housing, and the blade are moved across the rack in a first linear direction such that the cutting edge of the blade cuts between adjacent unwound sections of the filter sheet. When the gear is rotated in a second rotational direction opposite to the first rotational direction, the gear, the blade housing, and the blade may be moved across the rack in a second linear direction opposite to the first linear direction.

A clamp may hold down the filter sheet. The rack may be provided below the filter sheet. A bottom of the blade may be provided below the filter sheet. A top of the blade may be provided above the filter sheet. The clamp may include at least one holding block provided above the filter sheet. The clamp may include a clamp motor configured to cause a downward force on the holding block to clamp the filter sheet. The clamp motor may be configured to automatically turn on after the filter sheet may have been unwound by a predetermined amount.

The filter cutter may include a motor. The motor of the filter cutter may be configured to automatically turn on after the clamp motor may have lowered the holding block to hold down the section of the filter sheet.

At least one spring may support the clamp such that, when the holding block is pushed down, the spring may be compressed, and when the downward force on the holding block is ceased, a restoring force of the spring may push the holding block upward to create a gap through which an edge of the unwound section of the filter sheet may be guided.

Embodiments disclosed herein may be implemented as a filter assembly comprising a filter having a roller and a filter sheet wound around the roller, a filter guide to guide the filter sheet onto a flat surface when the filter sheet may be unwound from the roller, and a clamp configured to selectively hold down an unwound section of the filter sheet. The clamp may have a beam with first and second surfaces, and when a force is applied on the first surface, the unwound section of the filter sheet may be clamped between the second surface and the flat surface. A filter cutter may have a cutting edge to cut the unwound section when the clamp clamps down the unwound section.

The clamp may include an upper wedge provided above the beam such that, when the upper wedge is moved, the beam may be forced downward onto the unwound section.

The clamp may further include a first ledge and a second ledge provided above the flat surface, a first spring and a second spring provided above the first ledge and the second ledge, respectively, and a lower wedge provided between the beam and the upper wedge. The beam may have an upper section and a lower section, the upper section being longer than the lower section so as to have a first end and a second end protruding outward, the lower section having a flat bottom surface configured to contact the filter sheet or the flat surface, and the first and second ends provided above the first and second springs, respectively. The lower wedge may have a bottom surface and an upper surface, the bottom surface being fixed to the upper section of the beam and the upper surface being inclined downward from a first side to a second side such that a height of the first side of the lower wedge may be greater than a height of the second side of the lower wedge. The upper wedge may have an upper surface and a bottom surface seated on the upper surface of the lower wedge, the bottom surface being inclined downward from a first side to a second side such that a height of the second side of the upper wedge may be greater than a height of the first side of the lower wedge.

The clamp may further comprise a case configured to prevent the upper wedge from rising, the upper and lower wedges and the beam being provided inside of the case, and the first and second ledges being formed as stepped portions inside of the case, a gear configured to engage with teeth formed in the upper surface of the upper wedge at the second side, and a motor configured to rotate the gear. When the motor rotates the gear in a first rotational direction, the upper wedge may be moved in a first horizontal direction relative to the lower wedge to push the lower wedge and beam downward toward the flat surface to compress the first and second springs. When the motor rotates the gear in a second rotational direction opposite to the first rotational direction, the upper wedge may be moved in a second horizontal direction opposite to the first horizontal direction, and a restoring force of the first and second springs pushes the lower wedge and beam upward away from the flat surface.

The filter cutter may have a blade having a cutting edge. The blade may be movable between sides of the unwound section such that the cutting edge separates the unwound section from the filter sheet.

The filter cutter may further include a rack provided below the flat surface, a first slot formed in the flat surface, a blade configured to protrude through the first slot of the flat surface to cut the filter sheet, a housing coupled to the blade, and a gear moveable with the housing and configured to engage with the rack to move the blade across the filter sheet.

The rack may be provided below the clamp, the lower section of the beam may include a second slot that aligns with the first slot of the flat surface, and the blade may be configured to protrude through the first and second slots to move inside of the beam to cut the filter sheet.

Embodiments disclosed herein may be implemented as an air cleaner comprising a case having an inlet through which air may be suctioned and an outlet through which air may be discharged, a fan provided inside of the case to suction air through the inlet and discharge air out of the outlet, a roll filter including a roller and a filter sheet wound around the roller, a filter guide configured to unwind the filter sheet from the roller, a clamp configured to selectively hold down the filter sheet, a filter cutter configured to remove a section of the filter sheet from the rest of the filter sheet, the filter guide guiding the filter sheet toward the filter cutter, and a user interface having a motion sensor to detect a gesture from outside of the case. A speed of the fan may be controlled based on a detection by the motion sensor.

The motion sensor may be provided on a top of the case. The inlet may be provided on a front of the case. The outlet may be provided on a rear of the case opposite to the front. A grill may be secured to the case to cover the inlet. The grill may be secured via at least one of a magnet or latch so as to be removable.

A first motor may drive the fan. When the fan is turned off and the motion sensor detects a hand wave across the motion sensor, the first motor may be turned on to rotate the fan at a first speed.

When the fan is rotating at the first speed and the motion sensor detects a hand wave across the motion sensor, the first motor may rotate the fan at a second speed greater than the first speed.

Before the filter guide unwinds the filter sheet from the filter roller, the clamp may be released. When the filter guide unwinds the filter sheet from the filter roller, a first unwound section of the filter sheet may be provided between the fan and the inlet and a second unwound section of the filter sheet passes through the filter guide. After the filter guide has unwound the filter sheet by a predetermined amount, the clamp may hold down the filter sheet and the filter cutter may remove the second unwound section from the filter sheet.

A sensor may be configured to detect a contamination level of the first unwound section of the filter sheet. At least one button or touch sensor provided on the user interface to allow user input. A second motor may operate the filter guide. When the sensor detects that the first unwound section of the filter sheet is a predetermined contamination level and the button has been pressed, the clamp may be released, the second motor may be operated such that the filter guide unwinds the roll filter by the predetermined amount, and a section of the filter sheet previously wound around the roller becomes the first unwound section. The predetermined amount may reflect an amount where the first unwound section passes through the filter guide to become the second unwound section A third motor may operate the filter cutter and a fourth motor may operate the clamp. The fourth motor may be automatically operated such that the clamp holds down the filter sheet when at least one of the second motor is stopped after operating, the roll filter is unwound by the predetermined amount, or the button of the user interface is pressed. The third motor may be automatically operated to move the filter cutter across filter sheet to remove the second unwound section when the fourth motor is stopped after operating, a predetermined time has passed after the second motor is stopped after operating, a predetermined time after the roll filter has been unwound by the predetermined amount, or at least one of a hand wave is sensed by the motion sensor or a button of the user interface is pressed.

An operation of the fan may be automatically stopped before an operation of the filter guide or the filter cutter is started. The user interface may include a display to indicate at least one of a filter contamination level, an air quality, a fan speed, or an amount of the roll filter that may have been unwound.

Embodiments disclosed herein may be implemented as an air cleaner comprising a case having a left wall, a right wall opposite to the left wall, a front extending between the left and right walls, an air inlet at least partially formed in the front, a rear opposite to the front and extending between the left and right walls, a top, a base opposite to the top, the base being configured to be seated on a flat surface, and an air outlet at least partially formed in at least one of the rear, the left wall, the right wall, or the top, a fan provided inside of the case to suction air through the air inlet and to discharge air out of the air outlet, a filter provided between the fan and the air inlet to filter oil mist from suctioned air, and a grill coupled to the case to cover the air inlet, the grill being configured to be separated from the case to allow access to the fan and the filter.

A user interface may be provided on the top of the case. The user interface may have a panel, a plurality of notifications provided on the panel to indicate a fan speed, a contamination level of the filter, and a notice to replace the filter, a plurality of LEDs to selectively illuminate the notifications, a motion sensor configured to sense a gesture from outside of the case, and at least one of a button or touch sensor to sense a push. A speed of the fan may be increased based on a number of hand swipes across the panel sensed by the motion sensor.

The grill may be latched to the case. The latch may be opened to release the grill from the case based on the button or touch sensor sensing a push. A least one magnet may be provided on at least one of the grill or the case to magnetically secure the grill to the case.

The air inlet may be partially formed in the top of the case. The grill may include a front section and a top section bent from the front section such that the grill covers the entire air inlet.

The base may have a front section that extends forward from the left and right walls. The grill may include a front section and a bottom section bent from the front section and configured to cover a top of the front section of the base.

The filter may be a roll filter having a roller and a filter sheet wound around the roller. The roller may be provided in a lower section of the case. The filter sheet may be unwound from the roller. A portion of the filter sheet may be secured in an upper section of the case such that the filter sheet extends from the roller toward the top of the case to be between the fan and the air inlet. The filter sheet may have a width greater than or equal to a width of the air opening, the widths of the filter sheet and the air inlet being in a left-right direction extending from the left wall to the right wall. An unwinding of the filter may be controlled based on at least one of a hand gesture sensed by the motion detector or a push sensed by the button or touch sensor.

A slit may be formed in the rear of the case. A filter guide may be configured to unwind the filter sheet from the roller. A filter cutter may be configured to remove a section of the filter sheet from the rest of the filter sheet such that the section of the filter sheet passes through the slit to be discarded.

Embodiments disclosed herein may be implemented as an air cleaner comprising a case having a front and a rear opposite to the front, an inlet formed in the front, an outlet, and a bottom configured to be seated on a flat surface, a frame provided between the front and the rear of the case, a fan provided in the frame to suction air through the inlet and discharge air out of the outlet, a filter having at least a portion positioned between the fan and the inlet to filter oil mist from suctioned air, a grill to filter oil droplets having a size greater than the oil mist, the grill being coupled to the case to cover the inlet, a latch configured to release the grill from the case to allow access to the filter through the inlet, and a user interface configured to sense a user command to turn on the fan, increase a speed of the fan, and to operate the latch to release the grill.

The user interface may include a motion sensor. A speed of the fan may be increased by a predetermined speed amount when the motion sensor senses a first predetermined gesture.

A filter sensor may sense a contamination level of the filter. The filter may be a roll filter having a filter sheet wound around a roller. The filter sheet may be unwound from the roller by a predetermined length when the filter sensor senses a predetermined contamination level or more and when the user interface senses a user command to unwind the roller.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air cleaner, comprising:
   an outer case having an air inlet through which air is suctioned and an air outlet through which air is discharged;
   a fan provided inside of the outer case to suction air through the air inlet and to discharge air out of the air outlet;
   a filter cartridge including a filter roller and a filter sheet having a plurality of sections wound around the filter roller, each section being configured to be unwound from the filter roller to filter contaminants in the suctioned air such that at least one of the filter sheet or the filter cartridge is replaced when all sections of the filter sheet have been unwound from the roller; and
   a filter cutter configured to cut across the filter sheet to remove a corresponding section of the filter sheet,
   wherein, when the corresponding section has reached a predetermined contamination level, the filter roller is unwound to expose an adjacent section to the suctioned air and the corresponding section is moved to an outside of the outer case and thereafter separated from the filter sheet,
   wherein the filter cutter includes:
      a blade configured to cut the filter sheet;
      a blade housing coupled to the blade;
      a rack extending between first side of the outer case and a second side of the outer case, the rack having a first end closer to the first side of the outer case and a second end closer to the second side of the outer case;
      a gear moveable with the blade housing and configured to engage with the rack to move across the rack between the first and second ends of the rack; and
      a motor configured to rotate the gear to move the blade housing across the rack, and
   wherein, when motor is operated, the blade is moved across the filter sheet to cut the corresponding section from the filter sheet, and the corresponding section of the filter sheets configured to be removed without further unwinding the filter sheet.

2. The air cleaner of claim 1, further comprising unwinding rollers provided in the outer case and configured to pull the filter sheet in a direction away from the filter roller so as to unwind the filter sheet from the filter roller.

3. The air cleaner of claim 2, wherein the unwinding rollers include:
   a first roller;
   a second roller provided adjacent to the first roller; and
   a motor configured to rotate the second roller, wherein, when the motor is driven, the filter sheet is passed between the first roller and the second roller such that the filter sheet is unwound from the roller.

4. The air cleaner of claim 1, further comprising a clamp provided in the outer case to hold down the filter sheet.

5. The air cleaner of claim 4, wherein the clamp includes:
   a holding block having a bottom surface and an upper surface that is inclined downward from a first side of the inner frame toward a second side of the inner frame;
   an upper wedge provided on top of the holding block, the upper wedge having a flat upper surface and a lower surface that is inclined downward from the first side of the inner frame toward the second side; and a motor configured to apply a force on the second side of the upper wedge to move the upper wedge in a first direction such that the holding block is moved in a second direction perpendicular to the first direction, the second direction being a direction toward a portion of the filter sheet to be held down.

6. The air cleaner of claim 1, wherein the grill is configured to be removed from the outer case to allow access to the roller of the filter.

7. An air cleaner, comprising:

a case having a left wall, a right wall opposite to the left wall, a bottom, a top provided opposite to the bottom, a front opening, a dispensing slit, and a rear opening provided opposite to the front opening, the right and left walls being perpendicular to the front and rear openings, a left-right direction extending between the right and left walls, and a vertical direction extending between the top and the bottom;

a fan provided inside of the case and configured to suction air through the front opening and discharge air out of the rear opening;

a grill coupled to the case to cover the front opening;

a filter roller provided inside of the case and extending in a left-right direction, the filter roller being configured to rotate and be removable from the inside of the case;

a filter sheet configured to filter foreign matter from suctioned air and wound around the filter roller such that, when the filter sheet is unwound, a first section of the filter sheet extends in the vertical direction between the filter roller and the top of the case so as to cover an intake of the fan and be exposed through the front opening;

a filter cartridge provided inside of the case and having left and right walls that align with the left and right walls of the case, wherein the filter roller is rotatably coupled to the left and right walls of the filter cartridge and is configured to be removed from the filter cartridge;

a frame in which the fan is housed, the frame having left and right walls that align with the left and right walls of the case, respectively, wherein, when the filter sheet is unwound, a portion of the filter sheet moves across a top of the frame; and a filter cutter and a clamp provided on top of the frame, wherein the frame is provided between the filter cartridge and the rear opening, the clamp is configured to hold down the portion of the filter sheet, and the filter cutter is configured to cut across the portion of the filter sheet in the left-right direction, wherein the first section has reached a predetermined contamination level, the filter roller is unwound to expose an adjacent section to the first section, and the first section is moved to an outside of the case through the dispensing slit and thereafter separated from the filter sheet, wherein the filter cutter includes:

a blade having left and right sides, at least one of the left and right sides being configured to cut the filter sheet;

a blade housing coupled to a bottom the blade;

a gear moveable with the blade housing;

a rack extending between the left and right walls of the frame and configured to engage with the gear; and a motor to rotate the gear, and wherein, when the motor is operated to turn the gear in a first direction, the blade housing is moved from the left wall of the frame toward the right wall of the frame, and when the motor is operated to turn the gear in a second direction opposite to the first direction, the blade housing s moved from the right wall of the frame toward the left wall of the frame, wherein the filter sheet is cut when the gear is t at least one of the first or second directions.

8. The air cleaner of claim 7, wherein the top of the case includes an opening, and the filter cartridge is configured to be inserted through the opening to be removed from the case.

9. The air cleaner of claim 7, wherein a roller assembly is provided at a top of the filter cartridge to further unwind the filter sheet from the filter roller and guide the first section of the filter sheet through the roller assembly in a direction away from the grill, the roller assembly including:

a first roller extending in the left-right direction;

a second roller provided above the first roller and configured to engage with the first roller such that, when the first roller is rotated in a first rotational direction, the second roller is rotated in a second rotational direction opposite to the first rotational direction; and a motor configured to rotate the first roller, wherein the first section of the filter sheet is fed between the first and second rollers such that, when the motor rotates the first roller, the first section of the filter sheet is moved in a direction away from the grill, and a second section of the filter sheet is unwound from the filter roller to extend in the vertical direction between the filter roller and the top of the case so as to cover an intake of the fan and be exposed through the front opening.

10. The air cleaner of claim 7, further comprising an inner support having left and right walls coupled to the left and right walls of the outer case, the inner support having a latch assembly configured to release the grill from the outer case.

11. The air cleaner of claim 10, wherein the fan and the roller filter are provided in the frame.

12. The air cleaner of claim 11, wherein the frame includes a roller support extending downward and the inner support includes a recess, at least one of the roller support or the filter roller is supported in the recess of the inner support, and the fan is provided in the frame to be above the filter roller.

13. The air cleaner of claim 11, further comprising a roller assembly provided at a top of the frame to further unwind the first section of the filter sheet.

14. The air cleaner of claim 10, wherein the latch assembly includes a latch, a spring coupled to the latch, and a lock configured to couple to and decouple from the latch, wherein, when the grill is pressed down to couple to the case, the latch is pushed down, the spring is compressed, and the lock is coupled to the latch to maintain a compressed state of the spring, and when the lock is decoupled from the latch, a restoring force of the spring pushes the latch upward to separate a top of the grill from the case.

* * * * *